(12) United States Patent
Niioka et al.

(10) Patent No.: US 8,810,567 B2
(45) Date of Patent: Aug. 19, 2014

(54) IMAGE DISPLAY APPARATUS

(75) Inventors: Shinya Niioka, Kanagawa (JP); Koji Shigemura, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 315 days.

(21) Appl. No.: 13/230,493

(22) Filed: Sep. 12, 2011

(65) Prior Publication Data
US 2012/0113100 A1 May 10, 2012

(30) Foreign Application Priority Data
Sep. 15, 2010 (JP) ................................. 2010-207309

(51) Int. Cl.
G06T 15/00 (2011.01)
H04N 13/00 (2006.01)

(52) U.S. Cl.
CPC ..................................... H04N 13/00 (2013.01)
USPC ............ 345/419; 349/113; 349/114; 349/141

(58) Field of Classification Search
CPC ..................................................... H04N 13/00
USPC ................... 345/418, 419; 349/113, 114, 141
See application file for complete search history.

(56) References Cited

U.S. PATENT DOCUMENTS

| | | | |
|---|---|---|---|
| 6,118,584 A | 9/2000 | Van Berkel et al. | |
| 6,831,678 B1 * | 12/2004 | Travis | 348/46 |
| 7,969,544 B2 | 6/2011 | Uehara et al. | |
| 8,063,931 B2 | 11/2011 | Saishu et al. | |
| 8,446,554 B2 | 5/2013 | Uehara et al. | |
| 8,587,757 B2 | 11/2013 | Uehara et al. | |
| 8,687,160 B2 | 4/2014 | Uehara et al. | |
| 2006/0238664 A1 * | 10/2006 | Uehara et al. | 349/1 |
| 2008/0278641 A1 * | 11/2008 | Uehara | 349/15 |
| 2009/0002262 A1 | 1/2009 | Fukushima et al. | |
| 2009/0167846 A1 | 7/2009 | Niioka et al. | |
| 2009/0309873 A1 * | 12/2009 | Saishu et al. | 345/419 |

FOREIGN PATENT DOCUMENTS

| | | |
|---|---|---|
| JP | 10-505689 | 6/1998 |
| JP | 10-186294 | 7/1998 |
| JP | 2005-208567 | 8/2005 |
| JP | 2008-092361 | 4/2008 |
| JP | 2008-249887 | 10/2008 |
| JP | 2009-098311 | 5/2009 |
| JP | 2009-157116 | 7/2009 |
| JP | 2009-294660 | 12/2009 |
| WO | 97/02709 | 1/1997 |

OTHER PUBLICATIONS

NIKKEI Electronics Jan. 6, 2003, No. 838 pp. 26-27.
Japanese Official Action—2010-207309—May 13, 2014.

* cited by examiner

*Primary Examiner* — Phu K Nguyen
(74) *Attorney, Agent, or Firm* — Young & Thompson

(57) ABSTRACT

In the display panel (2) of an image display apparatus, a left-eye pixel (4L) and a right-eye pixel (4R) constitute a display unit (4) and have a nearly trapezoidal shape. A sub-pixel has a nearly trapezoidal aperture having upper and lower bases nearly parallel to the X-axis and two oblique sides oblique in directions different from the Y-axis direction. A nearly triangular shielding part is provided at the acute angle part of the nearly trapezoidal shape. The nearly triangular shielding part serves to create a gentle distribution of brightness and luminance of the image display apparatus, whereby 3D moire becomes less visible and 3D crosstalk is reduced.

20 Claims, 38 Drawing Sheets

FIG.25

| | layout values | | | spot diameter ratio | 3Dmoire | | 3DCTmin | subjective assessment (visual quality) |
|---|---|---|---|---|---|---|---|---|
| | aperture ratio | maximum derivative value | shielding area Sct2/ Sct1 area | | ΔYc | ΔY/ΔX | | |
| Pixel Level 1 | 0.95 | 2.0 | 15% | 1 | 25% | 0.10 | 5.1% | △ |
| | | | | 1.5 | 15% | 0.06 | | ○~◎ |
| Pixel Level 2 | 0.9 | 2.5 | 30% | 1 | 35% | 0.05 | 3.2% | △ |
| | | | | 1.5 | 15% | 0.03 | | ◎ |
| Pixel Level 3 | 1.1 | 1.8 | 15% | 1 | 30% | 0.04 | 5.0% | ○~◎ |
| | | | | 1.5 | 20% | 0.02 | | ◎ |
| Prior Art Pixel | 1 | 0 | 0 | 1 | 3.1% | 0.01 | 10.1% | × |
| | | | | 1.5 | 2.5% | 0.005 | | △ |

IMAGE DISPLAY APPARATUS

INCORPORATION BY REFERENCE

This application is based on Japanese Patent Application No. 2010-207309 filed on Sep. 15, 2010, and including specification, claims, drawings and summary. The disclosure of the above Japanese Patent Application is incorporated herein by reference in its entirety.

TECHNICAL FIELD

The present invention relates to an image display apparatus for displaying different images intended for multiple observing points and particularly to a display panel displaying three-dimensional images in higher quality.

BACKGROUND ART

As cell-phones and information terminals have been advanced, image display apparatuses become smaller and finer. On the other hand, as new value-added image display apparatuses, attention has been drawn to image display apparatuses allowing the observer to view different images depending on the observing point, namely image display apparatuses making different images visible at multiple observing points, and to three-dimensional image display apparatuses presenting different images as parallax images and allowing the observer to view a three-dimensional image.

Techniques of providing different images to multiple observing points consist of merging image data for different observing points and displaying them on a display panel, separating the displayed composite image by an optical separation means such as a lens and a barrier having slits (a screen), and providing the images to individual observing points. In principle, images are separated by an optical means such as a barrier having slits and a lens so as to limit each image to a direction of observing point. A parallax barrier consisting of a barrier having many slits in a stripe pattern or a lenticular lens consisting of an array of cylindrical lenses having lens effect in one directional is generally used as the image separation means.

A three-dimensional image display apparatus having an optical image separation means is suitable for installing in terminal devices such as cell-phones because it does not require wearing special glasses and eliminates annoyance of wearing glasses. Cell-phones carrying a three-dimensional display apparatus consisting of a liquid crystal panel and a parallax barrier are already commercialized (for example, see NIKKEI Electronics, Jan. 6, 2003, No. 838 (Non-Patent Literature 1, hereafter), pp 26-27).

The above technology, namely a three-dimensional image display apparatus providing different images to multiple observing points using an optical separation means sometimes causes the observer to see a dark boundary between images when he/she shifts the observing point and the observed image is switched. This phenomenon occurs when a non-display region between pixels for different observing points (a shielding part generally called a black matrix in a liquid crystal panel) is viewed. This phenomenon accompanying shift of the observing point of the observer does not occur with a general three-dimensional display apparatus without an optical separation means. Therefore, the observer experiences discomfort or senses deterioration in the display quality from the above phenomenon occurring with a multi-viewpoint three-dimensional display apparatus or three-dimensional display apparatus with an optical separation means.

This is a phenomenon generally called 3D moire. The 3D moire is a periodically appearing uneven luminance (sometimes referred to as uneven color) caused by displaying different images in different angular directions. Furthermore, the 3D moire is luminance angular fluctuation and large luminance angular fluctuation has adverse effect on three-dimensional observation.

In order to ameliorate the above problem caused by an optical separation means and shielding part, three-dimensional image display apparatuses in which the shape and geometry of pixel electrodes and shielding part of the display panel is designed to reduce deterioration in the display quality have been proposed (for example, Unexamined Japanese Patent Application KOKAI Publication Nos. 2005-208567 (Patent Literature 1, hereafter) and H10-186294 (Patent Literature 2, hereafter)).

FIG. 37 is a plane view showing the display panel of the display apparatus disclosed in Patent Literature 1. In the display apparatus disclosed in the Patent Literature 1, at any point in the horizontal direction 1012, the shielding part (the wire 1070 and shielding part 1076) and aperture are provided nearly at a fixed ratio in a cross-section of the display panel in the vertical direction 1011 perpendicular to the direction of the array of cylindrical lenses 1003a.

Therefore, even if the observer shifts his/her observing point in the horizontal direction 1012, which is the image separation direction, so as to change the observing direction, the shielding part viewed is nearly at the fixed ratio. In other words, it does not happen to the observer to see only the shielding part in a specific direction or to see a darker display. Then, deterioration in the display quality caused by the shielding region is prevented.

FIG. 38 is a schematic illustration showing pixels of the three-dimensional display apparatus disclosed in the Patent Literature 2. FIG. 38 (A) is a plane view showing the pixel arrangement of the three-dimensional display apparatus disclosed in the Patent Literature 2 and FIG. 38 (B) is an enlarged view of a pixel thereof. In the three-dimensional display apparatus disclosed in the Patent Literature 2, the total vertical dimension of horizontally adjacent pixels is constant at any position in the horizontal direction in the overlapping region. The total dimension is equal to the vertical dimension of a rectangular region B. Therefore, horizontally continuous and substantially uniform luminance is provided and substantially constant luminance is maintained all over.

Therefore, when the same image is output to adjacent columns of pixels, constant luminance is maintained even if the observer's eye crosses a boundary between apertures.

For easier understanding, a typical prior art pixel structure will be described hereafter with reference to the drawings. FIG. 36 is an illustration schematically showing a prior art pixel structure disclosed in the Patent Literature 1 and 2.

For simplified explanation, a display unit 4 consisting of a pair of a right-eye pixel 4R and a left-eye pixel 4L is shown. The aperture of each pixel has an isosceles trapezoid shape. When the focus is on one of the minimum unit pixels (the right-eye pixel 4R or the left-eye pixel 4L) constituting the display unit 4, it is referred to as "a sub-pixel" without particular distinction.

The display unit 4 comprises at least the right-eye pixel 4R and left-eye pixel 4L as two sub-pixels adjacent to each other in the X-axis direction. The three-dimensional image display apparatus comprises a cylindrical lens 1003a as an optical means for separating light emerging from the apertures of sub-pixels into separated images in the X-axis direction.

Here, the image separation direction is defined as the X-axis direction and the direction perpendicular thereto is defined as the Y-axis direction. Furthermore, the term "vertical aperture" refers to the width of an aperture in the direction perpendicular to the image separation direction (which corresponds to the Y-axis in the case of FIG. 37). Of the bases of the trapezoid of a sub-pixel aperture, the smaller base is referred to as the upper base and the larger base is referred to as the lower base.

The aperture of the right-eye pixel 4R and the aperture of the left-eye pixel 4L are provided next to each other in the X-axis direction. There is a region on their border where these apertures overlap with each other in the Y-axis direction. The region where these apertures overlap with each other is termed "the overlapping region" and the width of such a region in the X-axis direction is defined as an overlapping region width Xct1. On the other hand, a region in the center of the aperture where the aperture of the right-eye pixel 4R and the aperture of the left-eye pixel 4L do not overlap with each other is termed "the non-overlapping region" and the width of such a region in the X-axis direction is defined as a non-overlapping region width X1. The pitch Xdot of sub-pixels in the X-axis direction is equal to the sum of the overlapping region width Xct1 and non-overlapping region width X1.

The aperture of a sub-pixel is in the shape of an isosceles trapezoid symmetric about a line b-b' parallel to the Y-axis and passing through the center of the sub-pixel and having upper and lower bases parallel to the X-axis. A shielding line having a finite width W is provided on the oblique sides of the trapezoid. The oblique side makes an angle θ with respect to the Y-axis. The shielding line is termed "the oblique wire."

Points A and A' are the vertexes of the lower bases of the trapezoidal apertures of the sub-pixels. Points B and B' are the vertexes of the upper bases of the trapezoidal apertures of the sub-pixels. The points A and A' and points B and B' are inflexion points where the vertical aperture width of a sub-pixel starts to change in the X-axis direction. A point C is a point where a line parallel to the Y-axis and passing through the point B and the lower base of the trapezoidal aperture intersect and so is a point C' with regard to the point B'.

The line connecting the points A and B and the line connecting the points A' and B' are parallel to each other. Then, the total of the vertical aperture widths of the right-eye pixel 4R and left-eye pixel 4L in the overlapping region is always constant in the X-axis direction. Furthermore, the points A and B' and points A' and B are situated on the same line parallel to the Y-axis, respectively, so that the vertical aperture width in the non-overlapping region and the total of the vertical aperture widths of the apertures of the right-eye pixel 4R and left-eye pixel 4L in the overlapping regions are equal. In this way, the vertical aperture width is constant from the overlapping region to the non-overlapping region and always constant throughout a sub-pixel in the X-axis direction.

The display unit 4 has an oblique wire making an angle θ with respect to the Y-axis and having a display wire width W. The sides of the oblique wire are connected to the lower bases of the trapezoidal apertures at the points A and A' and connected to the upper bases of the trapezoidal apertures at the points B and B'. The oblique wire is connected to a shielding part at the trapezoid upper base. This shielding part has a width Y2 in the Y-axis direction and provides a region where, for example, transistors and capacitors for operating the sub-pixel are formed.

The total of the vertical aperture widths of adjacent sub-pixels is constant in the X-axis direction. Therefore, assuming that lights equal in luminance are emitted from the aperture region in the overlapping region and the aperture region in the non-overlapping region, the luminance is maintained constant at observation positions parallel to the X-axis. Then, there is no luminance angular fluctuation, in other words 3D moire is not visible to the observer.

Here, a triangular region formed by connecting the points A, B, and C and a triangular region formed by connecting the points A', B', and C' of the display unit 4 are right triangles and situated within the overlapping region width Xct1. This is a crosstalk region where lights emitted from the right-eye pixel 4R and left-eye pixel 4L overlap with each other. The prior art pixel structure has to form at least such a crosstalk region to have a constant vertical aperture width in the X-axis direction, thereby causing 3D crosstalk (the rate of a right-eye or left-eye image leaking into the other) upon three-dimensional display.

Here, "3D moire" or "3D crosstalk" will be described in detail. In this specification, periodically appearing uneven luminance (sometimes referred to as uneven color) caused by displaying different images in different angular directions, particularly luminance angular fluctuation is defined as "3D moire." On the other hand, the rate of a right-eye or left-eye image leaking into the other is defined as "3D crosstalk."

Generally, fringes appearing when structures different in periodicity interfere with each other are called "moire fringes." The moire fringes are interference fringes appearing depending on the periodicity or pitch of structures. The 3D moire is uneven luminance caused by the image-forming property of an image separation means. Therefore, the 3D moire is distinguished from the moire fringes in this specification.

The 3D moire may not be a problem in some observation positions. However, large luminance angular fluctuation presumably has some adverse effect on three-dimensional observation. Therefore, it is desirable that the magnitude of luminance fluctuation is equal to or lower than a given value.

On the other hand, a higher magnitude of 3D crosstalk may diminish three-dimensional effect and give the observer adverse effects such as tired eyes. Therefore, it is desirable that the magnitude of crosstalk is equal to or lower than a given value.

In this specification, with regard to the pixel shape shown in FIG. 36, the aperture ratio AP, 3D crosstalk 3Dct, and 3D moire 3Dmoire are defined as follows. From the pixel shown, the aperture ratio AP can be defined by the following formula from the area ratio between the shielding part and aperture.

$$AP = Y1/(Y1+Y2+Y3) = (Ydot-Y3-Y2)/Ydot \quad \text{[Math 1]}$$

Furthermore, provided that 3D crosstalk contributes to a region as large as the sub-pixel pitch Xdot, 3D crosstalk (3Dct) can be defined by the following formula from the area ratio between the aperture region and overlapping region.

$$3Dct = (Xct1 \times Y1)/(X1 \times Y1 + Xct1 \times Y1) = Xct1/(X1 + Xct1) = Xct1/Xdot \quad \text{[Math 2]}$$

Furthermore, 3D moire (3Dmoire) can be defined by the following formula from the ratio between the vertical aperture width Y1 in the non-overlapping region and the total of the vertical aperture widths of the right-eye and left-eye pixels 4R and 4L in the overlapping region.

$$3Dmoire = 1-(Y1+Y2-Wy)/Y1 = (W/\sin\theta - Y2)/Y1 \quad \text{[Math 3]}$$

Furthermore, in order to maintain the vertical aperture width constant in the X-axis direction, the following relationship must be established.

$$Y2 = W/\sin\theta \quad \text{[Math 4]}$$

Therefore, it is understood from the mathematical formulae 3 and 4 that the prior art pixel has ideally 3Dmoire=0 and there is no luminance angular fluctuation, whereby 3D moire is less visible.

However, it is understood from the mathematical formula 2 that the overlapping region width Xct1 is determined by the inclination θ of the oblique wire and 3D crosstalk (3Dct) is significant as the angle θ is increased.

In addition, in order to obtain a desired aperture ratio from the mathematical formulae 1 and 4, the inclination θ should be increased to a certain extent. For this reason, 3D crosstalk cannot be eliminated. Even if optical conditions for separating images are adjusted so that 3D crosstalk contributes to a region not larger than the sub-pixel pitch Xdot, 3D crosstalk cannot be eliminated either. In other words, the prior art pixel shown in FIG. 36 has a structure with low "3D moire" and high "3D crosstalk."

By the way, the display panel of a display apparatus is required to have a smaller pixel pitch in order to improve the fineness and have a higher so-called aperture ratio determined by the area ratio between the aperture and shielding part and contributing to the display luminance in order to improve the display luminance. This also applies to a three-dimensional display apparatus.

However, for a finer image, one pixel has to be made much smaller because many pixels have to be arranged in a screen region, which is small from the beginning. In other words, how much the pixel size can be reduced is an issue.

As semiconductor microscopic processing techniques advance, smaller pixels have been realized. However, electric/electronic circuits such as switching elements and auxiliary capacitors driving the liquid crystal for modulating light may not always be downsized in proportion to much finer pixels. This is because the switching elements and auxiliary capacitors are created on a semiconductor or glass substrate using microscopic processing techniques and the limitation of semiconductor process imposes an upper limit on the realizable fine line width. Even if finer processing is technically available, investment in equipment will be costly at least for the present.

Furthermore, a liquid crystal display apparatus undergoes increase in the shielding region, namely decrease in the aperture ratio, because of limitation accompanying higher fineness, having a problem that the display apparatus overall uses light less efficiently. In other words, improving the image quality by finer pixels leads to less efficient use of light. Therefore, it is an issue with a liquid crystal display apparatus to realize a finer image and realize a high quality and highly efficient image display apparatus.

A three-dimensional display panel having two or more observing points as in the three-dimensional image display apparatuses disclosed in the Patent Literature 1 and 2 has multiple sub-pixels corresponding to the number of observing points in one pixel. Therefore, the area involved in wires and switching elements in one pixel is increased. Particularly, a finer pixel has a significantly decreased aperture ratio and therefore, improvement in the aperture ratio is an important issue.

For the above reason, a finer pixel has to be designed with priority at least on the aperture ratio in order to ensure a desired transmittance. In order to increase the aperture area, the wire angle θ in the boundary region must be increased. However, if the wire angle θ is increased, the overlapping region width Xct1 is also increased, whereby 3D crosstalk becomes so significant that the visibility of three-dimensional display is adversely affected. Particularly, as disclosed in the Patent Literature 1, when a square pixel is divided in the vertical direction according to the number of observing points and color filters are provided in a horizontal stripe pattern, a sub-pixel becomes very small in the Y-axis direction depending on the number of colors. As a sub-pixel becomes small in the Y-axis direction, because the oblique wire has a finite width, the vertical aperture width in the X-axis direction cannot be maintained constant even if the inclination θ is increased. In other words, it is difficult to realize a fine pixel structure ensuring both 3D crosstalk and the aperture ratio and having a nearly constant vertical aperture ratio for reducing 3D moire.

On the other hand, in a three-dimensional display system using a lenticular lens to separate images, the spot diameter should be reduced to improve the separation performance of the lens in order to increase the region in which a three-dimensional image is comfortably observed. Recently, advanced lens processing techniques allow for application of lenses having a spot diameter in the order of several microns. However, as the spot diameter is reduced, slight geometric change due to the processing accuracy of production process is augmented even in a pixel structure designed to have a nearly constant vertical aperture width in the image separation direction as in the prior art technology shown in FIG. 36. Consequently, uneven luminance locally occurs, significantly deteriorating the image quality.

In the above explanation, a sub-pixel has an isosceles trapezoid aperture. It is obvious that the near parallelogram pixel structure disclosed in the Patent Literature 2 has the same problems.

The present invention is invented in view of the above circumstances and an exemplary object of the present invention is to provide an image display apparatus having 3D crosstalk reduced and the aperture ratio improved while minimizing the influence of 3D moire so as to improve the three-dimensional display quality.

SUMMARY

In order to achieve the above object, the image display apparatus according to a first exemplary aspect of the present invention includes:

a display panel having a plurality of display units which are arranged in a matrix and include at least a pixel displaying a first observing point image and a pixel displaying a second observing point image; and an optical means sorting lights emitted from the pixel displaying a first observing point image and pixel displaying a second observing point image in directions different from each other, wherein:

the pixel displaying a first observing point image and pixel displaying a second observing point image are adjacent to each other in a first direction;

the display units are arranged in rows extending in the first direction and in columns extending in a second direction perpendicular to the first direction;

a shielding part is provided around the aperture of the pixel displaying a first observing point image and the aperture of the pixel displaying a second observing point image;

the aperture of the pixel displaying a first observing point image and the aperture of the pixel displaying a second observing point image are composed of a first region where they overlap with each other in the second direction and a second region other than the first region;

the total aperture width in the second direction of the aperture of the pixel displaying a first observing point image and the aperture of the pixel displaying a second observing point image within the first region constitutes a first aperture width;

the aperture width in the second direction of the aperture of the pixel displaying a first observing point image and the aperture of the pixel displaying a second observing point image within the second region constitutes a second aperture width;

the derivatives of the first aperture width with respect to the first direction are real numbers other than zero provided that the direction from near the boundary between the first and second regions toward the center of the first region is the positive direction of the first direction; and of the boundary line between the shielding part and the aperture of the pixel displaying a first observing point image and the boundary line between the shielding part and the aperture of the pixel displaying a second observing point image within the first region, the boundary line intersecting the second direction includes at least one or more flexion points.

The image display apparatus according to another exemplary aspect of the present invention includes:

a display panel having a plurality of display units which are arranged in a matrix and include N (N is an integer equal to or greater than 2) pixels displaying N observing point images and arranged in the order from the first observing point to the N-th observing point; and an optical means sorting lights emitted from the N pixels displaying N observing point images in directions different from each other, wherein:

a pixel displaying a k-th (k is an integer of 1, . . . , N−1) observing point image and a pixel displaying a k+1-th observing point image are adjacent to each other in a first direction;

the display units are arranged in rows extending in the first direction and in columns extending in a second direction perpendicular to the first direction;

a shielding part is provided around the apertures of the N pixels displaying N observing point images;

the aperture of the pixel displaying a k-th observing point image and the aperture of the pixel displaying a k+1-th observing point image are composed of a first region where they overlap with each other in the second direction and a second region other than the first region;

the total aperture width in the second direction of the aperture of the pixel displaying a k-th observing point image and the aperture of the pixel displaying a k+1-th observing point image within the first region constitutes a first aperture width;

the aperture width in the second direction of the aperture of the pixel displaying a k-th observing point image and the aperture of the pixel displaying a k+1-th observing point image within the second region constitutes a second aperture width;

the derivatives of the first aperture width with respect to the first direction are real numbers other than zero provided that the direction from near the boundary between the first and second regions toward the center of the first region is the positive direction of the first direction;

of the boundary line between the shielding part and the aperture of the pixel displaying a k-th observing point image and the boundary line with the aperture of the pixel displaying a k+1-th observing point image within the first region, the boundary line intersecting the second direction includes at least one or more flexion points;

one intersection between the boundary line and the shielding part nearly parallel to the first direction is situated in the first region excluding the boundary between the first and second regions; and the first aperture width is smaller than the second aperture width.

The image display apparatus according to another exemplary aspect of the present invention includes:

a display panel having a plurality of display units which are arranged in a matrix and include N (N is an integer equal to or greater than 2) pixels displaying N observing point images; and an optical means sorting lights emitted from the N pixels displaying N observing point images in directions different from each other, wherein:

the N pixels displaying N observing point images are arranged in a matrix of N rows extending in a first direction and N columns extending in a second direction perpendicular to the first direction;

a shielding part is provided around the apertures of the N pixels displaying N observing point images;

the aperture of a pixel displaying a k-th (k is an integer of 1, . . . , N−1) observing point image and the aperture of a pixel displaying a k+1-th observing point image in the first direction are composed of a first region where they overlap with each other in the second direction and a second region other than the first region;

the aperture of a pixel displaying an i-th (i is an integer of 1, . . . , N−1) observing point image and the aperture of a pixel displaying an i+1-th observing point image in the second direction are composed of a third region where they overlap with each other in the first direction and a fourth region other than the third region;

the total aperture width in the second direction of the aperture of the pixel displaying a k-th observing point image and the aperture of the pixel displaying a k+1-th observing point image within the first region constitutes a first aperture width;

the aperture width in the second direction of the aperture of the pixel displaying a k-th observing point image and the aperture of the pixel displaying a k+1-th observing point image within the second region constitutes a second aperture width;

the derivatives of the first aperture width with respect to the first direction are real numbers other than zero provided that the direction from near the boundary between the first and second regions toward the center of the first region is the positive direction of the first direction;

of the boundary line between the shielding part and the pixel displaying a k-th observing point image and the boundary line with the aperture of the pixel displaying a k+1-th observing point image within the first region, the boundary line intersecting the second direction includes at least one or more flexion points;

one intersection between the boundary line and the shielding part nearly parallel to the first direction is situated in the first region excluding the boundary between the first and second regions;

the first aperture width is smaller than the second aperture width;

the total aperture width in the first direction of the aperture of the pixel displaying an i-th observing point image and the aperture of the pixel displaying an i+1-th observing point image within the third region constitutes a third aperture width;

the derivatives of the third aperture width with respect to the second direction are real numbers other than zero provided that the direction from near the boundary between the third and fourth regions to the center of the third region is the positive direction of the second direction;

of the boundary line between the shielding part and the pixel displaying an i-th observing point image and the boundary line with the aperture of the pixel displaying an i+1-th observing point image within the third region, the boundary line intersecting the first direction includes at least one or more flexion points; and one intersection between the boundary line and the shielding part nearly parallel to the first direction is situated in the third region excluding the boundary between the third and fourth regions.

An exemplary object of the present invention is to provide an image display apparatus and display panel having the 3D crosstalk reduced and the aperture ratio improved while minimizing the influence of 3D moire asp as to improve the three-dimensional display quality.

BRIEF DESCRIPTION OF THE DRAWINGS

These objects and other objects and advantages of the present invention will become more apparent upon reading of the following detailed description and the accompanying drawings in which:

[FIG. 25] A table showing assessment results of the embodiments;

EXEMPLARY EMBODIMENTS

Figure 1:
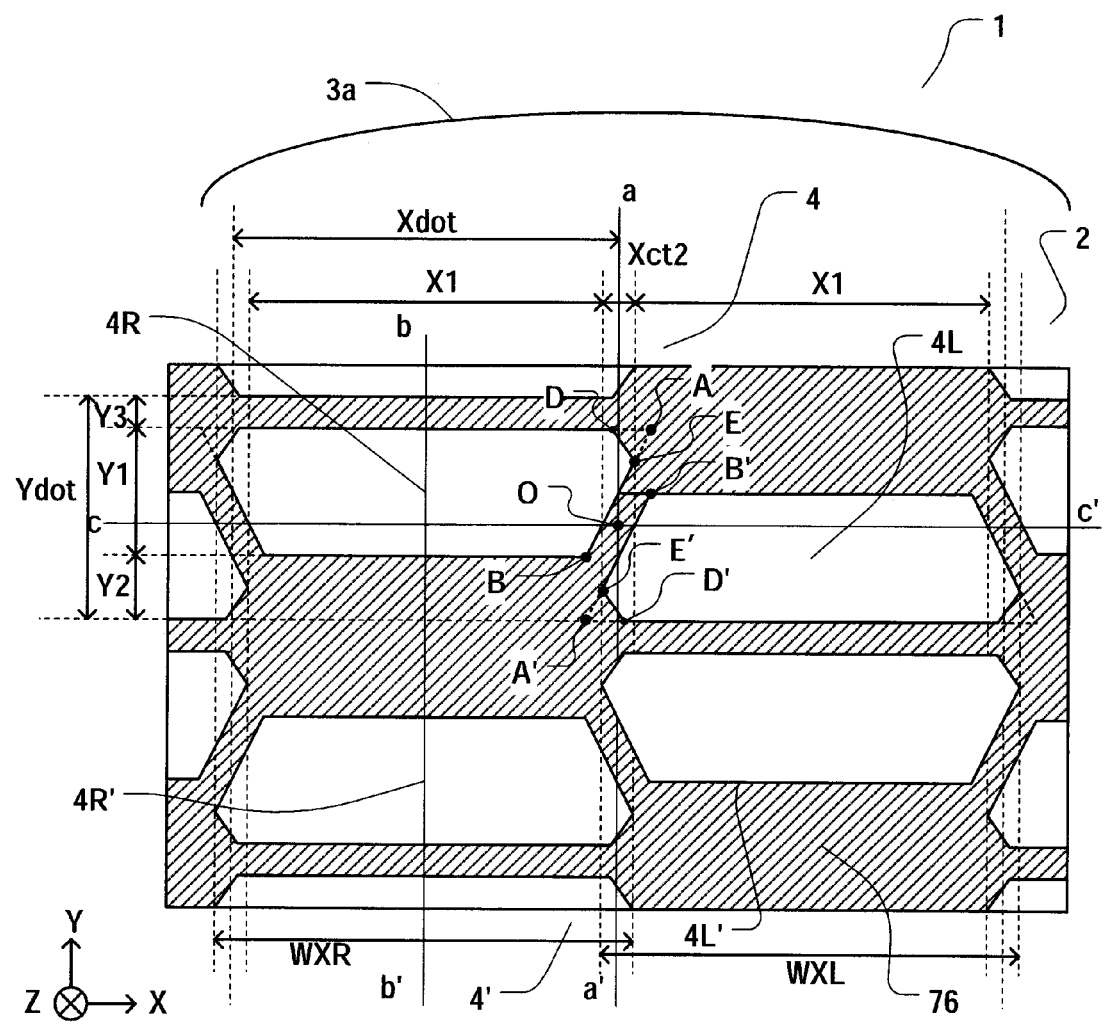
[FIG. 1] A plane view showing a pixel of the display panel according Embodiment 1 of the present invention.

The display panel and image display apparatus according to embodiments of the present invention will be described hereafter with reference to the drawings. In the drawings, some parts are hatched for distinguishing elements such as the shielding parts, not for indication of cross-sections.

[Embodiment 1]

The image display apparatus and display panel according to this embodiment will be described with reference to the drawings.

FIG. 1 is a plane view showing a pixel of the display panel according to this embodiment.

A display panel 2 is a three-dimensional display panel of two observing points comprising pixels displaying a first observing point image and pixels displaying a second observing point image. In this embodiment, the first observing point pixels are left-eye pixels 4L and the second observing point pixels are right-eye pixels 4R.

A pair of a left-eye pixel 4L and a right-eye pixel 4R constitutes a display unit 4. When the focus is on one of the minimum unit pixels constituting a display unit 4 (a left-eye pixel 4L or a right-eye pixel 4R), it is referred to as "a sub-pixel." The sub-pixels are arranged in a matrix.

A cylindrical lens 3a is a one-dimensional lens having a dome-shaped convex part. The cylindrical lens 3a extends or lengthens in the direction perpendicular to the array direction in the display plane. The cylindrical lens 3a has no lens effect in the extending direction; it has lens effect only in the array direction perpendicular thereto.

Figure 2:
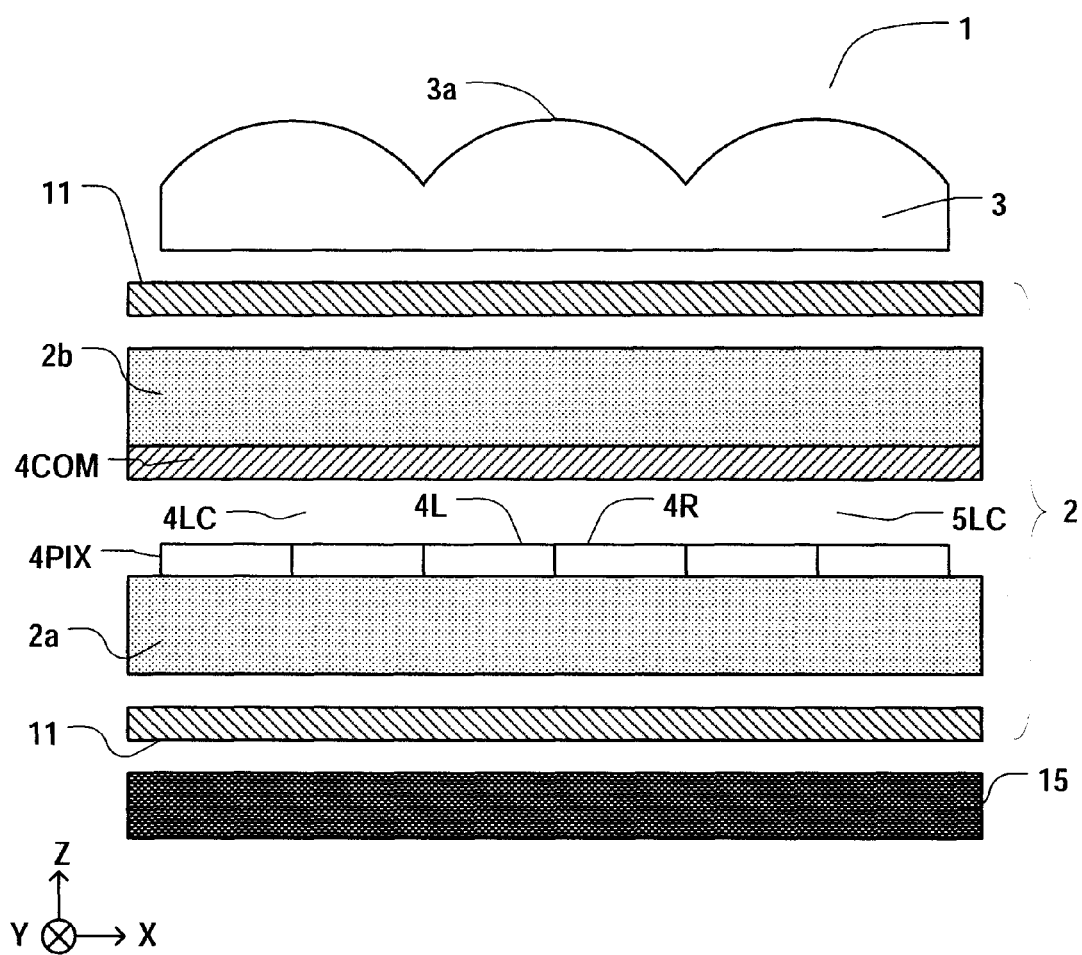
[FIG. 2] A cross-sectional view showing the image display apparatus according to Embodiment 1 of the present invention.

FIG. 2 is a cross-sectional view showing the image display apparatus according to the present invention.

An image display apparatus 1 is composed of a display panel 2 using liquid crystal molecules as an electrooptical element, a lenticular lens 3, and a backlight 15. The lenticular lens 3 is a lens array consisting of many cylindrical lenses 3a arranged in one dimension. The cylindrical lenses 3a have lens effect only in the array direction. The array direction of the cylindrical lenses 3a is equal to the direction the left-eye pixels 4L and right-eye pixels 4R are arranged alternately. A cylindrical lens 3a is situated in accordance with a display unit 4.

The above direction of lens effect is equal to the direction the left-eye pixels 4L and right-eye pixels 4R are arranged alternately. Consequently, the cylindrical lens 3a serves as a light beam separation means separating light of the left-eye pixel 4L and light of the right-eye pixel 4R into different directions. Then, the cylindrical lens 3a can separate an image displayed by the left-eye pixel 4L and an image displayed by the right-eye pixel 4R in different directions. In other words, the lenticular lens 3 is an optical member serving as an image separation means or an image sorting means. Here, the cylindrical lens 3a has a focal point between the principal point or vertex of the cylindrical lens 3a and the pixel surface or the plane of the left-eye pixel 4L or right-eye pixel 4R.

In this specification, a XYX Cartesian coordinate system is defined as follows for convenience. In the direction the left-eye pixels 4L and right-eye pixels 4R are arranged alternately, the first direction from the right-eye pixel 4R to the left-eye pixel 4L is defined as the +X direction and the opposite direction is defined as the −X direction. The +X direction and −X direction are collectively termed the X-axis direction. The lengthwise direction of the cylindrical lens 3a is the second direction and defined as the Y-axis direction. Furthermore, the third direction perpendicular both to the X-axis direction and to the Y-axis direction is defined as the Z-axis direction. Of the Z-axis direction, the direction from the plane of the left-eye pixel 4L or right-eye pixel 4R to the lenticular lens 3 is defined as the +Z direction and the opposite direction is defined as the −Z direction. The +Z direction extends forward or to the observer. The observer views the display panel 2 on the side facing in the +Z direction. Furthermore, the +Y direction is the direction a right-handed coordinate system is established. In other words, when the thumb of the right hand of a person is directed in the +X direction and the index finger is directed in the +Y direction, the middle finger is directed in the +Z direction.

In the XYZ Cartesian coordinate system as defined above, the cylindrical lenses 3a are arranged in the X-axis direction and the left-eye image and right-eye image are separated in the X-axis direction. The display units 4 are lined up in the Y-axis direction. The display units 4 and cylindrical lenses 3a are arranged at the same pitch in the X-axis direction. Furthermore, the cylindrical lenses 3a are each situated in accordance with a column of display units 4 arranged in the Y-axis direction.

In this embodiment, a line of sub-pixels in the X-axis is referred to as a row and a line of sub-pixels in the Y-axis is referred to as a column.

As shown in FIG. 1, a display unit 4 consists of a right-eye pixel 4R and a left-eye pixel 4L and a display unit 4' consists of a right-eye pixel 4R' and a left-eye pixel 4L'.

In this embodiment, one pixel consists of three display units. Each display unit 4 is colored in red, green, or blue. Red, green, and blue color filters extend in the X-axis direction and create a stripe pattern repeated in the Y-axis direction. The order of colors is not restricted to the above and red, green, and blue colors are combined in any order. Furthermore, one pixel can consist of a combination of three or more display units. In such a case, the colors are not restricted to the above and three or more colors can be used.

As shown in FIG. 2, a display panel 2 has a small space between a TFT (thin film transistor) substrate 2a and an opposite substrate 2b, in which a liquid crystal layer 5LC is provided. The TFT substrate 2a is provided on the side of the display panel 2 facing in the −Z direction and the opposite substrate 2b is provided on the side facing in the +Z direction. The lenticular lens 3 is provided on the side of the opposite substrate 2b facing further in the +Z direction. Polarizing plates 11 are applied to the side of the TFT substrate 2a facing in the +Z direction and to the side of the opposite substrate 2b facing in the −Z direction. The color filters and a shielding part 76 shown in FIG. 1 are provided to the opposite substrate 2b. However, this is not restrictive. A shielding layer provided to the TFT substrate 2a is also included in the shielding part 76.

The pixel structure of the image display apparatus 1 according to this embodiment will be described in detail with reference to FIG. 1.

The sub-pixels of the display panel 2 have a hexagonal aperture consisting of a combination of two trapezoids in a plane view. More specifically, the aperture shape is formed by providing a first trapezoid bilaterally symmetric about a line b-b' parallel to the Y-axis and passing through the center of the sub pixel and a second trapezoid having a lower base equal in length to the lower base of the first trapezoid with their lower bases in contact with each other. In this specification, of the bases of a trapezoid, the larger base is referred to as the lower base and the smaller base is referred to as the upper base. However, since one trapezoid has a small height in the Y-axis direction, the hexagonal shape can be considered to be substantially a nearly trapezoidal shape. In the following explanation, a hexagonal sub-pixel is referred to as a nearly trapezoidal pixel. Furthermore, in accordance with the above, of the bases, the larger base is referred to as the lower base and the smaller base is referred to as the upper base. A shielding part is provided around the nearly trapezoidal aperture.

In other words, the above-described sub-pixel of the display panel 2 has a nearly trapezoidal aperture having upper and lower bases nearly parallel to the X-axis and two oblique sides oblique in directions different from the Y-axis direction, and nearly triangular shielding parts (for example, a triangle ADE) are provided at the acute angle parts of the nearly trapezoidal shape.

The aperture has oblique sides bilaterally symmetric about the line b-b'. Therefore, the oblique sides constituting the aperture consist of a pair of sides oblique in opposite directions to each other with respect to the Y-axis direction and extending at the same angle with respect to the Y-axis.

Sub-pixels adjacent to each other in the X-axis direction are symmetry with respect to the center O. The aperture of the right-eye pixel 4R and the aperture of the left-eye pixel 4L are provided in the manner that their centers are at different levels in the Y-axis direction. Sub-pixels adjacent to each other in the Y-axis direction are arranged in the manner that their upper bases or lower bases face each other.

The aperture of the right-eye pixel 4R and the aperture of the left-eye pixel 4L overlap with each other in the Y-axis direction. Such a region is referred to as "an overlapping region" and its width in the X-axis direction is defined as an overlapping region width Xct2. In other words, the width Xct2 is a width of a region of the aperture that is situated between the outermost points E and E' in the X-axis direction. On the other hand, a region of the aperture of the right-eye pixel 4R or left-eye pixel 4L that does not overlap is referred to as "a non-overlapping region" and its width in the X-axis direction is defined as a non-overlapping region width X1. The width Xdot of a sub-pixel in the X-axis direction is equal to the sum of the overlapping region width Xct2 and non-overlapping region width X1.

Figure 3:
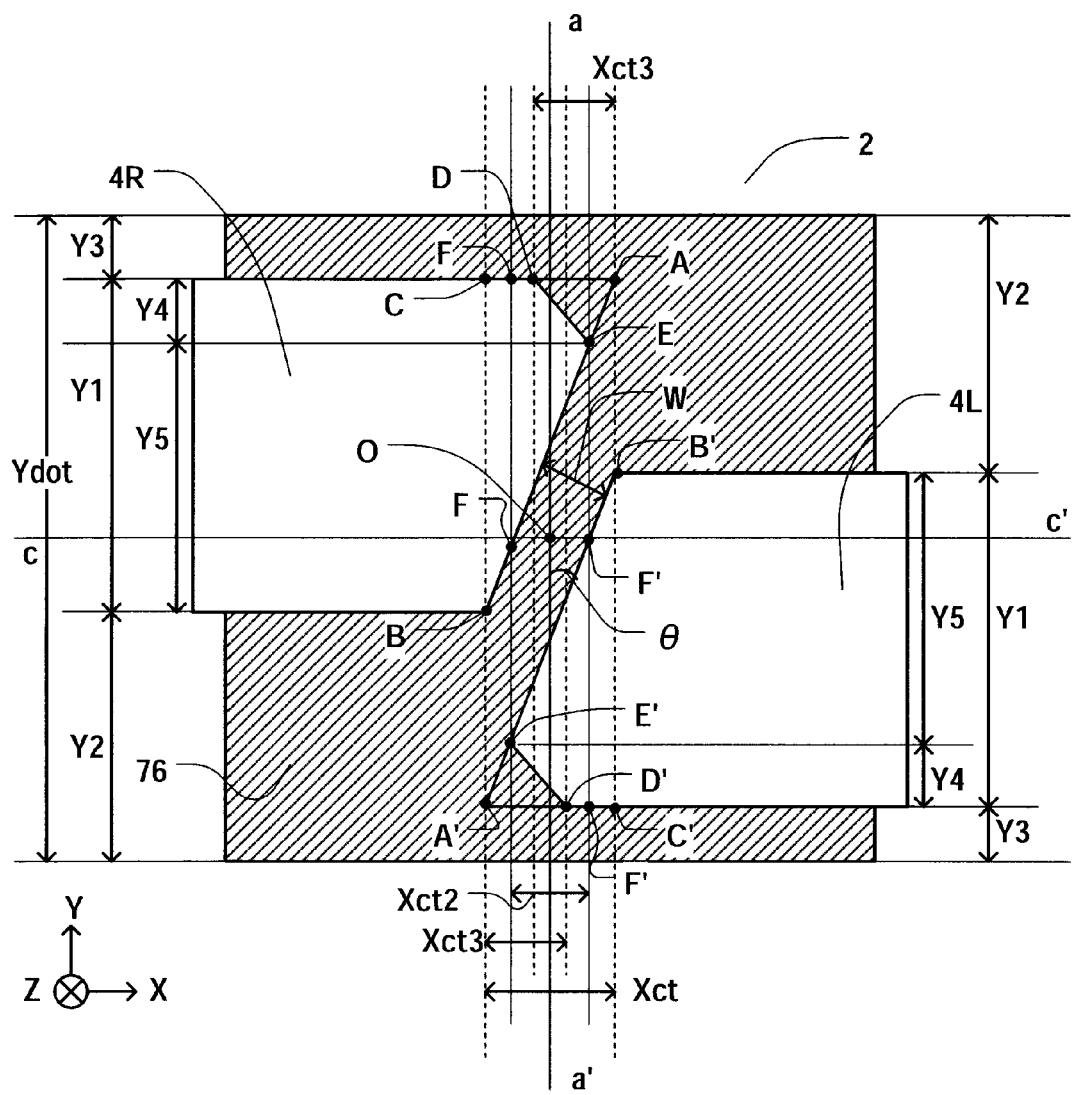
[FIG. 3] An enlarged view showing a pixel of the display panel according to Embodiment 1 of the present invention.

The pixel structure of the image display apparatus 1 will be described in further detail with reference to FIG. 3. FIG. 3 is an enlarged view of a pixel of the display panel according to this embodiment.

A shielding line having a finite width W is provided at the trapezoid oblique sides. The oblique sides make an angle $\theta$ with respect to the Y-axis direction. In this specification, the angle is zero in the +Y-axis direction and increases clockwise.

A line parallel to the Y-axis and passing through the outermost point E of the aperture of the right-eye pixel 4R forms a boundary line between the non-overlapping region and overlapping region. At the lower base of a nearly trapezoidal aperture, the boundary line between the shielding part and aperture is parallel to the X-axis. Points F are an intersection between the boundary line at the lower base and a line parallel to the Y-axis and passing through the point E' and an intersection between the oblique side of the right-eye pixel 4 and a line parallel to the Y-axis and passing through the point E'.

A point A is an intersection between an extended line connecting a point B that is a vertex of the upper base of the nearly trapezoidal aperture of the right-eye pixel 4R and the point E and an extended line of the lower base of the nearly trapezoidal aperture. A point A' is an intersection similarly obtained for the left-eye pixel 4L. The points A and B' are on the same line parallel to the Y-axis and so are the points A' and B.

A point C is an intersection between an extended line connecting the points A' and B and the lower base of the nearly trapezoidal aperture of the right-eye pixel 4R. A point C' is an intersection similarly obtained for the left-eye pixel 4L.

A point D is situated between the points A and F and within the overlapping region width Xct2.

A line connecting the points D and E and a line connecting the points D' and E' are oblique with respect to the Y-axis direction and intersect the center line a-a' of the display unit 4.

A sub-pixel has a nearly trapezoidal aperture; the acute angle parts at the lower base of the trapezoid are shielded by a triangle enclosed by the points A, D, and E or a triangle enclosed by the points A', D', and E', making a hexagonal aperture. A right triangle enclosed by the points A, B, and C and a right triangle enclosed by the points A', B', and C' overlap with each other in the Y-axis direction, forming an overlapping region having an overlapping width Xct in the X-axis direction. Here, since the aperture of a sub-pixel is shielded by the triangle enclosed by the points A, D, and E or the triangle enclosed by the points A', D', and E', the overlapping region width Xct2 is smaller than Xct.

Figure 36:
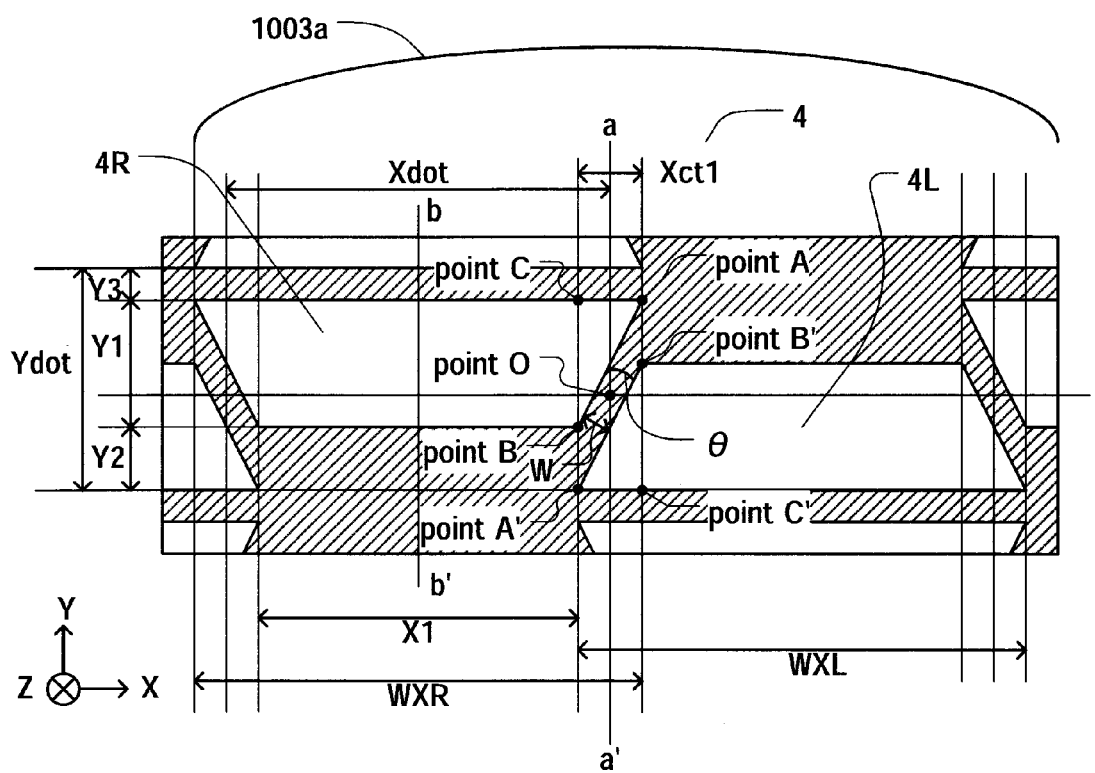
[FIG. 36] A plane view showing a pixel of a prior art three-dimensional image display apparatus.
Figure 37:
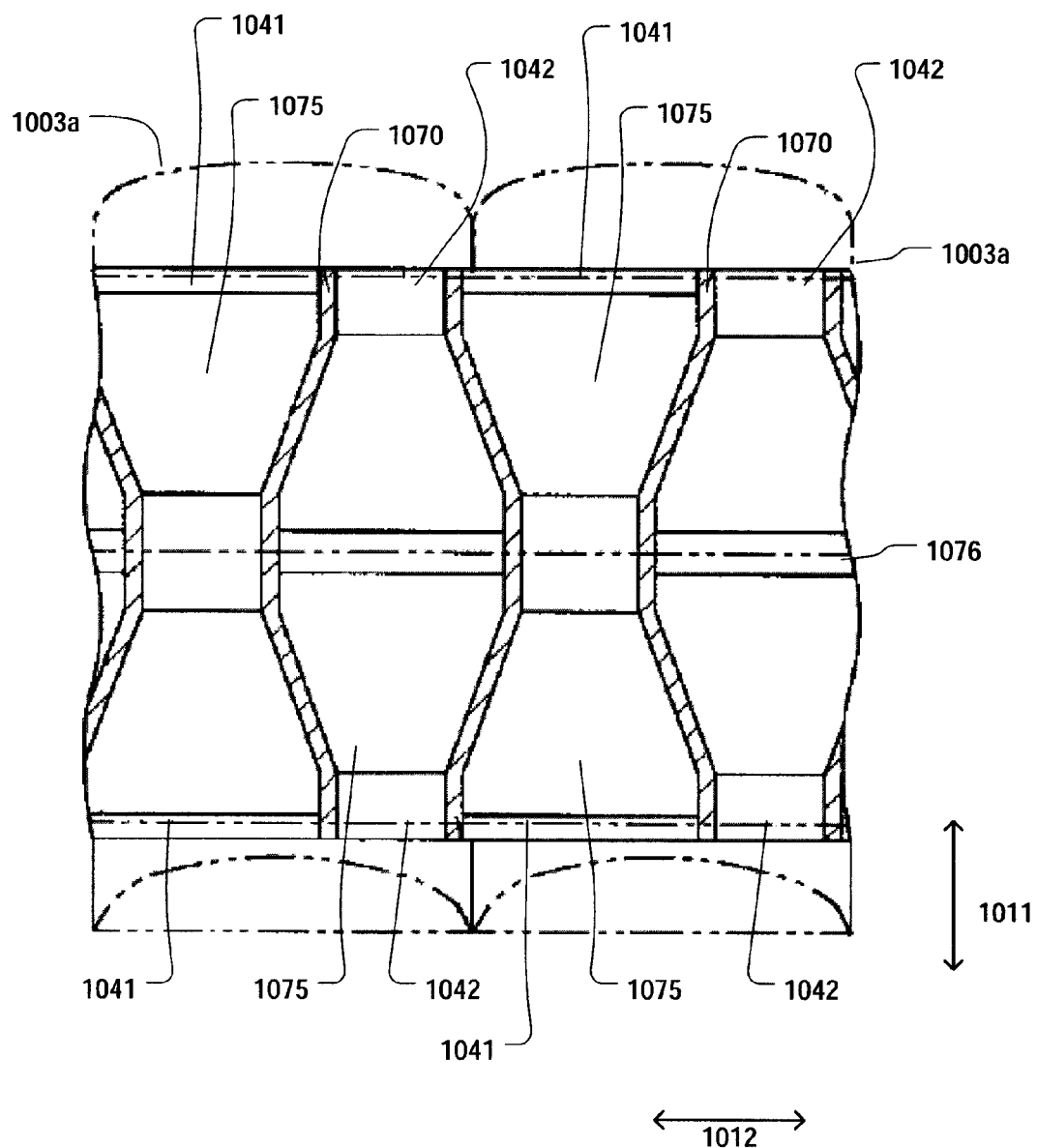
[FIG. 37] A plane view showing a pixel of a prior art three-dimensional image display apparatus.
Figure 38A:
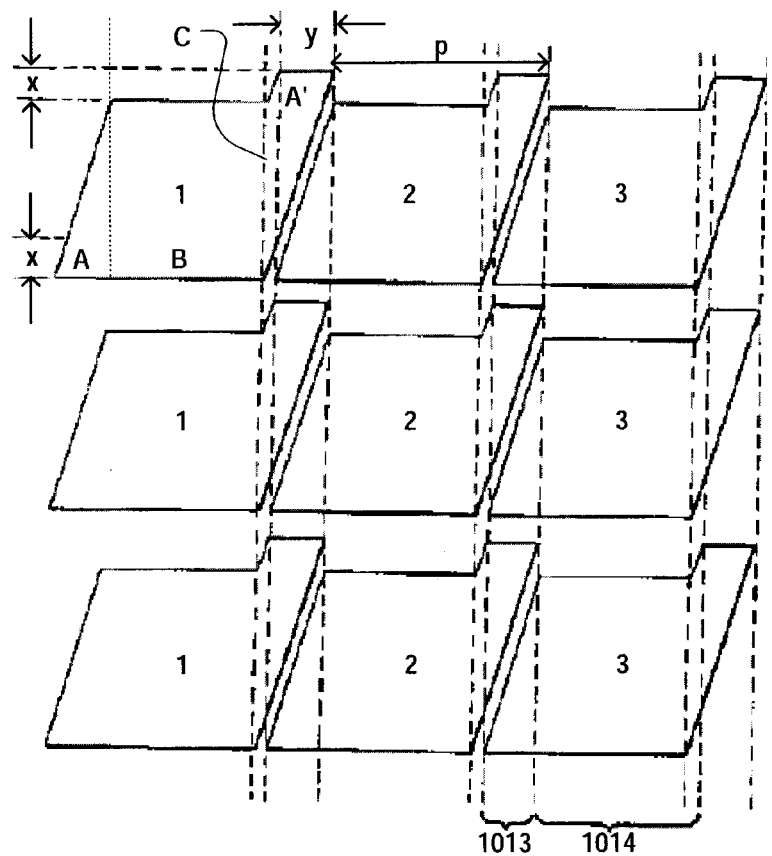
[FIG. 38] A plane view showing a pixel of a prior art three-dimensional image display apparatus.
Figure 38B:
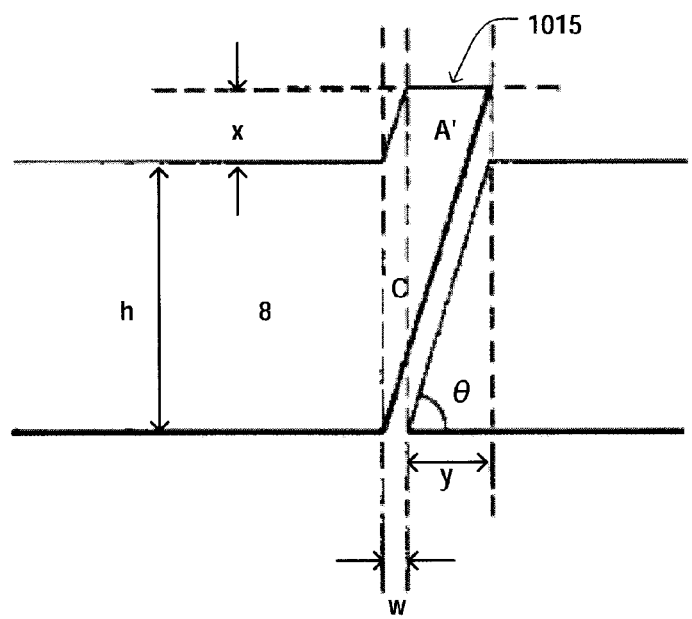

Here, the length L (A-C) of a line segment connecting the points A and C and the vertical aperture width Y1 have a relationship L (A-C)=Y1×tan $\theta$ and so do the length L (A'-C') of a line segment connecting the points A' and C' and the vertical aperture width Y1. In other words, the points A, B, and C and points A', B', and C' have the same positional relationship as the points A, B, and C and points A', B', and C' in the pixel shown in FIG. 36.

The area Sct2 of a triangle enclosed by the points A, D, and E is set so that the overlapping region width Xct2 is present and smaller than the area Sct1 of a triangle enclosed by the points A, B, and C. The same applies to the area Sct2' of a triangle enclosed by the points A', D', and E' and the area Sct1' of a triangle enclosed by the points A', B', and C'.

Assuming that the oblique wire provided on the trapezoid oblique side and having a width W has a width WX1 in the X-axis direction, WX1=W/cos $\theta$. Furthermore, assuming that the oblique wire has a width WY1 in the Y-axis direction, WY1=W/sin $\theta$.

Figure 4:
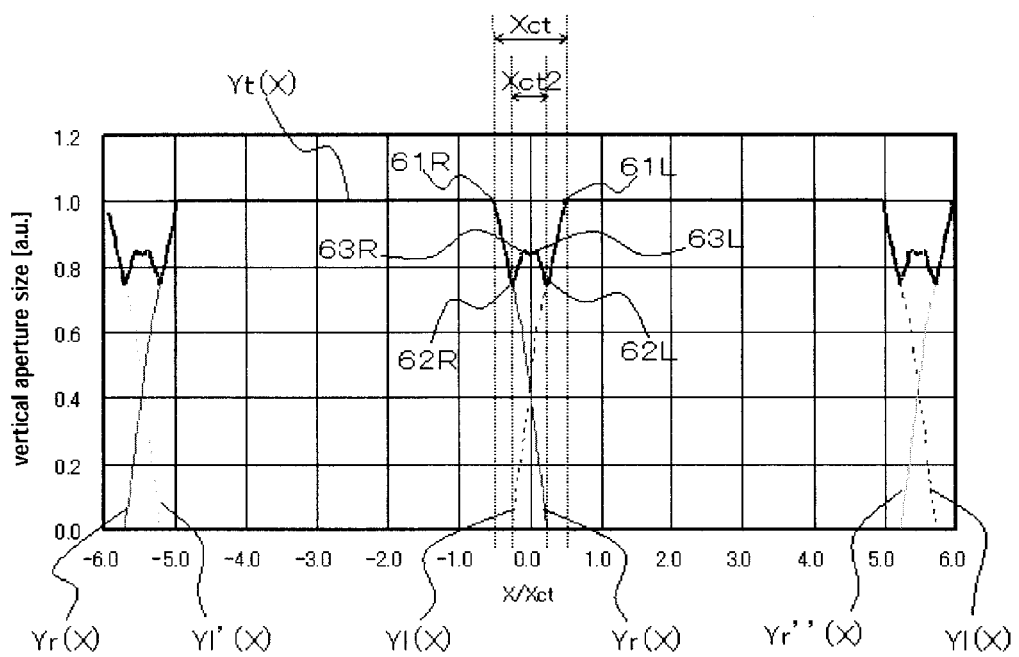
[FIG. 4] A graphical representation showing the distribution of vertical aperture width of the display panel according to Embodiment 1 of the present invention.

FIG. 4 is a graphical representation showing the distribution of vertical aperture width of the display panel 2 according to this embodiment.

The total of the vertical aperture widths of the apertures of the right-eye and left-eye pixels 4R and 4L of the display unit 4 is not constant in the X-axis direction. It fluctuates in the center part of the display unit 4, namely near the overlapping region width Xct2. The vertical aperture width decreases from the region Xct toward the center of the display unit 4, has a minimal value, and then increases toward the overlapping region width Xct2.

Flexion points 61R and 61L correspond to the points B and B' shown in FIG. 3, from which the vertical aperture width starts to decrease toward the center X/Xct=0. The distance between the flexion points 61R and 61L is Xct. On the other hand, flexion points 62R and 62L correspond to the points E and E' shown in FIG. 3, from which the vertical aperture width starts to increase toward the center X/Xct=0.

In other words, it is understood from FIG. 3 that the total of the vertical aperture widths of the sub-pixels is constant in the center part of the sub-pixels, decreases from the line segments B-C and B'-C' and increases from the points E and E' toward the center line a-a' of the display unit 4.

Conditions for the lenticular lens of the image display apparatus 1 according to this embodiment to serve as an image sorting means will be described hereafter.

Figure 5:
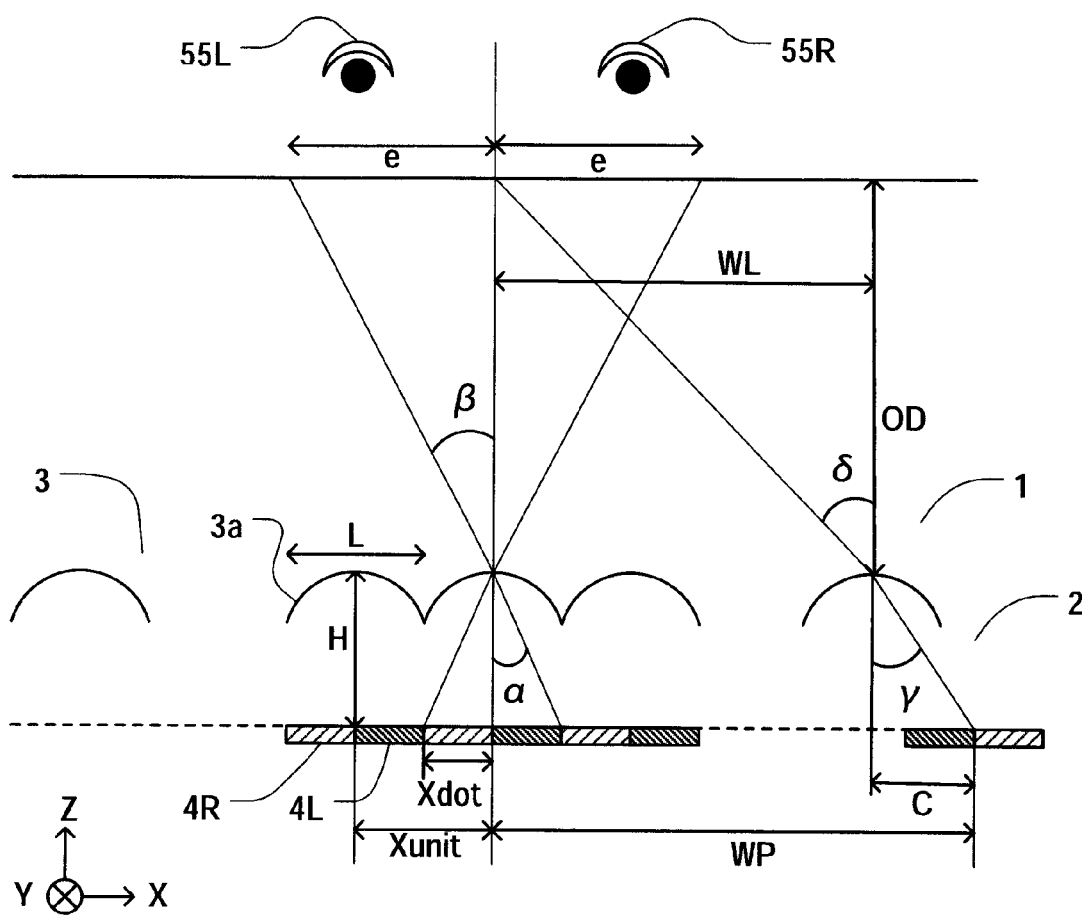
[FIG. 5] A cross-sectional view showing an optical model using a lenticular lens.

FIG. 5 is a cross-sectional view showing an optical model using a lenticular lens.

The image sorting means has to sort lights emitted from pixels in directions different from each other along the first direction in which the left-eye pixel 4L and right-eye pixel 4R are arranged, namely along the X-axis direction.

It is assumed that the distance between a principal point or vertex of the lenticular lens 3 and a pixel is H, the lenticular lens 3 has a refractive index n, and the lens pitch is L. Furthermore, the array pitch Xunit in the X-axis direction of display units 4 consisting of a left-eye pixel 4L or right-eye pixel 4R is equal to 2×Xdot.

The distance between the lenticular lens 3 and the observer is an optimum observation distance OD. With the distance OD, the pixels enlarge and project images at intervals e. In other words, images are projected from left-eye and right-eye pixels 4L and 4R at intervals e on a virtual plane that is parallel to the lens and at a distance OD from the lens. Furthermore, the distance between the center of a cylindrical lens 3a at the center of the lenticular lens 3 and the center of a cylindrical lens 3a at the end of the lenticular lens 3 in the X-axis direction is WL. The distance between the center of a pixel consisting of left-eye and right-eye pixels 4L and 4R at the center of the display panel 2 and the center of a display pixel at the end of the display panel 2 in the X-axis direction is WP. The angles of light entering and emerging from a cylindrical lens 3a at the center of the lenticular lens 3 are $\alpha$ and $\beta$, respectively. The angles of light entering and emerging from a cylindrical lens 3a at the end of the lenticular lens 3 in the X-axis direction are $\gamma$ and $\delta$, respectively. The difference between the distances WL and WP is C and there are 2m sub-pixels in the region along the distance WP.

The array pitch L of cylindrical lenses 3a and the array pitch Xdot of sub-pixels are related to each other. Therefore, the designer will determine one in accordance with the other. Generally, the lenticular lens 3 is designed in accordance with the display panel. Then, here, the array pitch Xdot of sub-pixels is treated as a constant. The refractive index n is determined by selection of the material of the lenticular lens 3. On the other hand, the distance OD between the lens and observer and the intervals e of images enlarged/projected by pixels are set to desired values. Using these values, the distance H between the lens vertex and pixel and the lens pitch L are determined. Then, the following mathematical formulae are established from Snell's law and geometric relations.

$$n \times \sin \alpha = \sin \beta \qquad \text{[Math 5]}$$

$$OD \times \tan \beta = e \qquad \text{[Math 6]}$$

$$H \times \tan \alpha = X\text{dot} \qquad \text{[Math 7]}$$

$$n \times \sin \gamma = \sin \delta \qquad \text{[Math 8]}$$

$$H \times \tan \gamma = C \qquad \text{[Math 9]}$$

$$OD \times \tan \delta = WL \qquad \text{[Math 10]}$$

$$WP - WL = C \qquad \text{[Math 11]}$$

$$WP = 2 \times m \times X\text{dot} \qquad \text{[Math 12]}$$

$$WL = m \times L \qquad \text{[Math 13]}$$

Here, when the image sorting effect is maximized is discussed. The image sorting effect is maximized when the distance H between the vertex of the lenticular lens 3 and the pixel is equal to the focal length f of the lenticular lens 3. Assuming that the lens has a radius of curvature r, the radius of curvature r is obtained by the following mathematical formula.

$$f = H \qquad \text{[Math 14]}$$

$$r = H \times (n-1)/n \qquad \text{[Math 15]}$$

The above parameters are summarized as follows. The array pitch Xdot of sub-pixels is determined in accordance with the display panel 2. The observation distance OD and interval e of images enlarged/projected by pixels are determined in accordance with settings of the image display apparatus. The refractive index n is determined by the material of the lens.

The lens array pitch L derived from the above and the distance H between the lens and pixel are parameters for determining the position at which light from pixels is projected on the observation plane. The radius of curvature r of the lens is a parameter changing the image sorting effect. In other words, when the distance H between the lens and pixel is constant and the radius of curvature r is deviated from the ideal state, images from right and left pixels are blurred and not clearly separated.

Therefore, in order to maximize the image sorting effect, the radius of curvature r is set between the maximum and minimum values with which images are effectively separated.

Figure 6:
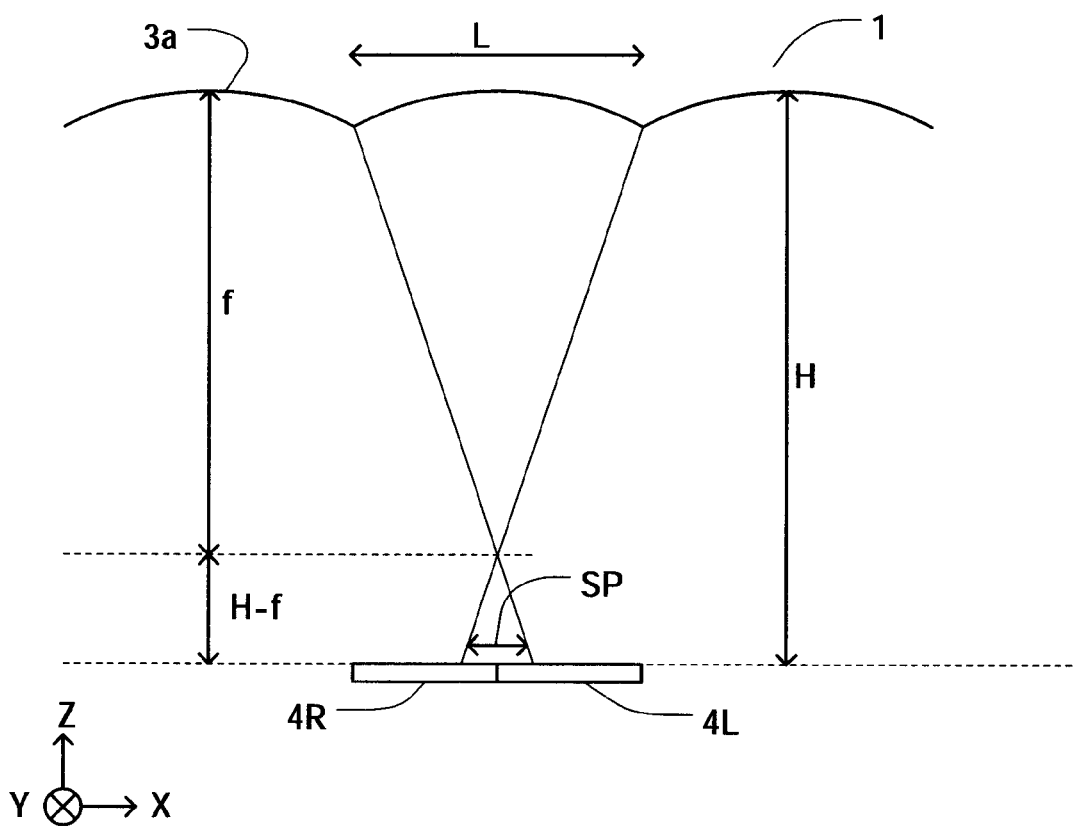
[FIG. 6] An illustration showing an optical mode of the minimum radius of curvature for calculating image separation conditions of the lenticular lens.

First, the minimum value of the radius of curvature with which the lens has separation effect is calculated. FIG. 6 is an illustration showing an optical model of the minimum radius of curvature for calculating the image separation conditions of the lenticular lens.

In order for images to be separated, a triangle having a base given by the lens pitch L and a height given by the focal length f and a triangle having a base given by the width SP allowing for effective separation and a height H-f must be homologous. If so, the following mathematical formula is established and the minimum focal length value fmin can be obtained.

$$f\min = H \times L/(L+SP) \qquad \text{[Math 16]}$$

Then, the radius of curvature r is calculated from the focal length. Using the mathematical formulae 14 and 15, the minimum value rmin of the radius of curvature r can be obtained from the following mathematical formula.

$$r\min = H \times L \times (n-1)/(L+SP)/n \qquad \text{[Math 17]}$$

Figure 7:
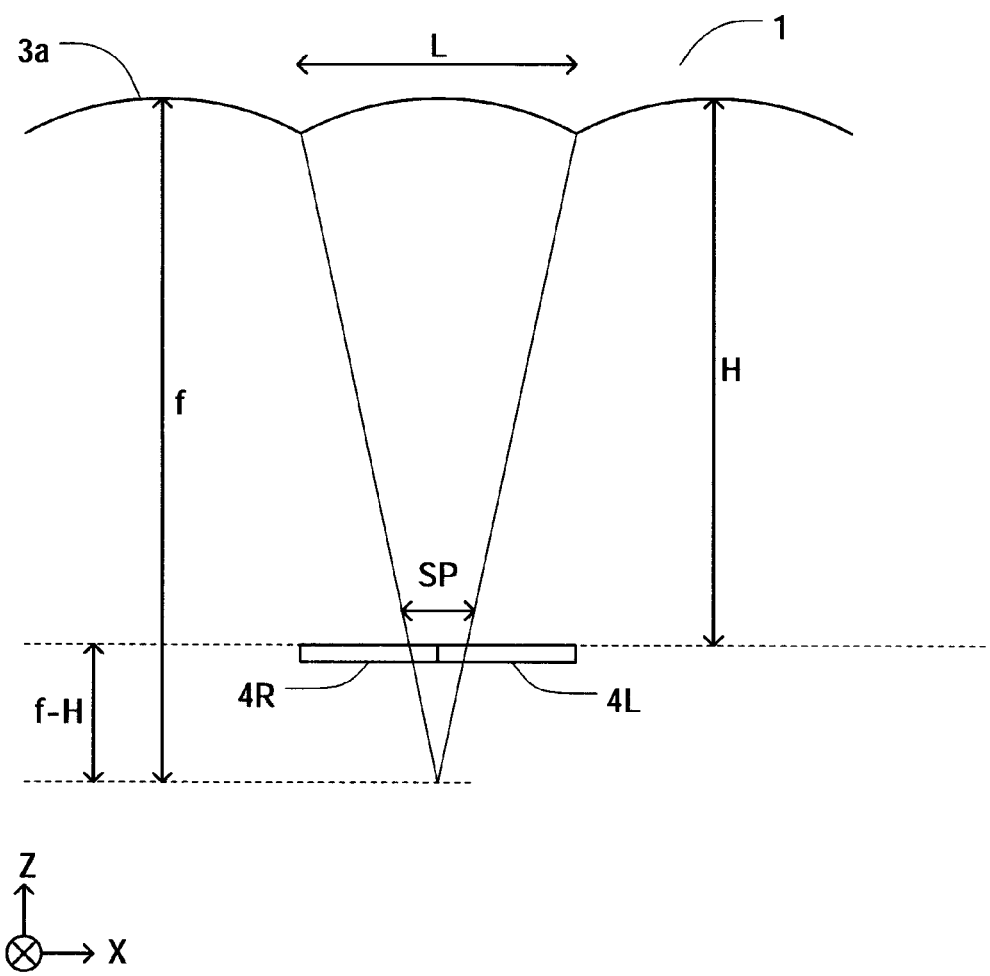
[FIG. 7] An illustration showing an optical mode of the maximum radius of curvature for calculating image separation conditions of the lenticular lens.

Next, the maximum value of the radius of curvature r with which the lens has separation effect is calculated. FIG. 7 is an illustration showing an optical model of the maximum radius of curvature for calculating the image separation conditions of the lenticular lens.

In order for images to be separated, a triangle having a base given by the lens pitch L and a height given by the focal length f and a triangle having a base given by the width SP allowing for effective separation and a height H-f must be homologous. If so, the following mathematical formula is established and the maximum focal length value fmax can be obtained.

$$f\max = H \times L/(L-SP) \qquad \text{[Math 18]}$$

Then, the radius of curvature r is calculated from the focal length. Using the mathematical formulae 14 and 15, the maximum value rmax of the radius of curvature can be obtained from the following mathematical formula.

$$r\max = H \times L \times (n-1)/(L-SP)/n \qquad \text{[Math 19]}$$

In summary, in order for a lens to have the image sorting effect, the lens has to have a radius of curvature between the minimum and maximum values presented by the mathematical formulae obtained above. The range in which the radius of curvature r of a lens should be can be obtained using the following mathematical formula.

$$H \times L \times (n-1)/(L+SP)/n \leq r \leq H \times L \times (n-1)/(L-SP)/n \qquad \text{[Math 20]}$$

In the above explanation, the image display apparatus 1 of two observing points having a left-eye pixel 4L and a right-eye pixel 4R is described. The present invention is not restricted thereto. For example, the present invention is similarly applicable to an image display apparatus of N observing points. In such a case, N×m pixels are included in the region along the above-described distance WP.

Here, the width in the X-axis direction of a region in which blurring occurs according to the effective width of the above separation effect (SP in FIGS. 6 and 7) is termed "the spot diameter." In this structure, as the spot diameter is reduced, fluctuation in the vertical aperture at the boundary between right and left pixels is enhanced. Then, the present invention shifts the focal point of the lens from the pixel plane as shown in FIGS. 6 and 7 so that local fluctuation in luminance of the vertical aperture is effectively reduced for higher image quality.

As described above, the technique of shifting the focal point of the lens from the pixel plane to establish a blurring region for higher image quality will be termed "defocusing effect" hereafter.

Behavior of the image display apparatus 1 according to this embodiment will be described hereafter.

Figure 8:
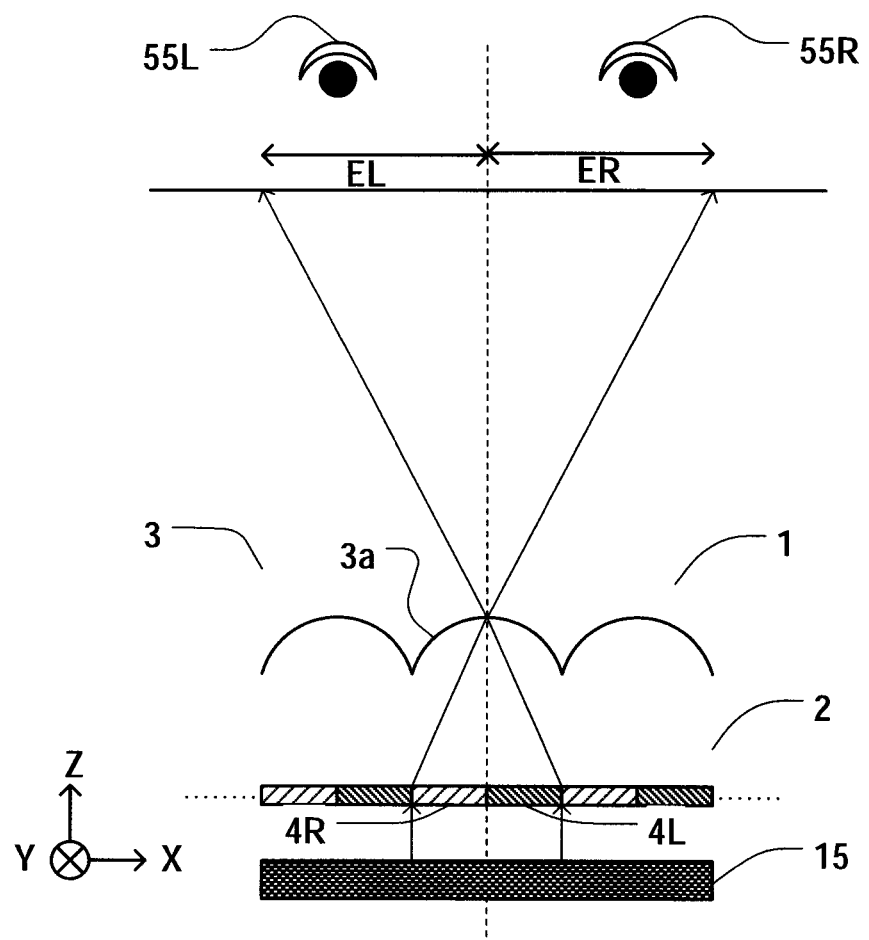
[FIG. 8] A cross-sectional view showing the behavior of the image display apparatus according to Embodiment 1 of the present invention.

FIG. 8 is an illustration showing an optical model using the image display apparatus 1 according to this embodiment.

As a backlight 15 emits light, the light emitted from the backlight 15 enters the display panel 2. On the other hand, the display panel 2 is driven by a control device (not shown) and the left-eye and right-eye pixels 4L and 4R display left-eye and right-eye images, respectively. Here, the left-eye and right-eye images are parallax images forming a three-dimensional image.

Light entering the left-eye and right-eye pixels 4L and 4R of the display panel 2 is transmitted through the apertures of these pixels, refracted by the lenticular lens 3, and directed toward regions EL and ER.

Here, the observer places his/her left eye 55L in the region EL and his/her right eye 55R in the region ER, whereby the observer can view the left-eye image with the left eye and the right-eye image with the right eye. In this way, the observer can view a three-dimensional image.

A method of assessing 3D moire and 3D crosstalk in this specification will be described hereafter with reference to a graphical representation.

Figure 9:
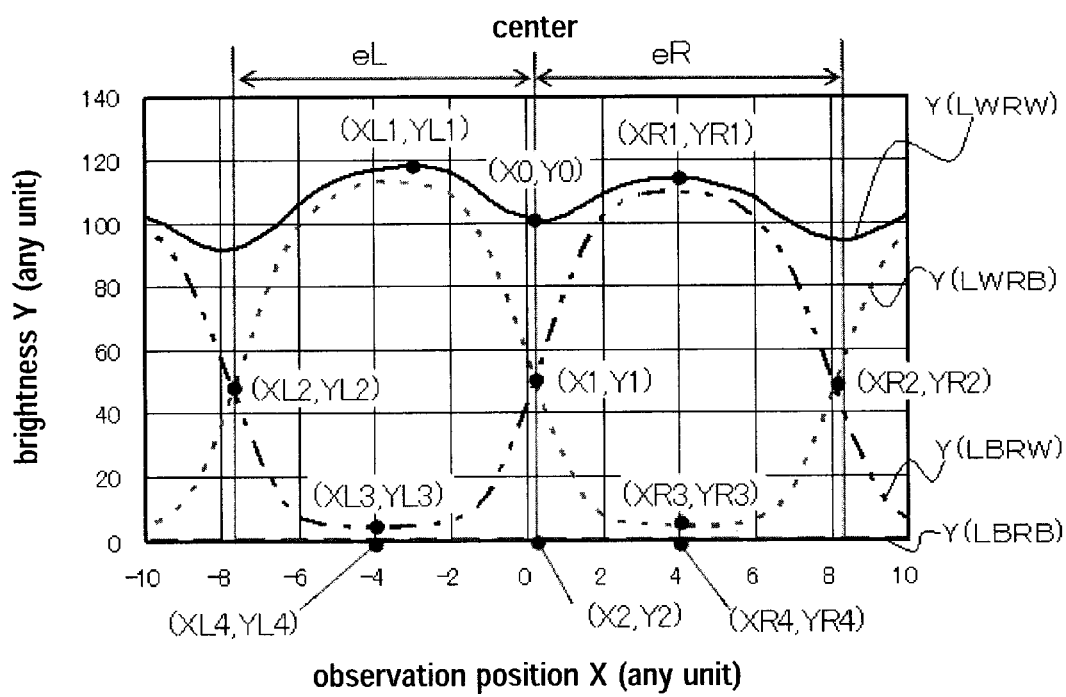
[FIG. 9] A graphical representation showing an exemplary distribution of luminance in the image display apparatus according to Embodiment 1 of the present invention.

FIG. 9 is a graphical representation showing an exemplary distribution of luminance in the image display apparatus of the present invention.

The observation position X on the abscissa indicates the observation position of the observer in the image separation direction. The position 0 is where the midpoint between the two eyes of the observer is on a line vertically extended from the center of the display plane. Brightness Y is plotted as ordinate.

The distribution of luminance corresponding to an image output to the left-eye appears on the −X side of the observer's position and the distribution of luminance corresponding to an image output to the right-eye appears on the +X side.

The dotted lines present the distribution of luminance when an image is output to only one of the right-eye and left-eye pixels 4R and 4L. Y (LBRW) presents the distribution of luminance measured when the right pixel displays white and the left pixel displays black. Y (LWRB) presents the distribution of luminance measured when the right pixel displays black and the left pixel displays white. Furthermore, a bold line Y (LWRW) presents the distribution of luminance measured when the two pixels display the same image (the right pixel displays white and the left pixel displays white). Y (LBRB) presents the distribution of luminance measured when the two pixels display black.

The sum of the distributions of luminance Y (LBRW) and Y (LWRB) shown by the dotted lines at each observing point is equal to the distribution of luminance Y (LWRW) presented by the bold line and the following formula is established.

$$Y(LBRW)+Y(LWRB)=Y(LWRW) \quad \text{[Math 21]}$$

The distributions of luminance Y (LBRW) and Y (LWRB) intersect at a point (X1, Y1) at the observation position right in front, namely near X=0. On the other hand, they intersect at a point (XR2, YR2) on the +X side and at a point (XL2, YL2) on the −X side. The distance between the points (X1, Y1) and (XR2, YR2) in the X-axis direction is equal to the width eR of a projected right-eye image. The distance between the points (X1, Y1) and (XL2, YL2) in the X-axis direction is equal to the width eL of a projected left-eye image.

Reduction in luminance near the point (X0, Y0) is caused by the shielding part at the boundary between sub-pixels adjacent to each other in the X-axis direction. This reduction in luminance appears as 3D moire and $\Delta Yc$ and $\Delta Y/\Delta X$, which will be described later, are used as indices of 3D moire assessment in this specification.

A point (XL1, YL1) is where the luminance has the maximum value in the width eL of the projected left-eye image. A point (XR1, YR1) is where the luminance has the maximum value in the width eR of the projected right-eye image. The point (X0, Y0) is the minimum value of the distribution of luminance near the boundary between the width eL of the projected left-eye image and the width eR of the projected right-eye image. The 3D moire can be expressed by the following mathematical formulae from the ratio of the average luminance value of the points (XL1, YL1) and (XR1, YR2) to the point (X0, Y0).

$$YC=(YL1+YR1)/2 \quad \text{[Math 22]}$$

$$\Delta Yc=(YC-Y0)/YC \quad \text{[Math 23]}$$

$$\Delta Y/\Delta X=\Delta Yc/(XR1-XL1) \quad \text{[Math 24]}$$

Furthermore, the left-eye image mixes in the width eR of the projected right-eye image and the right-eye image mixes in the width eL of the projected left-eye image. This is 3D crosstalk. The 3D crosstalk in the +X region can be presented by the following mathematical formula.

$$3DCT(X)=(Y(LBRW)-Y(LBRB))/(Y(LWRB)-Y(LBRB)) \quad \text{[Math 25]}$$

On the other hand, the 3D crosstalk in the −X region can be presented by the following mathematical formula.

$$3DCT(X)=(Y(LWRB)-Y(LBRB))/(Y(LBRW)-Y(LBRB)) \quad \text{[Math 26]}$$

Defined by the above mathematical formulae, 3D crosstalk 3DCT (X) is maximized at the points (X1, Y1), (XL2, YL2) and (XR2, YR2) and reaches a value of 100%. On the other hand, the distributions of luminance Y (LWRB) and Y (LBRW) have the minimum values at points (XL3, YL3) and (XR3, YR3) and 3D crosstalk has a minimum value 3DCTmin. The minimum 3D crosstalk value 3Dmin is defined by the following mathematical formula and used as an index of assessment.

$$3DCTmin=(YL3-YL4+YR3-YR4)/(2\times(Y1-Y2)) \quad \text{[Math 27]}$$

Figure 10:
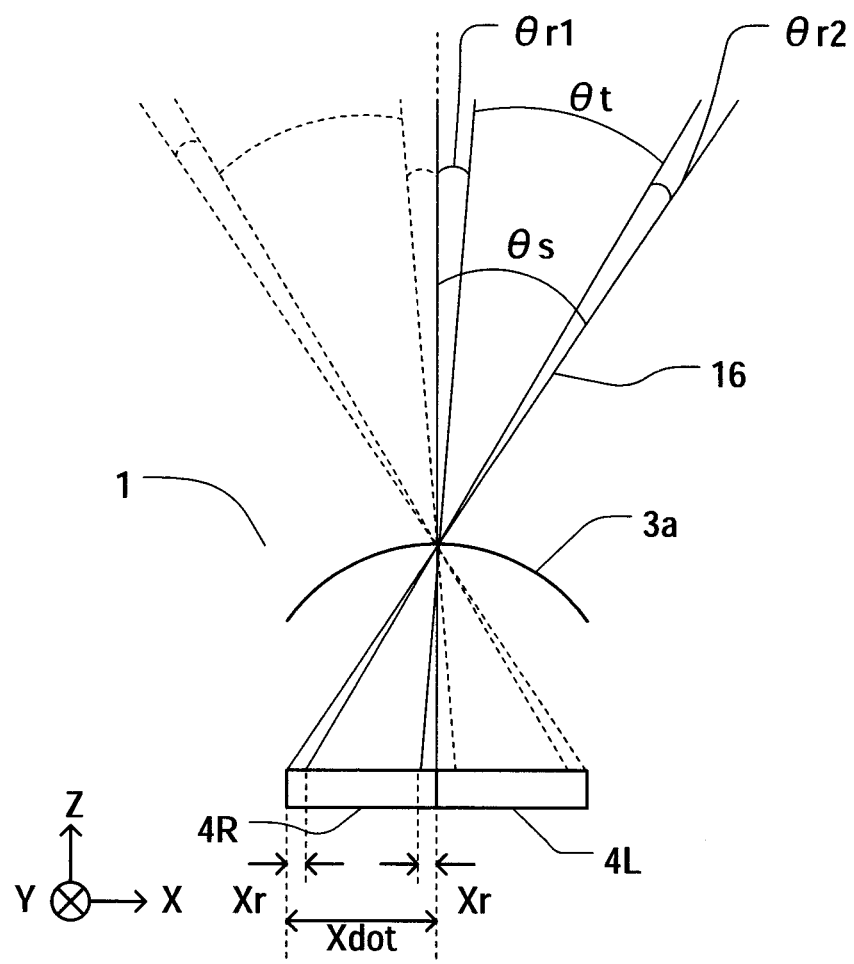
[FIG. 10] A schematic illustration showing the relationship between the direction of light emitted from a pixel of the display panel according to Embodiment 1 of the present invention and 3D crosstalk.

The relationship between 3D crosstalk 3DCT (X) and the spot diameter SP will be described hereafter. FIG. 10 is a schematic illustration showing the relationship between the direction of light emitted from sub-pixels and 3D crosstalk.

An angular range $\theta s$ corresponds to the right-eye observation width eR in FIG. 9, namely to (XR2−X1). Of the angular range $\theta s$, 3D crosstalk is low in an angular range $\theta t$ and the observer can view stable three-dimensional display. On the other hand, 3D crosstalk is high in angular ranges $\theta r1$ and $\theta r2$ and the observer may experience discomfort in observation.

The angular range $\theta t$ in which excellent three-dimensional effect is obtained is formed by light emitted from a region near the center of a sub-pixel. Therefore, there is less influence from the sub-pixels adjacent in the X-axis direction and influence of 3D crosstalk is low. On the other hand, the angular ranges $\theta r1$ and $\theta r2$ are formed by light emitted from the ends of a sub-pixel. Therefore, light mixing in from the sub-pixels adjacent in the X-axis direction increases influence of 3D crosstalk. Consequently, the observer cannot have excellent three-dimensional effect. Here, 3D crosstalk continuously increases from the angular range θs to the angular range θr1 while fluctuating, and the three-dimensional image quality drops. Similarly, 3D crosstalk continuously increases from the angular range θs to the angular range θr2 while fluctuating, and the three-dimensional image quality drops. Then, 3D crosstalk reaches 100% near the centers of the angular ranges θr1 and θr2. Here, generally, θr1 and θr2 are nearly equal.

Assuming that the distance between the center of the spot diameter SP and the center line of the display unit 4 is Xr, the ratio of the distance Xr to the sub-pixel pitch Xdot corresponds to the relation of the angular range θr (θr1 or θr2) to the angular range θs of the three-dimensional observation range angle. The following mathematical formula is established.

$$(\theta s - 2 \times \theta r)/\theta s = (X\text{dot} - 2 \times Xr)/X\text{dot} \quad [\text{Math 28}]$$

Figure 11:
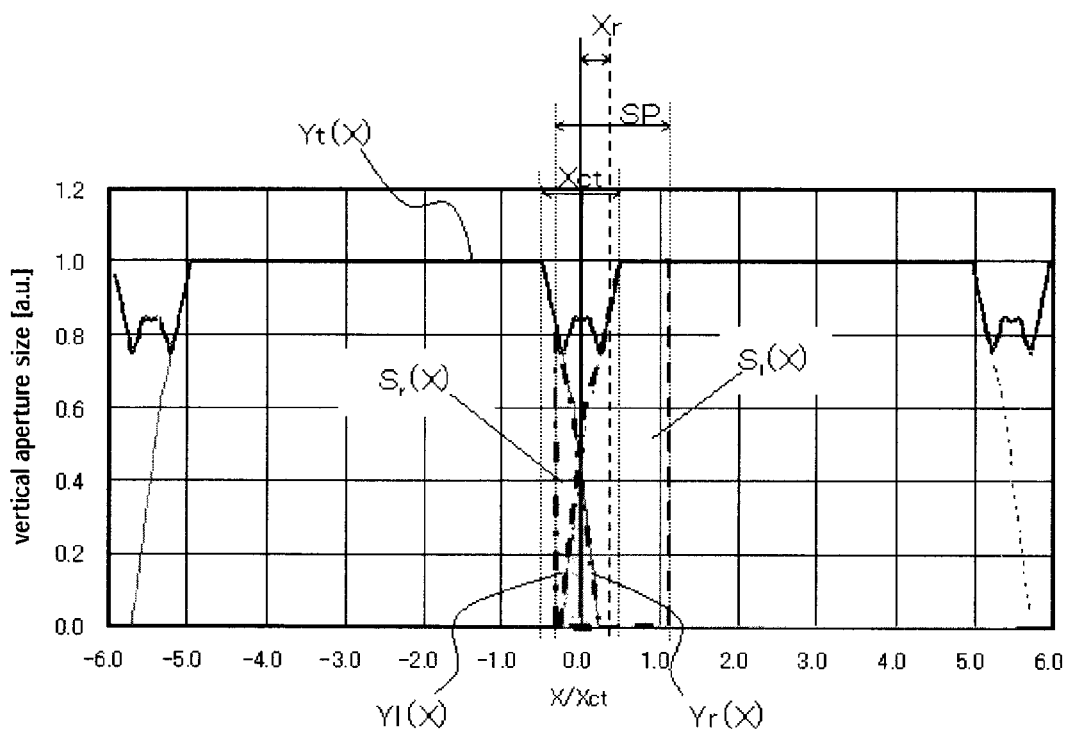
[FIG. 11] A graphical representation showing the relationship between the distribution of vertical aperture width of a pixel and the spot diameter.

FIG. 11 is a graphical representation showing the relationship between the distribution of vertical aperture width of a pixel and the spot diameter.

When the spot diameter SP of the cylindrical lens 3*a* is set in accordance with the distribution of vertical aperture width, 3D crosstalk can analytically be obtained by calculating the area ratio between the area Sl (X) to which the aperture of the left-eye pixel 4L contributes and the area Sr (X) to which the aperture region of the right-eye pixel 4R contributes. Assuming that the distance between the center line of the display unit 4 and the center of the spot diameter SP in the X-axis direction is Xr, the following mathematical formula is established.

$$3DCT(Xr) = Sr(Xr)/Sl(Xr) \quad [\text{Math 29}]$$

It is understood from the above mathematical formula that as the spot diameter SP is increased with 3DCT (Xr) maintained constant, the distance Xr between the center line of the display unit 4 and the center of the spot diameter SP is accordingly increased.

Then, from the mathematical formulae 28 and 29, the distance Xr between the center line of the display unit 4 and the center of the spot diameter SP is increased as the spot diameter SP is increased. Therefore, the three-dimensional observation range width in which 3D crosstalk is equal to or lower than 3DCT (x) is diminished.

If 3D crosstalk is equal to or lower than a given value, the observer does not experience subjective discomfort. Therefore, it is desirable that the angular range in which 3D crosstalk is equal to or lower than a given value is as large as possible.

By the way, 3D crosstalk can be measured by, for example, a conoscope, goniometer, or Fourier system. A measuring device having such a system can measure the distribution of luminance with respect to view field angles and 3D crosstalk can be calculated by a method described later. There is no major difference in qualitative results from any measuring device; however, quantitative numeric values vary depending on measuring systems and device specifications.

In this specification, measurement results from a Fourier system, EZ Contrast XL 88 (ex. ELDIM), are used. Comparison between such measurement results and the results of subjective three-dimensional observation range assessment by observers (the subjective assessment, hereafter) confirmed that the angular range in which 3D crosstalk is equal to or lower than 7.5% almost matches the subjective three-dimensional observation range. Therefore, it is desirable that 3D crosstalk is equal to or lower than 7.5% and, in this specification, the three-dimensional observation range is defined as the angular range in which 3D crosstalk is equal to or lower than this value.

Figure 17:
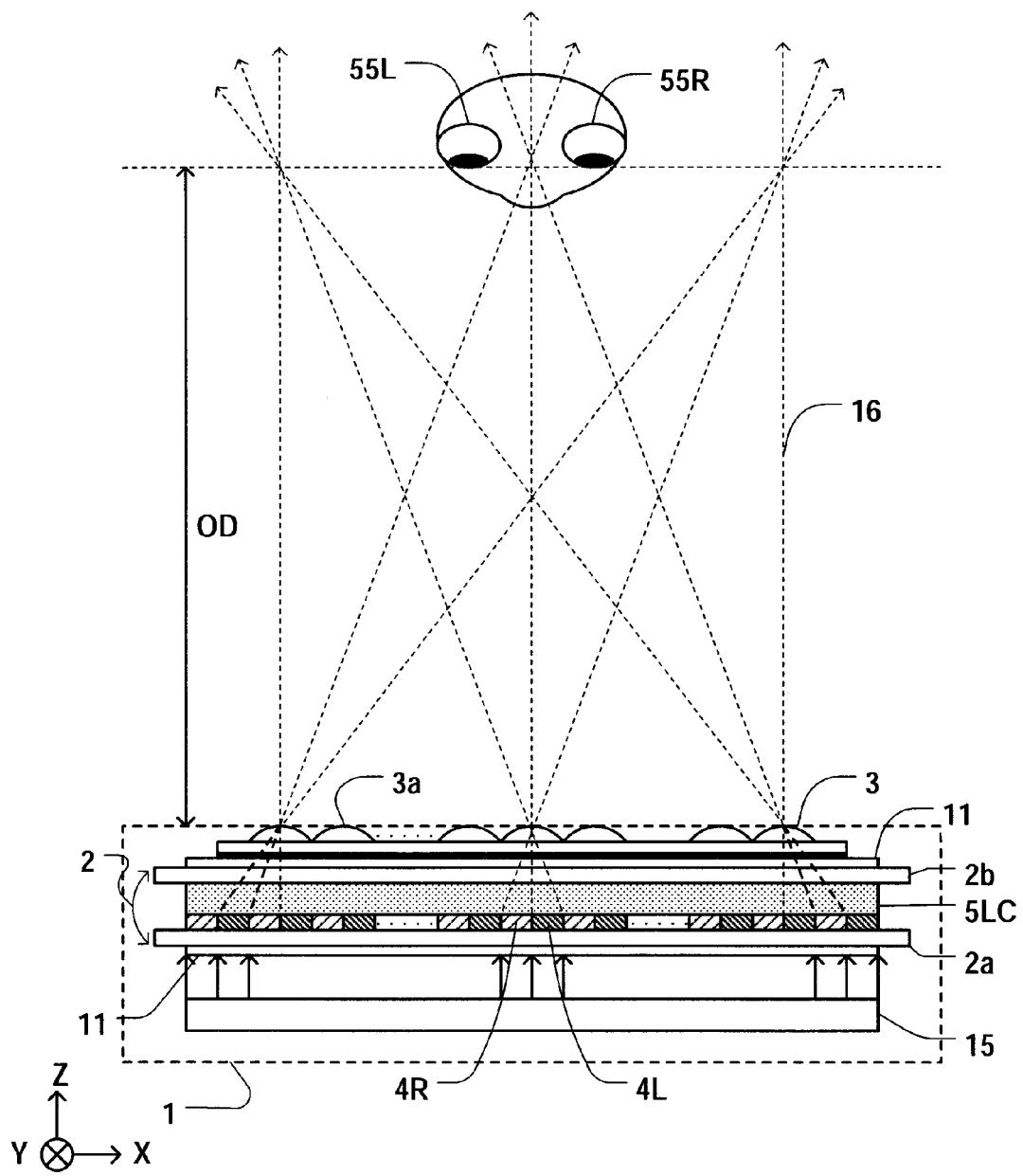
[FIG. 17] A conceptual illustration showing the light collection of the image display apparatus according to the embodiment.

In the subjective assessment, the observer observed a three-dimensional image with the head fixed within the three-dimensional observation range as shown in FIG. 17 or with the head shifted outside the three-dimensional observation range. Subjective discomfort experienced by multiple observers was recorded according to the criteria. In other words, the average "visible quality" was recorded.

Furthermore, as shown in the figure, the region to which a left-eye image is output and the region to which a right-eye image is output are formed by optically separating light emitted from each pixel and deflecting the light as shown by light beams 16. The three-dimensional observation range can be obtained by the relationship between such regions and the distance between the right and left eyes 55R and 55L. The three-dimensional visibility at the boundary between right and left images in the above three-dimensional observation range is deteriorated under the influence of 3D crosstalk. Therefore, the region in which 3D moire and 3D crosstalk are equal to or lower than given values can be defined as the three-dimensional visible range or three-dimensional observation range.

In this specification, as described above, an EZ Contrast is used to obtain measurements of the image display apparatus. This is not restrictive and any measuring device capable of measuring the distribution of luminance in angular directions can be used. In such a case, it is desirable that comparison is made with subjective three-dimensional observation range results from observers and a given value of 3D crosstalk is determined for the measuring device.

Effects of the image display apparatus 1 according to this embodiment will be described hereafter.

Figure 12A:
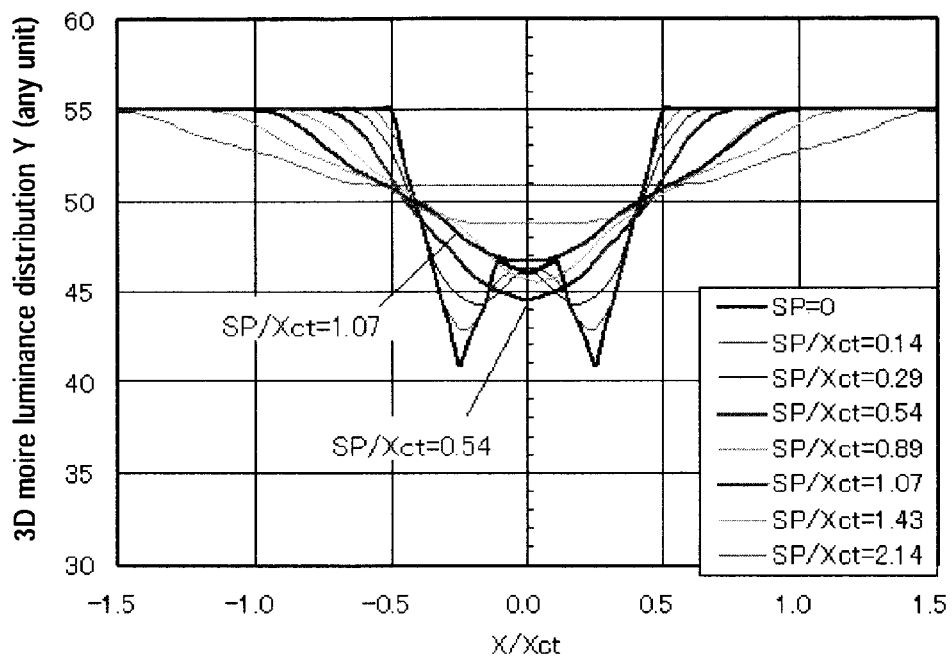
[FIG. 12] A graphical representation showing the relationship between the distribution of brightness in the X-axis direction and the spot diameter SP in a pixel of the display panel according to Embodiment 1 of the present invention (A) and a graphical representation showing a part thereof (B)
Figure 12B:
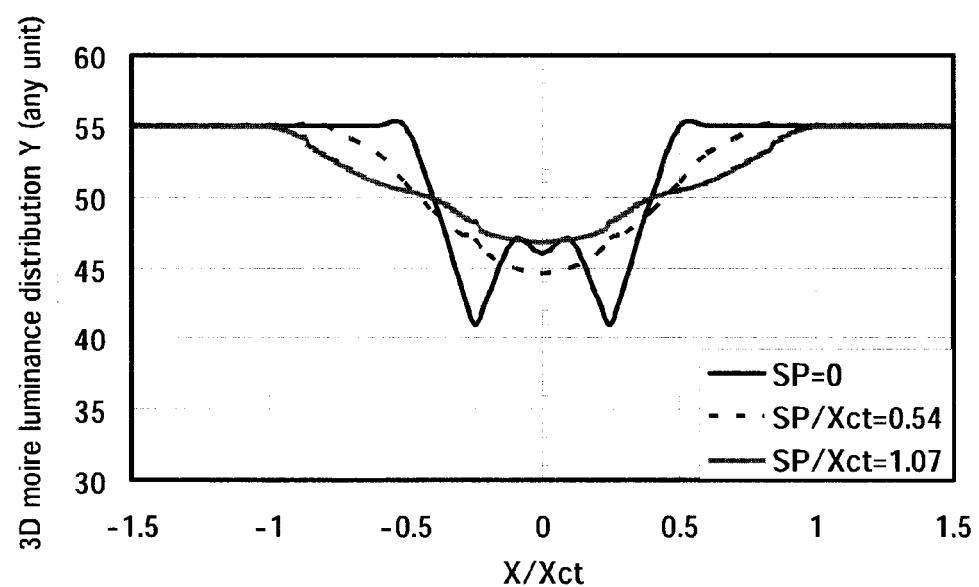
Figures 13A, 13B:
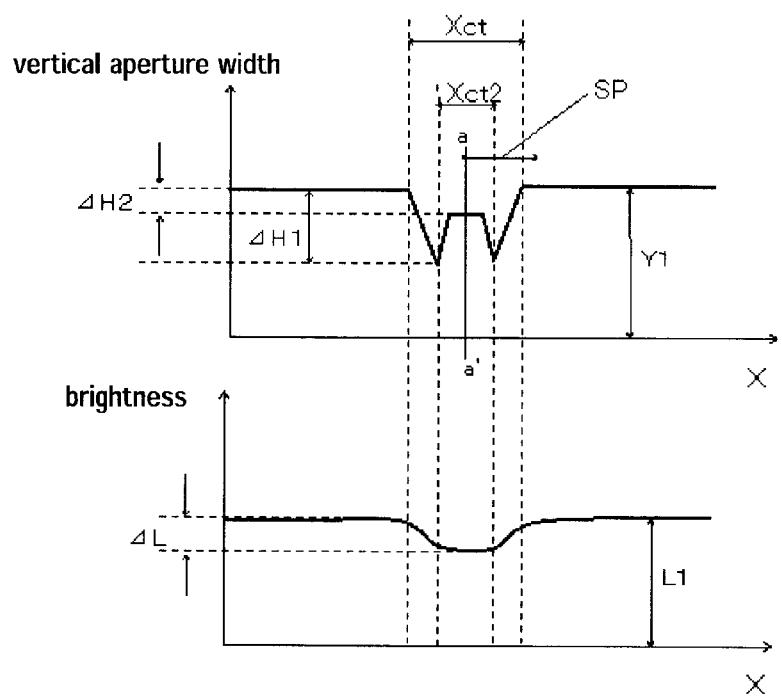
[FIG. 13] A schematic chart showing the distribution of vertical aperture width (A) and the distribution of brightness (B) in a pixel of the display panel according to Embodiment 1 of the present invention.

FIG. 12 (A) is a graphical representation showing the relationship between the distribution of luminance in the X-axis direction of a pixel according to this embodiment and the spot diameter SP. FIG. 12 (B) is a graphical representation showing a part of FIG. 12 (A). FIG. 13 (A) is a graphical representation showing the distribution of vertical aperture width of a pixel according to this embodiment and FIG. 13 (B) is a graphical representation showing the distribution of brightness.

As shown in FIG. 12 (A), the pixel according to this embodiment has a gentle distribution of luminance as the spot diameter SP is increased because of augmented defocusing effect. As the spot diameter SP becomes larger than Xct/2, two separate minimal values near the overlapping region are combined into one minimal value. The fluctuation of the distribution of brightness in the X-axis direction is reduced (FIG. 12 (B), see SP/Xct=0.54). Consequently, 3D moire becomes less visible. Here, the following mathematical formula is established from FIG. 13.

$$\Delta H2/Y1 < \Delta L/L1 < \Delta H1/Y1 \quad [\text{Math 30}]$$

Furthermore, as the spot diameter SP becomes larger than Xct, the brightness at the center X/Xct=0 is improved compared with when the spot diameter Sp is larger than Xct/2 (FIG. 12 (B), see SP/Xct=1.07). Consequently, the fluctuation of brightness in the X-axis direction is reduced and the brightness in the center part is improved, whereby 3D moire becomes much less visible. Here, the following mathematical formula is established from FIG. 13.

$$\Delta L/L1 < \Delta H2/Y1 \quad [\text{Math 31}]$$

Figure 14:
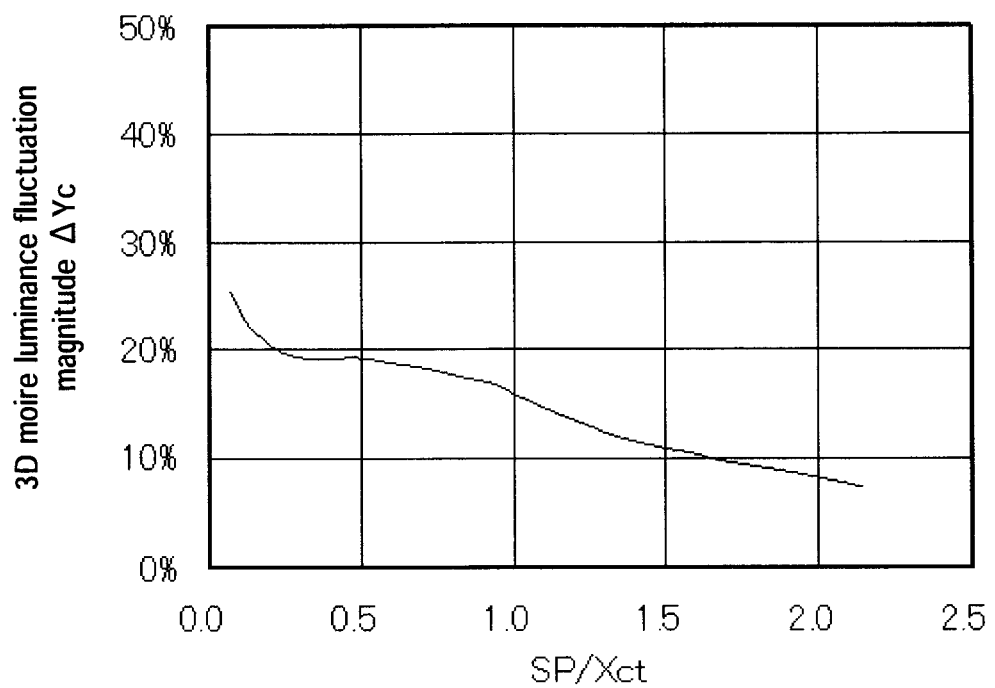
[FIG. 14] A graphical representation showing the relationship between the spot diameter SP and 3D moire in a pixel of the display panel according to Embodiment 1 of the present invention.
Figure 15:
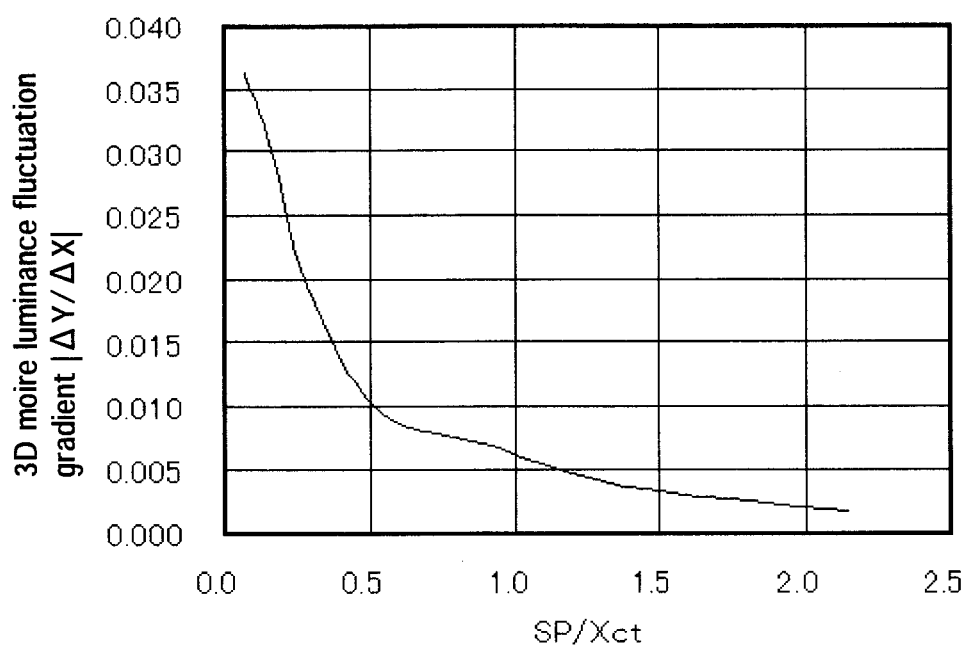
[FIG. 15] A graphical representation showing the relationship between the spot diameter SP and the gradient of change in luminance $\Delta Y/\Delta X$ in a pixel of the display panel according to Embodiment 1 of the present invention.

FIG. 14 is a graphical representation showing the relationship between the spot diameter SP and the magnitude of luminance fluctuation $\Delta Yc$ in a pixel according to this embodiment. FIG. 15 is a graphical representation showing the relationship between the spot diameter SP and the gradient of luminance change $\Delta Y/\Delta X$ in a pixel according to this embodiment.

As shown in the figures, when the spot diameter is equal to or larger than Xct/2 as in the above, defocusing effect effectively occurs and acute luminance change is leveled off. Furthermore, for example, when the spot diameter SP is small, acute luminance change before reaching a change rate $\Delta H1/Y1$ corresponding to the distribution of vertical aperture width is easily recognized as 3D moire, giving the observer discomfort. However, even in such a case, the region in the display center part where the vertical aperture width is increased effectively levels off the distribution of luminance, whereby 3D moire becomes less visible.

Figure 16:
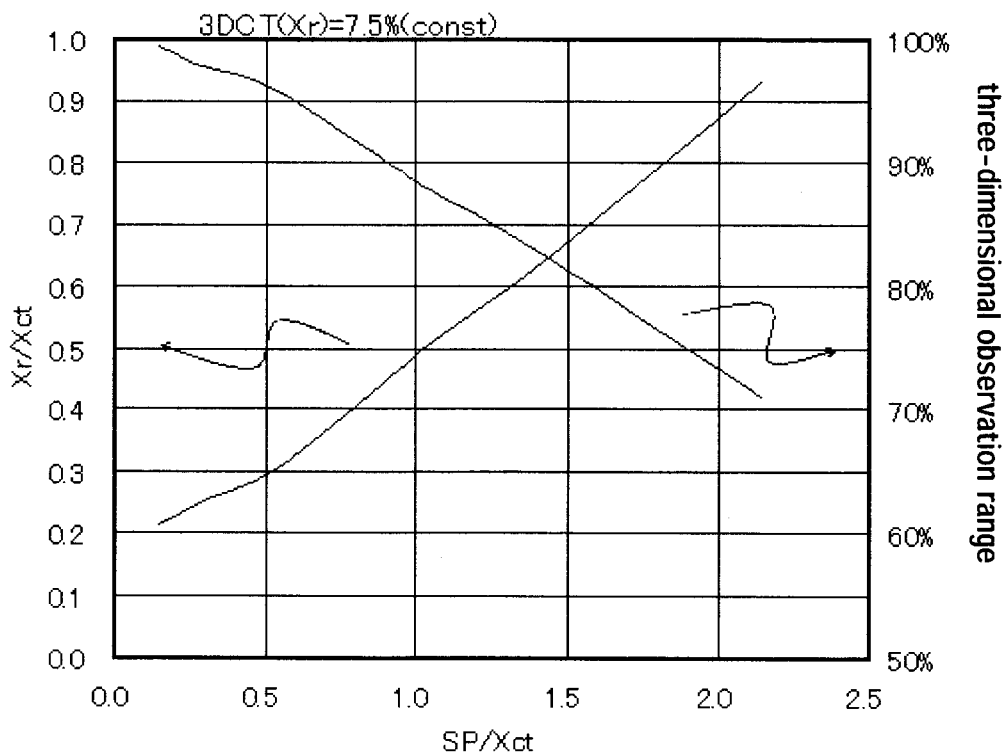
[FIG. 16] A graphical representation showing the relationship between the spot diameter SP in a pixel of the display panel according to Embodiment 1 of the present invention and the three-dimensional observation range.

FIG. 16 is a graphical representation showing the relationship between the spot diameter SP in a pixel according to this embodiment and the three-dimensional observation range.

As described above, from the subjective assessment results, the region in which 3D crosstalk is equal to or lower than 7.5% is the three-dimensional observation range. Using the spot diameter SP giving 3DCT (Xr)=7.5%, the distance Xr between the center line of the display unit and the center of the spot diameter is calculated, whereby the fluctuation rate of the three-dimensional observation range width can be estimated. As shown in the figure, when the spot diameter SP is 2×Xct, 70% or more of the three-dimensional observation range is ensured. Furthermore, as described above, when the spot diameter SP is larger than Xct/2, $|\Delta Y/\Delta X|$ is sufficiently small, whereby 3D moire becomes less visible and the three-dimensional observation range is sufficiently ensured. Therefore, in order to obtain excellent three-dimensional display properties balancing 3D moire and 3D crosstalk in a stable manner, the spot diameter SP can be set within the range given by the following mathematical formula.

$$0.5 \times Xct < SP < 2 \times Xct \quad \text{[Math 32]}$$

Furthermore, when the spot diameter SP is Xct/4, $\Delta Yc=20\%$ and $\Delta Y/\Delta X=0.03$ from FIGS. 14 and 15. Even in such a case, the subjective assessment results confirmed that the three-dimensional display properties are subjectively acceptable. Therefore, even if the spot diameter SP is set within the range given by the following mathematical formula, excellent three-dimensional display properties can be obtained.

$$0.25 \times Xct < SP < 2 \times XCt \quad \text{[Math 33]}$$

It was found from the subjective assessment results that when the lens focal point is shifted from the pixel plane, the spot diameter SP on the pixel plane is preferably in a range between WX1/2 and 2×Xct. When the spot diameter SP is WX1/2, the oblique side region of the trapezoidal aperture is a marginal region where blurring occurs. Therefore, it is preferable that the spot diameter SP is larger than that. When the spot diameter SP is 2×Xct, the blurring region is extended to the aperture region where the vertical aperture width is constant. However, if the blurring region is larger than that, the separation performance of the lens deteriorates. Therefore, when priority is given to the separation performance of the lens in designing, the radius of curvature of the lens can be set within the range given by the following two formulae.

$$H \times L \times (n-1)/(L+2 \times Xct)/n \leq r \leq H \times L \times (n-1)/(L+WX1/2)/n \quad \text{[Math 34]}$$

$$H \times L \times (n-1)/(L-WX1/2)/n \leq r \leq H \times L \times (n-1)/(L-2 \times Xct2)/n \quad \text{[Math 35]}$$

As described above, the image display apparatus according to this embodiment uses the spot diameter SP set in a range WX1/2<SP<2×Xct, whereby defocusing effect is effectively applied and acute change in luminance within the spot diameter SP is leveled off so that a gentle distribution of luminance is obtained, 3D moire becomes less visible, and high quality three-dimensional images can be provided. Furthermore, even if the spot diameter SP is increased to obtain a gentle distribution of luminance, 3D moire becomes less visible without deteriorating 3D crosstalk because the overlapping region width Xct2 is smaller than Xct.

Explanation will be made hereafter with reference to FIG. 3 again.

The triangular shielding part enclosed by the points A, D, and E serves to reduce 3D moire and 3D crosstalk and contributes to improving the image quality. On the other hand, if the shielding part has a large area and the overlapping region width Xct2 cannot be established, the aperture ratio will significantly reduce.

In order to prevent the above situation and balance 3D crosstalk and 3D moire, the ratio of the area of the triangular shielding part enclosed by the points A, D, and E to the area of a triangle enclosed by the points A, B, and C has to be equal to or lower than a given value provided that the overlapping region width Xct2 can be established. This was found from the subjective assessment results. More specifically, the area of the triangular shielding part enclosed by the points A, D, and E is desirably equal to or smaller than 50% of the area of a triangle enclosed by the points A, B, and C, and desirably equal to or smaller than 30% for minimizing reduction in the aperture ratio.

The vertical aperture width of a sub-pixel is not constant in the X-axis direction (see FIGS. 4 and 13). It decreases once from the region Xct toward the center of the display unit, has a minimal value, and then increases toward the overlapping region width Xct2. Therefore, fluctuation in the aperture width can be reduced with respect to shift in the X-axis direction.

However, for example, if the points D and F and points D' and F' in FIG. 3 are at the same position, geometrically, the distribution of magnitude of vertical aperture will be constant; the magnitude of vertical aperture does not increase toward the center line a-a' in the overlapping region width Xct2.

With such a distribution of vertical aperture width, sufficient defocusing effect cannot be obtained and it is difficult to make 3D moire less visible. Therefore, the points D and D' should be situated between the points A and F and between the points A' and F', respectively, namely within the overlapping region. This structure can accept larger shape variation due to the processing accuracy, improving the production yield and contributing to lower cost.

Fluctuation in the Y-axis direction of the oblique wire having a width W is $1/\sin\theta$ with respect to fluctuation in the X-axis direction due to the processing accuracy of the production process and alignment variation between the TFT substrate and opposite substrate. Therefore, in the pixel structure of this embodiment, the angle $\theta$ of the oblique wire can be increased to improve the aperture ratio and increase the margin of fluctuation in the Y-axis direction with respect to fluctuation in the X-axis direction. Furthermore, even if the angle $\theta$ of the oblique wire is increased, 3D crosstalk is not deteriorated and, simultaneously, 3D moire can be less visible. Particularly, the structure of the present invention is preferably applicable to a highly fine pixel having a sub-pixel pitch Xdot of 100 μm or smaller in which the angle $\theta$ is preferably increased to improve the aperture ratio. From the subjective assessment results, the optimum angle θ of the oblique wire is necessary to at least 17 degrees or larger.

Generally, since the wire angle is an acute angle, the electric field tends to concentrate at the corners of the lower base of a nearly trapezoidal shape and distract the alignment of liquid crystal, causing light from the backlight to leak. However, in the pixel according this embodiment, the acute angle part is shielded, reducing leak light and improving the contrast.

All angles of a nearly trapezoidal shape are blunt or right angles. Therefore, rounded corners due to the method of forming the shielding part can be minimized and reduction in the aperture ratio due to the production method can be prevented. Furthermore, in the present invention, there is no need of applying a highly accurate machining process for forming an acute angle part, achieving lower cost.

In the above explanation, multiple observing points are set on the observation plane and light is emitted from the pixels for the observing points of all display units on the display plane toward the observing points. Such a system is referred to as "a light collection system" because light for a specific observing point is collected to the corresponding observing point. The above described image display apparatus of two observing points and an image display apparatus of multiple observing points having a larger number of observing points fall under the category of light collection systems.

FIG. 17 is a conceptual illustration showing the light collection of the image display apparatus according to this embodiment. A light collection system is characterized by reproducing light beams entering the eye of the observer for display. The present invention can effectively be applied to such a light collection system.

Figure 18:
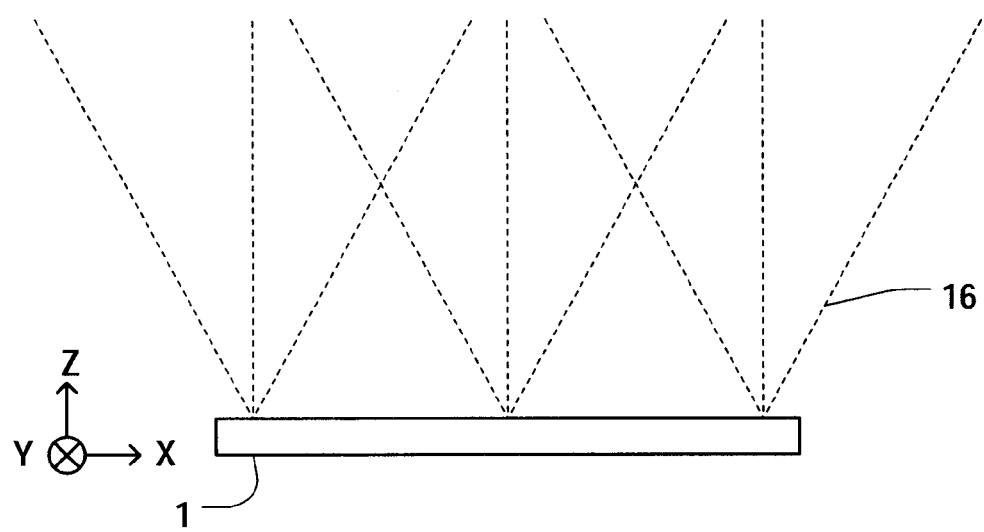
[FIG. 18] A conceptual illustration showing a special system.

Furthermore, various systems have been proposed and they are termed a spatial image system, spatial image reproduction system, spatial image reemergence system, spatial image formation system, etc. FIG. 18 is a conceptual illustration of a spatial image system. Unlike light collection systems, a spatial image system does not set particular observing points. The difference from light collection systems is that light emitted from an object in the space is reproduced for display. An integral photography system, integral videography system, and integral imaging system fall under the category of spatial image systems. In a spatial image system, the observer at any position does not view only the pixels for the same observing point on the entire image plane. However, there are multiple kinds of regions formed by the pixels for the same observing point and having a given width. In each region, the present invention has the same effect as the above-described light collection system and therefore is effectively applicable to a spatial image system.

In the present invention, "the observing point" does not means "a point in the display region the user gazes at (viewing point)" but does mean "a position from which the user views the image display apparatus (observation position)" or "a point or region at/in which the eye of the user is situated."

Furthermore, in the image display apparatus according to this embodiment, the polarizing plate 11 does not need to be attached to the installed liquid crystal display panel; it can be provided outside the lenticular lens 3. In this way, the distance H between the pixels and lens can be reduced for the thickness of the polarizing plate 11. Then, a polishing process for thinning the glass can be eliminated. Furthermore, this placement allows for a larger room in designing the distance H between the pixels and lens, improving the degree of freedom in designing the three-dimensional observation range. Particularly, the three-dimensional display panel installed in a small device is designed to have the optimum observation distance of the three dimensional display near the panel, for example within reach of a hand. With the distance between the pixels and lens being reduced, the three-dimensional observation range width can more efficiently be improved. Furthermore, the above placement is effective in highly fine items having a pixel pitch Xunit of smaller than 100 μm.

The cylindrical lens 3a of the display panel according to this embodiment can have the lens surface oriented to the opposite substrate 2b. In the same manner as in the above, with the distance between the pixels and lens being reduced, this structure is effective in improving the degree of freedom of the optimum observation distance and in highly fine items.

Furthermore, the image separation means can consist of an electrooptical element controlling the distribution of refractive index by liquid crystal molecules or an electrooptical element consisting of a combination of a concave-convex substrate having lens effect and liquid crystal molecules and using the liquid crystal molecules for switching. Furthermore, a parallax barrier consisting of transparent domains and opaque domains arranged alternately is applicable. The parallax barrier can be an electrooptical element in which the transparent and opaque domains are switched by liquid crystal molecules.

Furthermore, when the display panel is provided with color filters in a stripe pattern for color display, it is preferable that the color filters of the same color continue in the X-axis direction. In this way, there is no need of shielding the same color region of the color filters and the color filter can be rectangular. Then, the color filter can easily be produced and the image display apparatus achieves lower cost.

Furthermore, the color filter and shielding part can be provided to the TFT substrate 2a. In this way, the overlapping accuracy can be improved, whereby the width of the shielding part is reduced and the aperture efficiency is improved. Furthermore, with the width of the shielding part covering the oblique wire being reduced, 3D moire can be reduced, whereby the display quality is improved.

Furthermore, with the above, structure, defocusing effect serves to level off acute change in the distribution of luminance due to alignment variation, whereby a gentle distribution of luminance is obtained and 3D moire becomes less visible, providing high quality three-dimensional images.

Furthermore, the shielding part 76 can be provided to a wire on the TFT substrate 2a, not in the region between a pair of sides oblique with respect to the Y-axis direction. With this structure, even if the shielding part is formed with a significant positional error margin in the X-axis direction, the aperture ratio is less affected. In other words, this structure allows for a larger positional margin in the X-axis and a higher aperture ratio. This structure is particularly effective when the shielding part is formed on the substrate facing a substrate on which wires are formed.

In this embodiment, the first observing point pixel is the left-eye pixel 4L and the second observing point pixel is the right-eye pixel 4R. This is not restrictive. It is possible that the first observing point pixel is the right-eye pixel 4R and the second observing point pixel is the left-eye pixel 4L. In this way, when the display panel 2 is rotated by 180 degrees in the XY plane, the three-dimensional display can be viewed in the same manner as in the original position by changing the order of image data. Particularly, recent portable devices have a rotatable display screen for improved operability, requiring information to be provided regardless of the orientation of the image display apparatus 1 in the hand.

The liquid crystal panel installed in the image display apparatus of this embodiment is not restricted to a TN mode liquid crystal drive system and other liquid crystal drive modes are applicable. Examples of the horizontal electric field mode include IPS (in-plane switching), FFS (fringe field switching), and AFFS (advanced fringe field switching) systems. Furthermore, examples of the vertical alignment mode include MVA (multidomain vertical alignment) of which the multidomain scheme serves to reduce dependency on the field angle, PVA (patterned vertical alignment), and ASV (advanced super V) systems. Furthermore, liquid crystal display panels of an OCB (optically compensated bend) system or film compensated TN mode can preferably be used.

Furthermore, the display panel 2 according to this embodiment is a liquid crystal display panel using liquid crystal molecules as an electrooptical element. Applicable liquid crystal display panels include not only transmissive liquid crystal display panels but also reflective liquid crystal display panels, semitransmissive liquid crystal display panels, microreflective liquid crystal display panels in which the transmissive region is present at a larger ratio than the reflective region, and micrortransmissive liquid crystal display panels in which the reflective region is present at a larger ratio than the transmissive region.

Furthermore, the display panel drive method is preferably applicable to TFT systems. Applicable thin film transistors of TFT systems include not only those of amorphous silicon, low temperature polysilicon, high temperature polysilicon, and monocrystalline silicon, but also those of organic materials such as pentacene, oxide metals such as zinc oxide, and carbon nanotube. Furthermore, the present invention is preferably applicable to thin film transistors of bottom gate, top gate, staggering, and reversed-staggering types regardless of their structure.

Furthermore, the display panel 2 according to this embodiment is applicable to display panels other than those of liquid crystal types such as organic electroluminescence display panels, or PALC (plasma address liquid crystal). In an organic electroluminescence display panel, the non-emission region serves as the shielding region. Therefore, the same effect can be obtained by applying the structure of the shielding part of the present invention to the non-emission region.

Furthermore, in this embodiment, the terminal device is a cell-phone by way of example. The present invention is not restricted thereto. It is applicable to various portable terminal devices such as PDA, personal TVs, game machines, digital cameras, digital video cameras, and note type personal computers. Furthermore, it is applicable not only to portable terminal devices but also to various fixed terminal devices such as cash dispensers, automated vending machines, monitors, and television receivers.

[Embodiment 1, Modified Embodiment 1]

The pixel of the display panel according to a modified embodiment of Embodiment 1 will be described with reference to the drawings.

Figure 19:
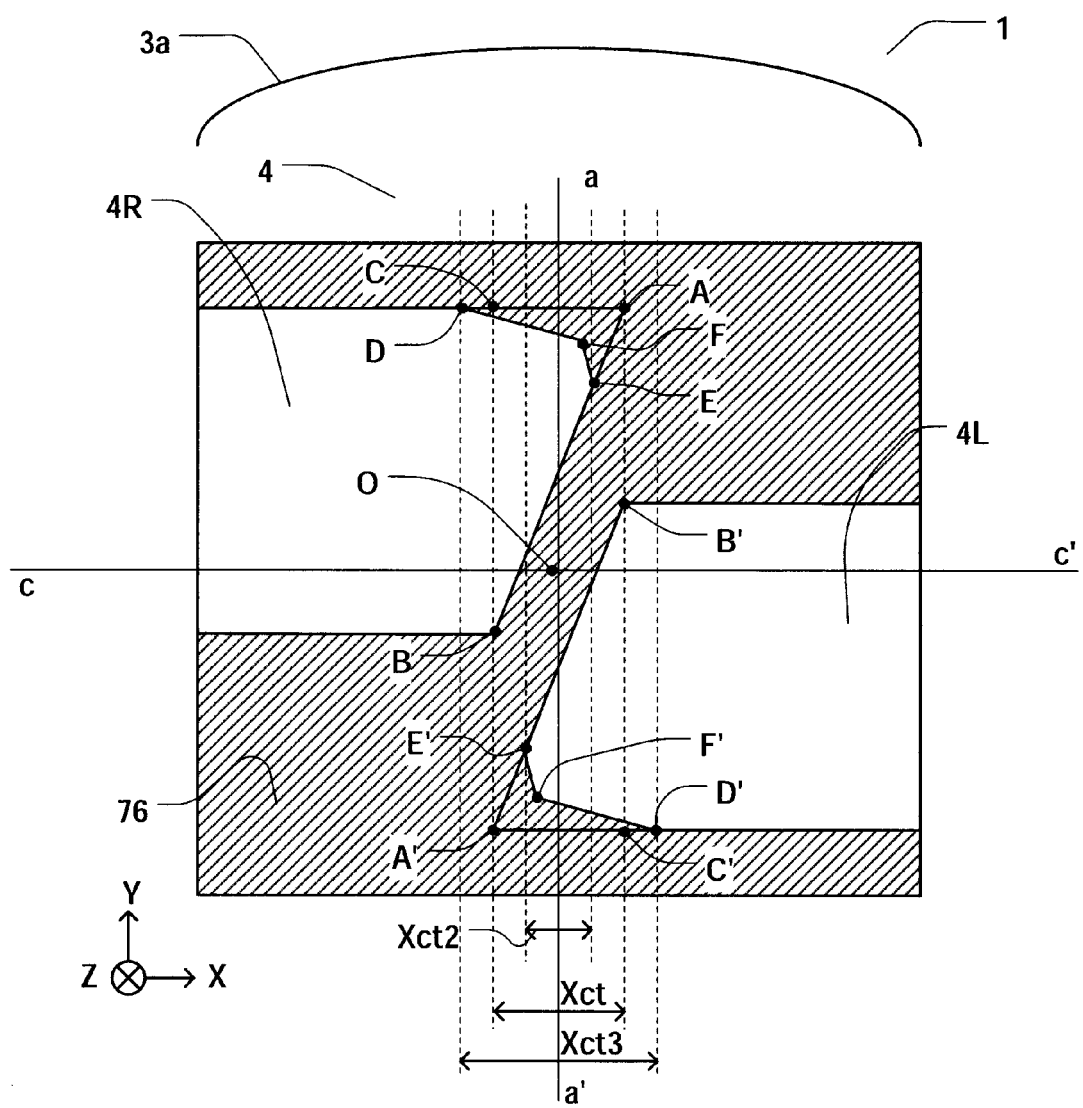
[FIG. 19] A plane view showing a pixel of the display panel according to Modified Embodiment 1 of Embodiment 1 of the present invention.

FIG. 19 is a plane view showing a pixel of the display panel according to this modified embodiment.

The sub-pixel according to this embodiment is trapezoidal. The aperture is nearly trapezoidal and provided with a nearly triangular shielding part consisting of a polygon at the acute angle part. The nearly triangular shielding part consists of a quadrangle defined by points A, D, E, and F or points A', D', E, and F'.

The point F of the sub pixel is situated in the overlapping region Xct2 and inside a triangle defined by the points A, E, and D. A line connecting the points F and D intersects a line a-a' that is the center line of the display panel. The angle between the line connecting the points F and D and the line a-a' is larger than the angle between the line connecting the points E and F and the line a-a'.

The point D is situated outside a triangular region enclosed by the points A, B, and C. The point D' is situated outside a triangular region enclosed by the points A', B', and C'. Consequently, the points D and D' are flexion points where the vertical aperture width fluctuates in the X-axis direction. From these flexion points, the vertical aperture width decreases toward the center of the display unit 4. Here, the width between the points D and D' in the X-axis direction is Xct3.

The image display apparatus 1 of this modified embodiment is the same in structure and behavior as the image display apparatus 1 of Embodiment 1 except for the above-described matters.

Effects of the image display apparatus 1 according to this modified embodiment will be described hereafter.

The line connecting the points F and D has a gradient smaller than the line connecting the points F and E. Fluctuation in the vertical aperture width from the point D to point F is smaller than fluctuation in the vertical aperture width from the point F to point E. Therefore, change in derivatives from the point D to point E is smaller. For this reason, with this structure, fluctuation in the distribution of luminance and in the distribution of brightness in the X-axis direction is reduced, 3D moire becomes less visible, and the shielding region including the points A, E, F, and D serves to reduce 3D crosstalk.

Furthermore, the shielding part has blunt angles. Rounded corners due to the method of forming the shielding part can be minimized. Reduction in the aperture ratio due to the production method can be prevented. Furthermore, with this structure, there is no need of allying a highly accurate machining process for forming an acute angle part, achieving lower cost. Particularly, there are only blunt angles within the width Xct; shape variation due to the processing accuracy of the production process is reduced and local fluctuation in the vertical aperture width is reduced.

Furthermore, with the above structure, the shielding region including the points A, E, F, and D can be used to adjust the overlapping region Xct2 as appropriate so as to achieve an acceptable level of 3D crosstalk and 3D moire to the observer. In this way, the degree of freedom of design can be increased even for a highly fine pixel consisting of sub-pixels of 100 µm or smaller.

The subjective assessment results revealed that it is desirable that the shielding region including the points A, E, F, and D occupies 10% of the aperture ratio or smaller. In this way, reduction in the aperture ratio is minimized and 3D crosstalk and 3D moire are optimized.

The nearly triangular shielding part at the acute angle part of the nearly trapezoidal aperture can consist of a polygon having four or more sides. In such a case, with the vertexes other than the point F being situated inside a triangular region defined by the points A, D, and E, the oblique side from the point D to point E has a gentle transition. In this way, fluctuation in the vertical aperture width is gentle and 3D moire becomes less visible.

[Embodiment 1, Modified Embodiment 2]

The pixel of the display panel according to a modified embodiment of Embodiment 1 will be described with reference to the drawings.

Figure 20:
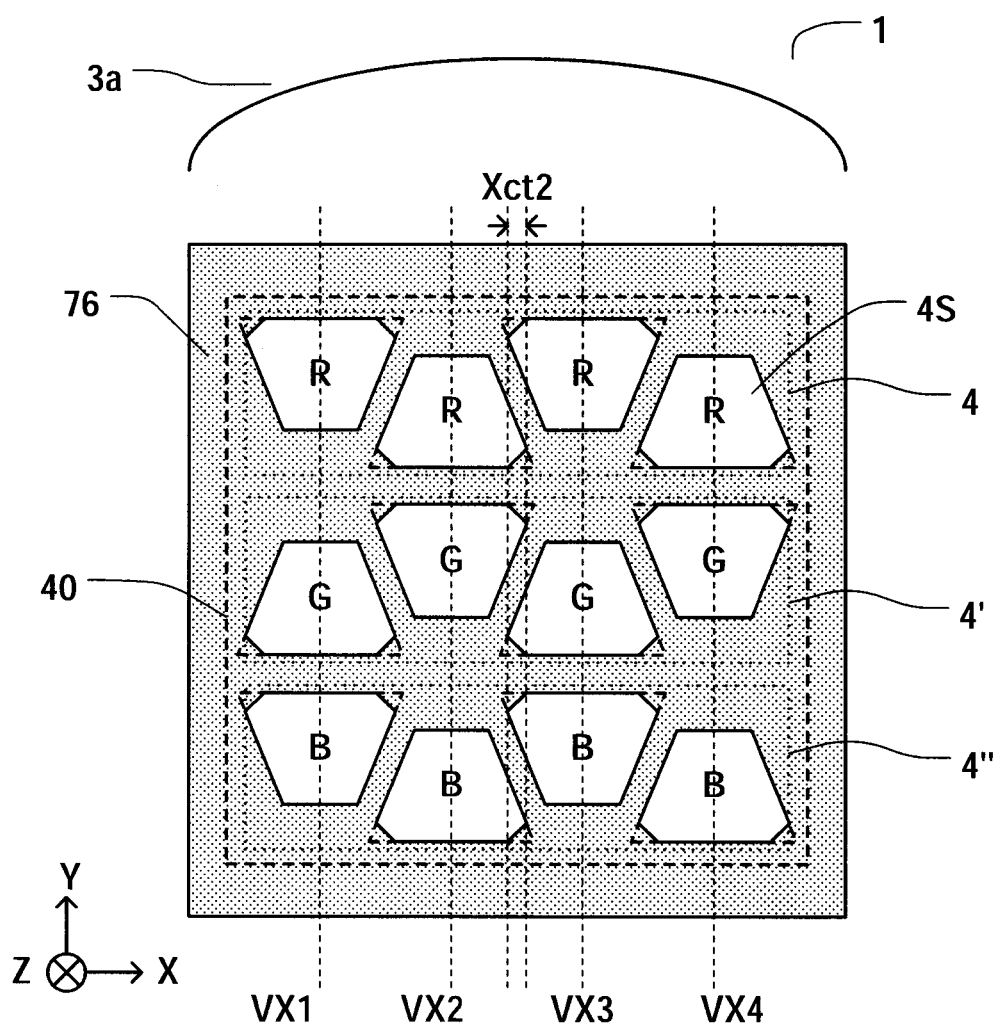
[FIG. 20] A plane view showing a pixel of the display panel according to Modified Embodiment 2 of Embodiment 1 of the present invention.

FIG. 20 is a plane view showing a pixel according to this embodiment.

The display unit 4 of a pixel according to this embodiment consists of sub-pixels for multiple observing points. A display unit 4 consists of four sub-pixels 4S arranged in the X-axis direction. Display units 4' and 4" each also consist of four sub-pixels 4S arranged in the X-axis direction.

A pixel 40 consists of three display units 4, 4', and 4" arranged in the Y-axis direction and arranged in a matrix in the display region. The display units 4 in a single pixel are provided in the manner that red R, green G, and blue B color filters extend in the X-axis direction. Four columns of sub-pixels VX1, VX2, VX3, and VX4 can sort and output images for four observing points to the XZ plane as display units. Here, the order of colors is not restricted to the above. A combination of red R, green G, and blue B can randomly be arranged. Furthermore, one pixel is not restricted to the above and can consist of three or more display units. In such a case, three or more colors can be used.

The sub-pixels corresponding to the first observing point are provided in the column VX1; the sub-pixels corresponding to the second observing point, in the column VX2; the sub-pixels corresponding to the third observing point, in the column VX3; and the sub-pixels corresponding to the fourth observing point, in the column VX4. The columns VX1, VX2, VX3, and VX4 are provided with their respective pitches. This is not restrictive and can be set as appropriate.

The aperture of a sub-pixel has a similar shape to that of the pixel of the display panel according to Embodiment 1. A shielding line oblique in a direction different from the Y-axis direction is provided in their boundary region. In other words, the oblique wire is provided between sub-pixels 4S adjacent to each other in the X-axis direction. As in the above-described embodiments, "the overlapping region" where their apertures overlap with each other in the Y-axis direction is situated between sub-pixels 4S adjacent to each other in the X-axis direction and has an overlapping width Xct2. Nearly triangular shielding parts are provided at the acute angle parts of the nearly trapezoidal aperture of a sub-pixel, whereby the overlapping region width Xct2 can be set to a desired width as appropriate.

In the above explanation, 3D crosstalk is defined as crosstalk between the eyes. In a multiple observing point system having three or more observing points such as this modified embodiment, 3D crosstalk may be defined as crosstalk between images in the sense that "an image for an observing point leaks into an image for an adjacent observing point" and this is termed "inter-image crosstalk." In the case of two observing points as described in Embodiment 1, "3D crosstalk" between the eyes and "inter-image crosstalk" are the same and 3D crosstalk is desirably lower. Conversely, in the case of multiple, three or more, observing points, presence of "inter-image crosstalk" contributes to yielding smooth interlocking parallax although it causes a double image; it is not always desirable that "inter-image crosstalk" is lower.

The image display apparatus 1 of this modified embodiment is the same in structure and behavior as the image display apparatus 1 of Embodiment 1 except for the above-described matters.

Effects of the image display apparatus 1 according to this modified embodiment will be described hereafter.

With the sub-pixel having the same shape as in Embodiment 1, the image display apparatus 1 according to this modified embodiment has the equivalent effect to the image display apparatus 1 according to Embodiment 1.

Furthermore, in the case of multiple observing points, the sub-pixels become much finer as the number of observing points is increased. Therefore, leak light due to distracted alignment of the liquid crystal caused by electric field concentration accompanying the acute wire angle and reduction in the aperture ratio due to the shielding part formation method become obvious.

However, although the sub-pixel of this modified embodiment serves to reduce "inter-image crosstalk," the nearly triangular shielding parts at the acute angle parts serve for shielding, contributing to improvement in the contrast. Furthermore, all angles are blunt or right angles, whereby reduction in the aperture ratio due to the shielding part formation method can be prevented.

In this modified embodiment, an image display apparatus consisting of display units having four observing points is described. This is not restrictive. This modified embodiment is applicable to a three-dimensional display panel having N observing points in a display unit. An image display apparatus of N observing points can display a three-dimensional image with the addition of optimum three-dimensional information for each observing point, whereby a range in which an excellent three-dimensional image is viewed can be extended.

[Embodiment 2]

The pixel of the display panel according to Embodiment 2 of the present invention will be described with reference to the drawings.

Figure 21:
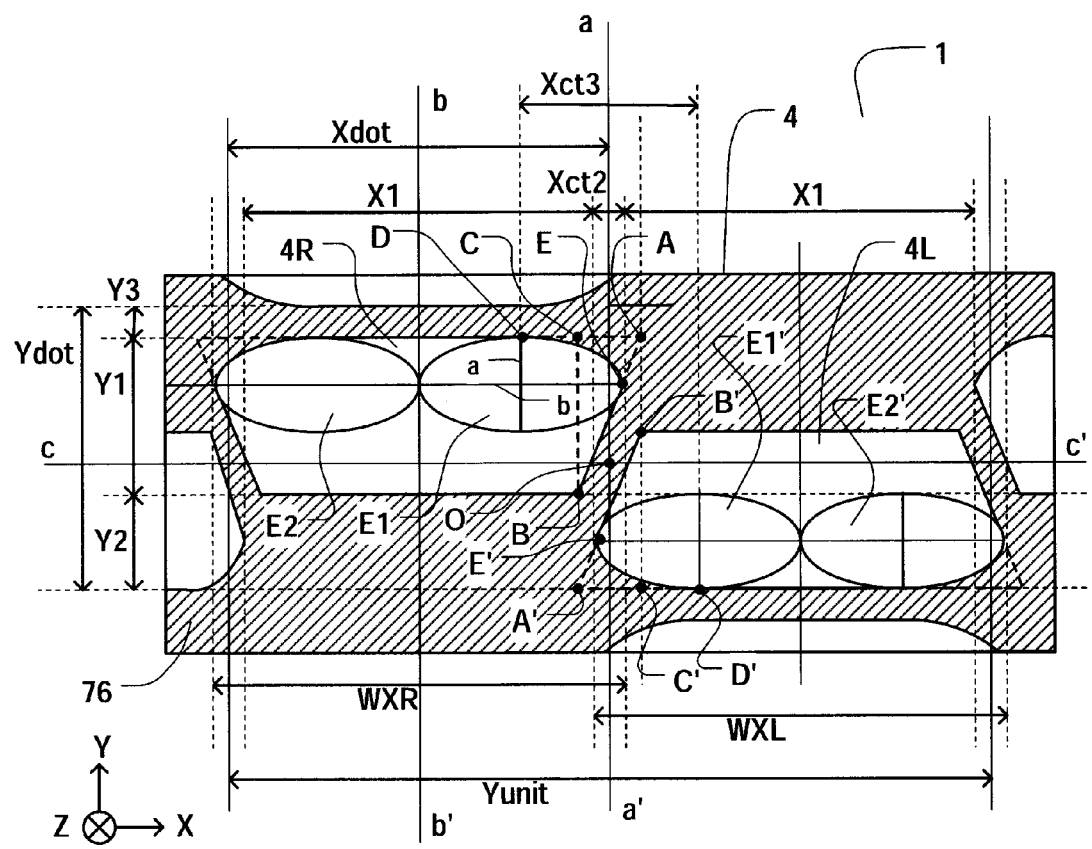
[FIG. 21] A plane view showing a pixel of the display panel according to Embodiment 2 of the present invention.

FIG. 21 is a plane view showing a pixel of the display panel according to this embodiment.

The sub-pixel of the display panel according to this embodiment consists of a nearly trapezoidal aperture and a trapezoidal shielding part enclosing it. The shielding part at the acute angle parts of a trapezoid has an inner edge curved outward from the aperture.

The edge of the shielding part is formed so that the aperture is curved outward from the point D to point E. The curve has a curvature of an ellipse. The minor axis a of an ellipse E1 has a width Y2 and the major axis b has a width equal to a half of the aperture width WXR, namely (X1+2×Xct2)/2. Ellipses E1, E2, E1', and E2' are equal in the major and minor axes. In other words, the ellipses E1, E2, E1', and E2' are identical to each other and the shielding parts provided at the acute angle parts of the nearly trapezoidal shapes have the same curvature. In order to reduce the area of the nearly triangular area so as to ensure an aperture ratio, it is desirable that the width of the minor axis a is smaller than the width Y1 of the aperture in the Y-axis direction and the width of the major axis b is (X1+2×Xct2)/2 or larger. Here, the aperture widths WXR and WXL of sub-pixels in the X-axis direction are the maximum values of the aperture width in the X-axis direction in a sub-pixel and presented by X1+2×Xct1 in the prior art structure (see FIG. 36).

The curve from the point D to point E, namely the boundary line between the aperture and shielding part intersects a line a-a' that is the center line of the display unit 4.

The ellipse E1 is inscribed to the nearly trapezoidal aperture at the point D. Therefore, the derivative of the vertical aperture width with respect to the X-axis direction is continuous at the point D.

The point D is situated outside a triangular region enclosed by the points A, B, and C and so is the point D'. Consequently, the points D and D' are flexion points where the vertical aperture width fluctuates in the X-axis direction. From these flexion points, the vertical aperture width decreases toward the center of the display unit 4. Here, the distance between the points D and D' in the X-axis direction is Xct3.

The image display apparatus 1 of this embodiment is the same in structure and behavior as the image display apparatus 1 of Embodiment 1 except for the above-described matters.

Effects of the image display apparatus according to this embodiment will be described hereafter.

The derivative of the vertical aperture width with respect to the X-axis direction is continuous at the point D; therefore, fluctuation in the vertical aperture width at the point D is gentle. Therefore, fluctuation in the distribution of brightness and luminance is also gentle, whereby 3D moire becomes less visible.

Furthermore, the acute angle part of the nearly trapezoidal aperture is not restricted to a curvature of an ellipse and a high-order function can apply to yield a curvature.

[Embodiment 3]

The pixel of the display panel according to Embodiment 3 of the present invention will be described with reference to the drawings.

Figure 22:
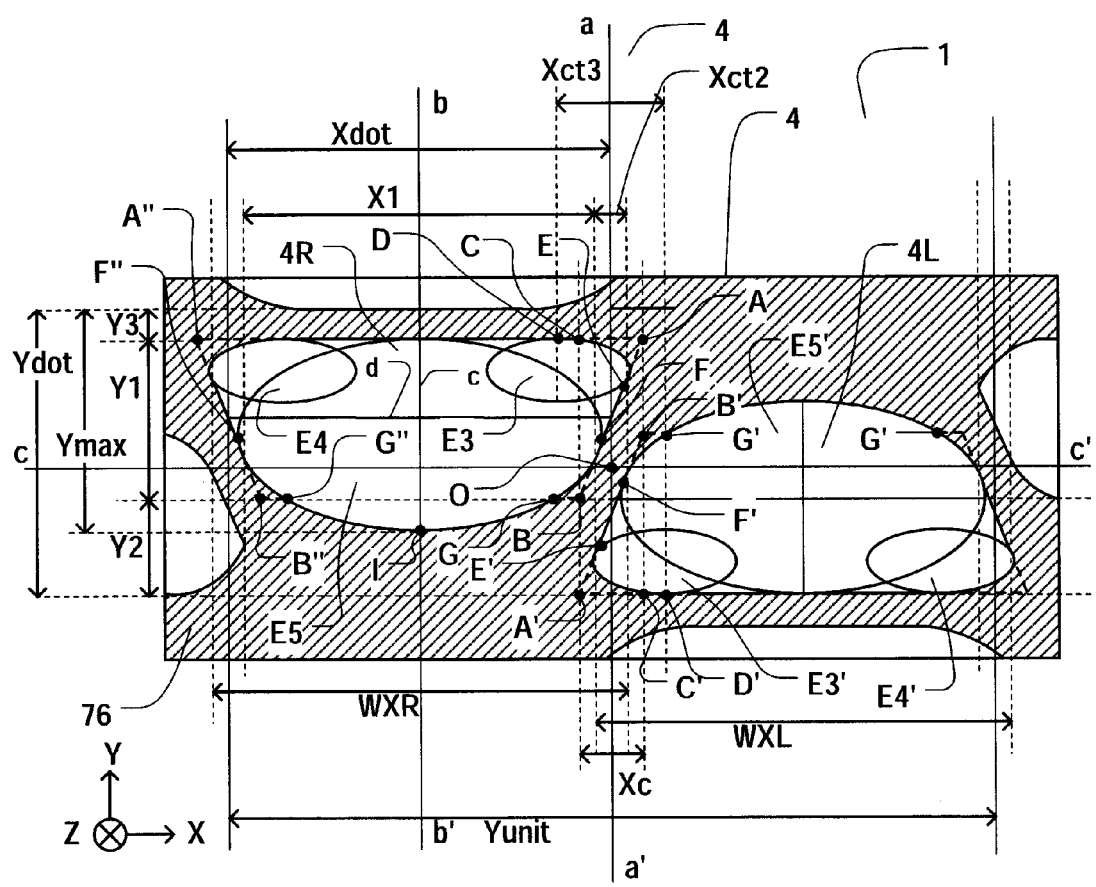
[FIG. 22] A plane view showing a pixel of the display panel according to Embodiment 3 of the present invention.

FIG. 22 is a plane view showing a pixel of the display panel according to this embodiment.

The pixel of the display panel according to this embodiment is nearly trapezoidal and is shielded by the upper and lower bases of a nearly trapezoidal aperture that are curved outward.

A sub-pixel has an aperture consisting of three ellipses and four tangent lines tangent to them. The ellipses are an ellipse E5 or E5' having the center in the center part of the aperture and two ellipses E3 or E3' and E4 or E4' at the lower base of the nearly trapezoidal shape. The ellipses E5 and E5' are identical. The ellipses E3 and E3' and ellipses E4 and E4' are identical, respectively.

The points D, E, and F are tangent points between a line and an ellipse. At each point, the derivative of the vertical aperture width with respect to the X-axis direction is continuous.

The minor axis c of the ellipse E3 is larger than the vertical aperture width Y1. The vertical aperture width is maximized at the center line of the sub-pixel. Here, the oblique width perpendicular to the Y-axis at the lower base of the nearly trapezoidal aperture is constant. This is not restrictive. The oblique width can be changed according to change in the vertical aperture width.

A trapezoid connecting the four points A, B, A", and B" in the right-eye pixel 4R is referred to as a reference trapezoid T. A shielding region connecting the three points A, D, and E (Sa, hereafter) and a shielding region connecting the three points A", D", and E" (Sa', hereafter) are formed at the acute angle parts of the reference trapezoid T. A shielding region connecting the three points B, G, and F (Tb, hereafter) and a shielding region connecting the three points B", G", and F"' (Sb', hereafter) are formed at the blunt angle parts of the reference trapezoid T.

On the other hand, a region beyond the vertical aperture width Y1 at the upper base of the reference trapezoid T, namely a region enclosed by the points G, I, and G" (Sc, hereafter) is an aperture region newly provided outside the reference trapezoid T and contributes to improvement in the aperture ratio.

Here, the region Sc is larger than the total area of the above shielding regions. In other words, Sc>Sa+Sa'+Sb+Sb'. Therefore, as a whole, the aperture ratio of a sub-pixel is improved. The same applies to the left-eye pixel 4L.

The image display apparatus 1 of this embodiment is the same in structure and behavior as the image display apparatus 1 of Embodiment 1 except for the above-described matters.

Effects of the image display apparatus 1 according to this embodiment will be described hereafter.

The derivatives of the vertical aperture width with respect to the X-axis direction are continuous at the points where the ellipses contact lines; therefore, fluctuation in the vertical aperture width at the contact points is gentle. Therefore, fluctuation in the distribution of brightness and luminance is also gentle, whereby 3D moire becomes less visible.

Furthermore, a region enclosed by the points G, I, and G"' is provided and the area of that region is larger than the total area of the shielding regions, whereby the aperture ratio is improved.

The above-described structures will be compared and the effects will be discussed hereafter. Comparison is made among the prior art embodiment and Embodiments 1, 2, and 3.

First, the pixel of the prior art embodiment is referred to as "Prior Art Pixel," and the pixel of Embodiment 1 is referred to as "Pixel Level 1"; the pixel of Embodiment 2, as "Pixel Level 2"; and the pixel of Embodiment 3, as "Pixel Level 3."

Figure 23:
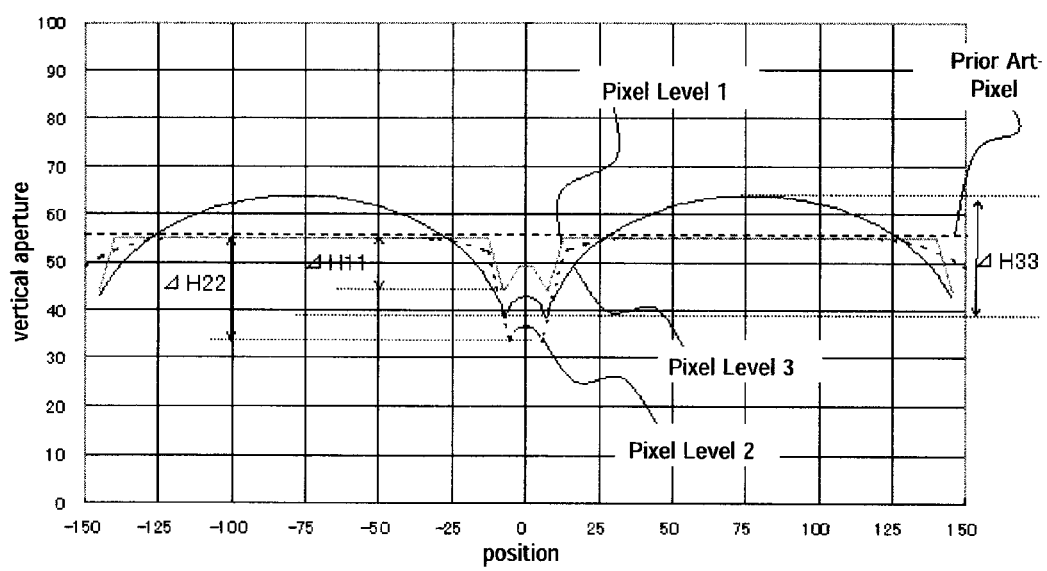
[FIG. 23] A graphical presentation showing the position in the X-axis direction and the distributions of vertical aperture width in the embodiments for comparison.

FIG. 23 is a graphical representation showing the distribution of vertical aperture width in each pixel level, in which the vertical aperture width is plotted as ordinate and the position in the X-axis direction is plotted as abscissa.

The difference ΔH33 between the maximum and minimum values of the vertical aperture width of the Pixel Level 3 is nearly equal to the difference ΔH22 between the maximum and minimum values of the vertical aperture width of the Pixel Level 2. Compared with those, the difference ΔH11 between the maximum and minimum values of the vertical aperture width of the Pixel Level 1 is smaller. The Prior Art Pixel has no fluctuation in the vertical aperture width.

Figure 24:
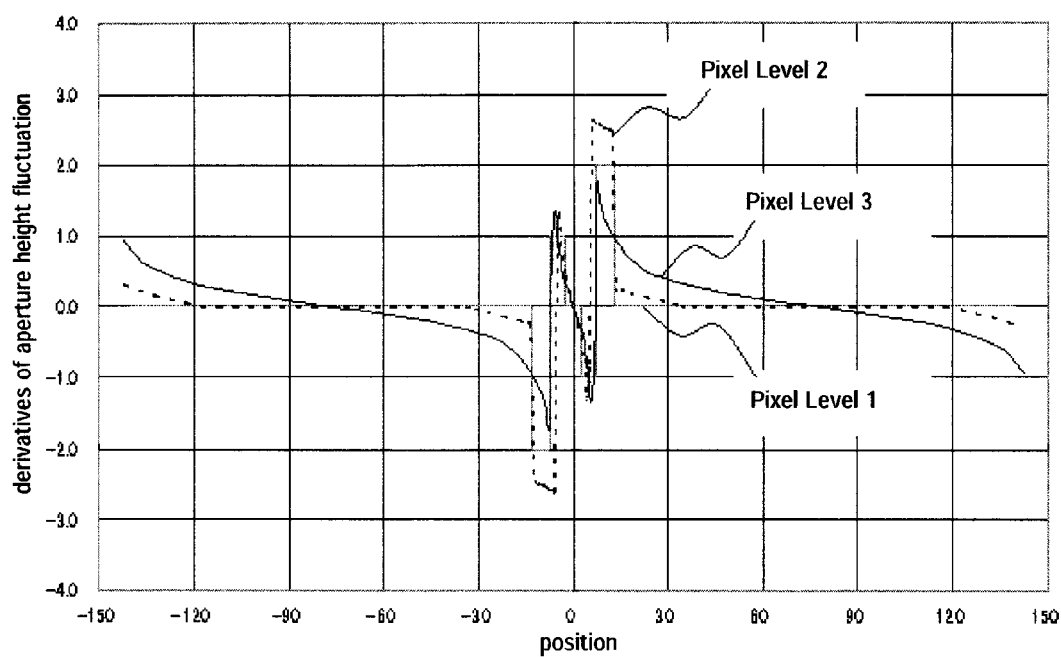
[FIG. 24] A graphical presentation showing the position in the X-axis direction and the derivatives in the embodiments for comparison.

FIG. 24 is a graphical representation showing the derivatives with respect to the X-axis direction of the distribution of vertical aperture width of the pixel levels shown in FIG. 23.

The derivatives of the Pixel Level 3 with respect to the X-axis direction fluctuate less than the derivatives of the Pixel Level 2 with respect to the X-axis direction. The derivatives of the Pixel Levels 1 and 2 drastically fluctuate toward the center position. On the other hand, the derivatives of Pixel Levels 3 do not drastically fluctuate toward the center position; they continuously fluctuate. The derivatives of the vertical aperture width of the Pixel Level 3 with respect to the X-axis direction are continuous at the points E, C, and D (see FIG. 22); therefore, fluctuation in the vertical aperture width is gentle at these points, whereby 3D moire becomes less visible.

FIG. 25 is a table showing the results of assessing the image display apparatuses to which the pixels of the above pixel levels are applied. In the table, the symbols (double circle, ○, Δ, x) present subjective assessment results. The "double circle" indicates that no 3D crosstalk/3D moire is visible during observation and no sense of discomfort. The symbol "○" indicates a little 3D crosstalk/3D moire is visible during observation but no sense of discomfort. The symbol "Δ" indicates that no sense of discomfort as long as three-dimensional display is observed within a 3D crosstalk/3D moire-optimized observation range. The symbol "x" indicates that 3D crosstalk/3D moire causes significant sense of discomfort and the visibility drops.

Referring to the table, the Prior Art Pixel successfully reduced 3D moire but failed to reduce 3D crosstalk, deteriorating the image quality.

Conversely, it is understood that the pixels according to the present invention not only reduce 3D moire but also reduce 3D crosstalk, realizing a balanced image and improving the image quality.

[Embodiment 3, Modified Embodiment 1]

The pixel of the display panel according to a modified embodiment of Embodiment 3 of the present invention will be described with reference to the drawings.

Figure 26:
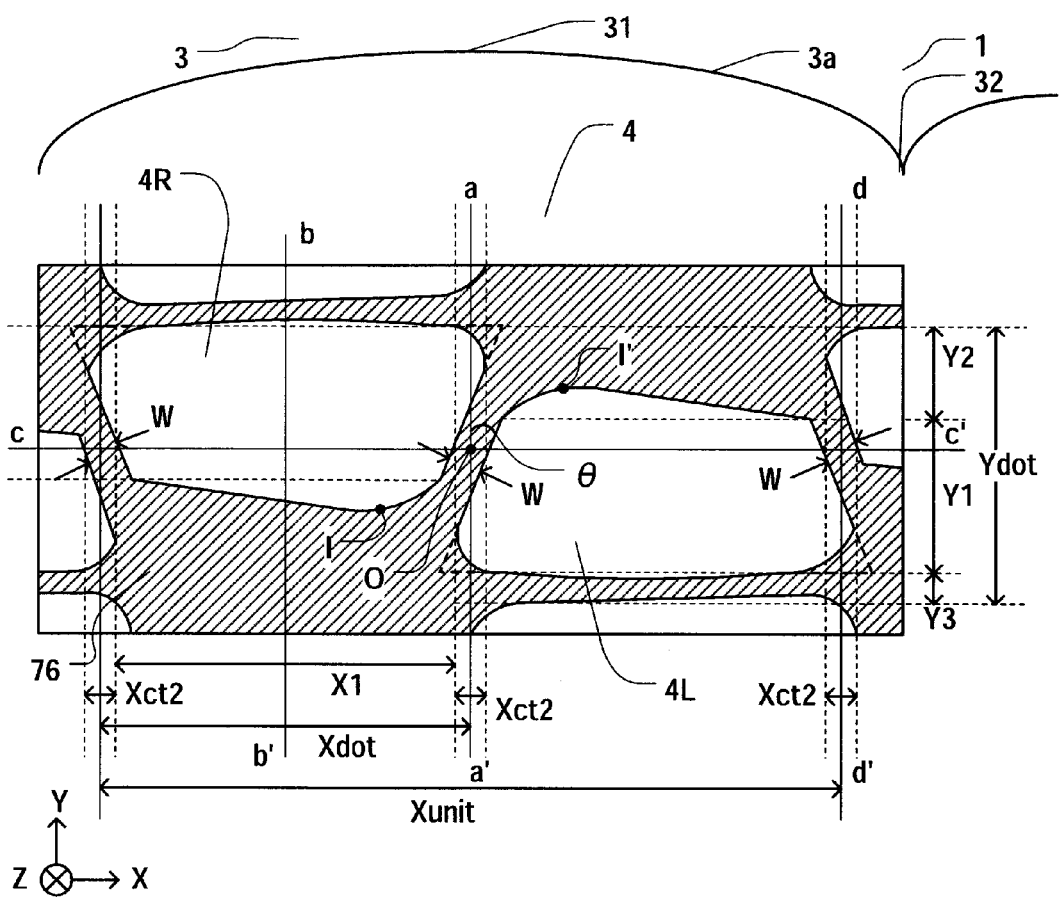
FIG. 26 A plane view showing a pixel of the display panel according to Modified Embodiment 1 of Embodiment 3 of the present invention.

FIG. 26 is a plane view showing a pixel of the display panel according to this modified embodiment.

A sub-pixel is asymmetric about a line b-b' and symmetric about the center O of the display unit 4. The aperture of a sub-pixel is curved outward at the upper and lower bases of a nearly trapezoidal pixel and has a maximal value maximizing the vertical aperture ratio.

Figures 27A, 27B:
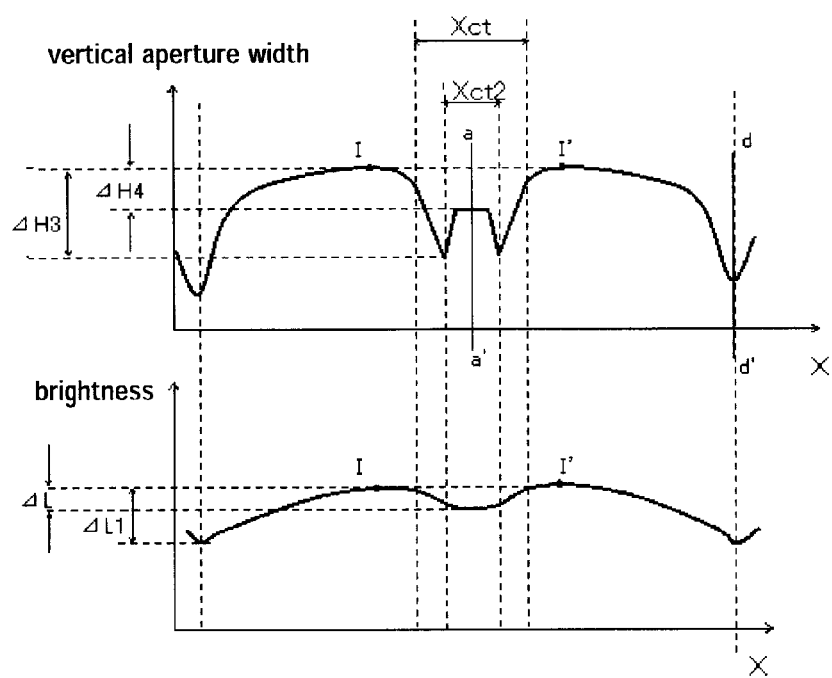
[FIG. 27] A schematic chart showing the distribution of vertical aperture width (A) and the distribution of brightness (B) in a pixel of the display panel according to Modified Embodiment 1 of Embodiment 3 of the present invention.

FIG. 27 (A) shows the distribution of vertical aperture ratio according to this modified embodiment and FIG. 27 (B) shows the distribution of brightness of a pixel according to this modified embodiment. As shown in the figure, the vertical aperture width is maximized on the side near the lens convex part that is the lens principal axis and the brightness is simultaneously maximized.

The image display apparatus 1 of this modified embodiment is the same in structure and behavior as the image display apparatus 1 of Embodiment 1 except for the above-described matters.

Effects of the image display apparatus 1 according to this modified embodiment will be described hereafter.

As shown in FIG. 27 (B), the vertical aperture width has maximum values I and I' on the side near the lens principal axis. Therefore, the fluctuation $\Delta L$ in brightness of Xct2 defined by the lens separation effective width, namely the spot diameter SP becomes relatively smaller and 3D moire is reduced.

Furthermore, generally, the lenticular lens 3 is produced by metal molding, photolithography, or an inkjet technique. With any technique, a given shape is more ensured for a lens convex part 31 of a cylindrical lens 3a than for a lens trough part 32 of an adjacent cylindrical lens 3a, and the lens convex part 31 has a better optical performance. Furthermore, it is more difficult to remove any residue or adherent foreign materials from the lens trough part 32 than from the lens convex part 31, lowering the optical separation effect of the lens trough part 32.

Even when a GRIN (gradient index) lens is used as an electrooptical element using liquid crystal as an optical means, like the lenticular lens 3, the refractive index varies more at the lens trough part 32 than at the lens convex part 31, lowering the optical separation effect of the lens trough part 32.

Furthermore, for example, even if a lens other than a GRIN lens, such as a liquid crystal lens consisting of a combination of a concave-convex substrate having lens effect and liquid crystal molecules, is used, the concave-convex substrate has a steep convex part corresponding to the lens trough part 32, lowering the optical separation effect.

However, in the pixel according to this modified embodiment, the vertical aperture width is increased on the side near the lens convex part 31, whereby light emitted from a sub-pixel can be assigned to the lens convex part 31 with a high optical separation performance. Therefore, the pixel according to this modified embodiment prevents deterioration in three-dimensional image quality caused by an optical means such as a lenticular lens and an electrooptical element using liquid crystal, whereby light is further efficiently used, contributing to improvement in the transmittance and three-dimensional image quality.

[Embodiment 4]

The pixel of the display panel according to Embodiment 4 of the present invention will be described with reference to the drawings.

Figure 28:
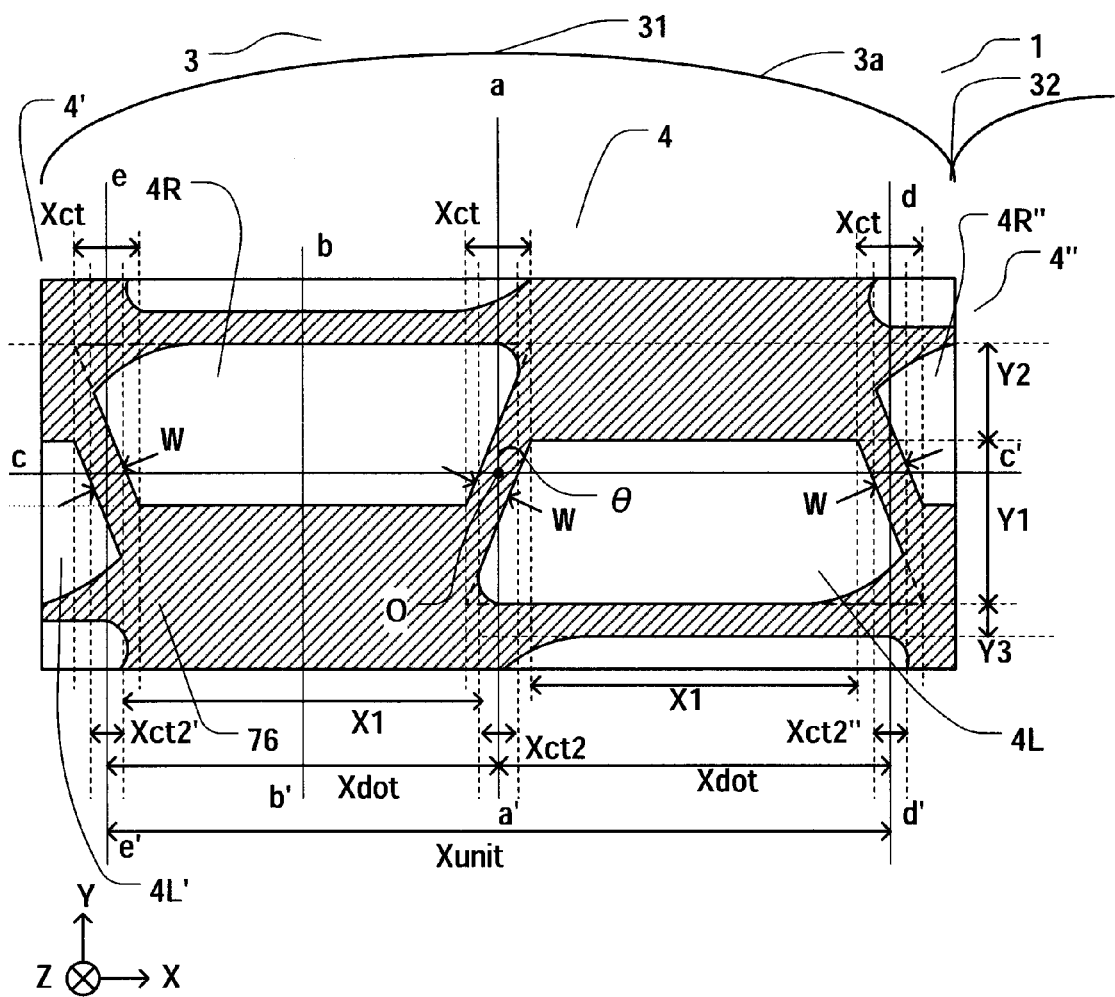
[FIG. 28] A plane view showing a pixel of the display panel according to Embodiment 4 of the present invention.

FIG. 28 is a plane view showing a pixel of the display panel according to this embodiment.

The sub-pixel according to this embodiment is trapezoidal and has a nearly trapezoidal aperture. Nearly triangular shielding parts provided at the acute angle parts of the nearly trapezoidal shape of a sub-pixel have different structures in the respective acute angle parts. In this way, the aperture is asymmetric about the center line b-b' of a sub-pixel and symmetric about the center O of the display unit 4.

As described above, the lenticular lens 3 consists of the cylindrical lenses 3a arranged in the X-axis direction and forming lens trough parts 32 between lens convex parts 31. The lens convex parts 31 and lens trough parts 32 are arranged alternately in the X-axis direction. Here, as in the above-described embodiments, the optical means can be a lens consisting of an electrooptical element using liquid crystal.

The oblique wire corresponding to the end of the display unit 4 is provided at the lens trough part 32. The oblique wire at the center of the display unit 4 is provided at the lens convex part 31. Here, the nearly triangular shielding part provided at the acute angle part at the end of the display unit 4 is different from the nearly triangular shielding part provided at the acute angle part at the center of the display unit 4.

The pixel according to this embodiment prevents deterioration in three-dimensional image quality caused by an optical means such as a lenticular lens and an electrooptical element using liquid crystal as described above.

The overlapping region width Xct2' or Xct2" where the display units 4 are adjacent to each other is smaller than the overlapping region width Xct2 at the center of the display unit 4. In other words, the overlapping region width Xct2' or Xct2" at the lens trough part 32 with a low optical separation performance is smaller than the overlapping region width Xct2 at the lens convex part 31 and is expressed by the following mathematical formula.

$$Xct2'<Xct2 \quad \text{[Math 36]}$$

$$Xct2''<Xct2 \quad \text{[Math 37]}$$

The image display apparatus 1 of this embodiment is the same in structure and behavior as the image display apparatus 1 of Embodiment 1 except for the above-described matters.

Effects of the image display apparatus 1 according to this embodiment will be described hereafter.

The spot diameter SP is large and the optical separation performance is low at the lens trough part 32. With the overlapping region width Xct2' or Xct2" being smaller, the balance with the lens convex part 31 can be adjusted.

Light emitted from a sub-pixel can be assigned to the lens convex part 31 with a high optical separation performance. Therefore, the image display apparatus according to this embodiment prevents deterioration in three-dimensional image quality caused by an optical means such as a lenticular lens and an electrooptical element using liquid crystal. Light can be used more efficiently, contributing to improvement in the transmittance and three-dimensional image quality.

In the image display apparatus according to this embodiment, the nearly triangular shielding parts provided at the acute angle parts of a sub-pixel serve to make 3D moire less visible and reduce 3D crosstalk.

[Embodiment 5]

The pixel of the display panel according to Embodiment 5 of the present invention will be described with reference to the drawings.

Figure 29:
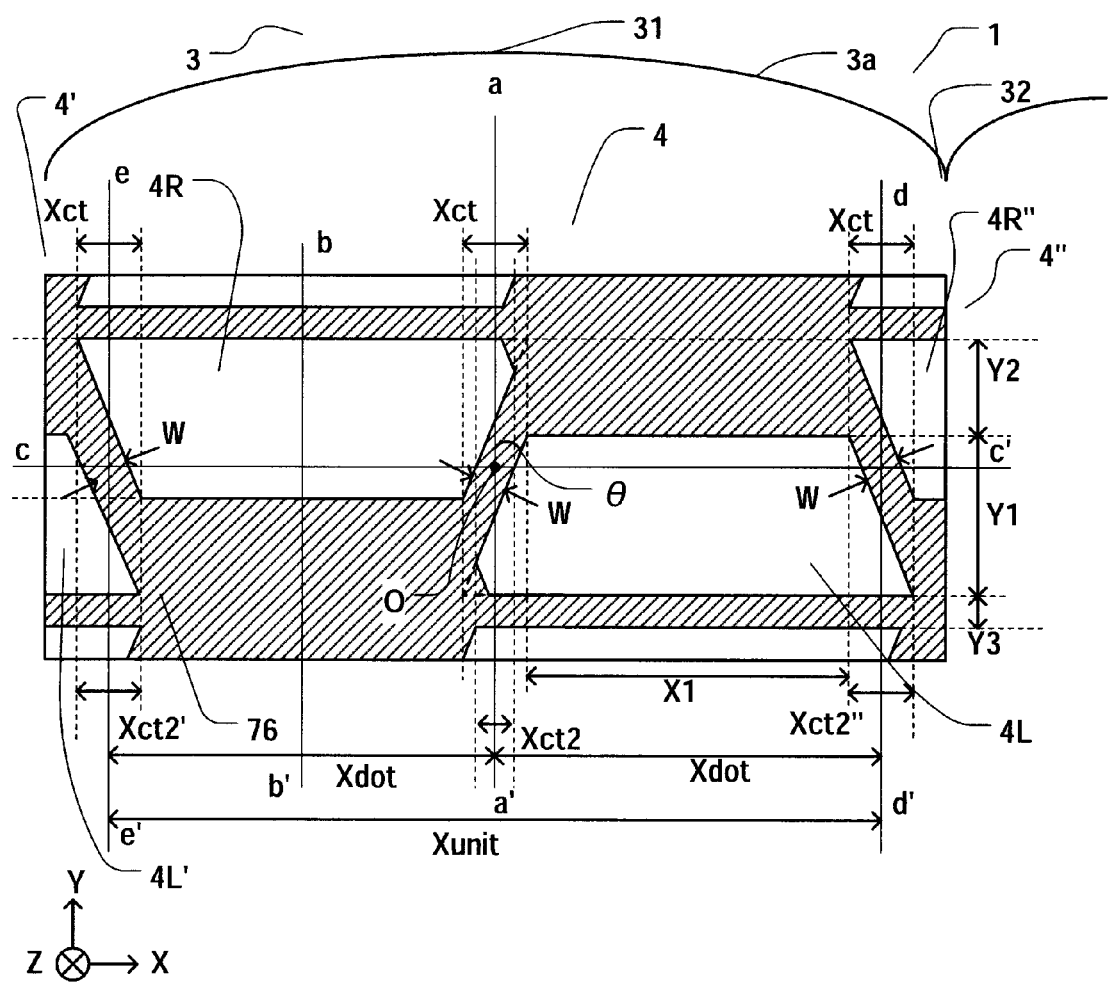
[FIG. 29] A plane view showing a pixel of the display panel according to Embodiment 5 of the present invention.

FIG. 29 is a plane view showing a pixel of the display panel according to this embodiment.

The sub-pixel according to this embodiment is trapezoidal and has a nearly trapezoidal aperture. The aperture is symmetric about the center O of the display unit 4.

As in the above-described embodiments, the nearly triangular shielding parts provided at the acute angle parts of the nearly trapezoidal shape have different structures at their respective acute angle parts of the trapezoid. The overlapping region width Xct2' or Xct2" of a part where the display units 4 are adjacent to each other is larger than the overlapping region width Xct2 at the center of a display unit 4. In other words, the overlapping region width Xct2' or Xct2" at the lens trough part 32 with a low optical separation performance is larger than the overlapping region width Xct2 at the lens convex part 31 and is expressed by the following mathematical formula.

$$Xct2' > Xct2 \qquad \text{[Math 38]}$$

$$Xct2'' > Xct2 \qquad \text{[Math 39]}$$

Figure 30:
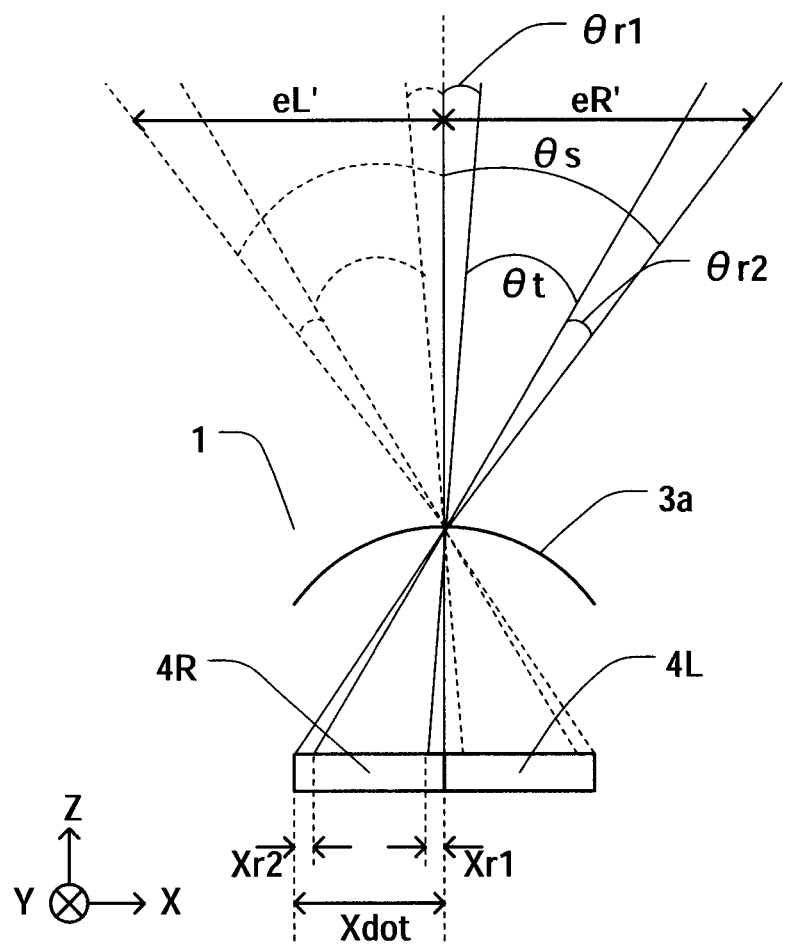
[FIG. 30] A schematic illustration showing the relationship between the direction of light emitted from a pixel of the display panel according to Embodiment 5 of the present invention and 3D crosstalk.

FIG. 30 is a schematic illustration showing an optical model of the image display apparatus 1 according to this embodiment.

The display panel 2 has larger observation width eR' and EL' compared with those in the above-described embodiments. In order to increase the observation width, as presented by the mathematical formulae 5 to 13, the refractive index n of the lenticular lens 3 and the distance H between the cylindrical lens 3a and pixels are adjusted to obtain a desired width.

Referring to FIG. 29 again, a nearly triangular shielding part is provided at the acute angle part of the nearly trapezoidal aperture at the center of the display unit 4. The overlapping region width Xct2 is smaller than Xct. Furthermore, in the overlapping region between display units adjacent to each other in the X-axis direction, no shielding part is provided at the acute angle part of the nearly trapezoidal aperture, whereby Xct2' and Xct2" are increased to improve the aperture ratio.

With the above structure, as shown in FIG. 30, $\theta r2$ is larger than $\theta r1$. However, the distance H is reduced to increase the observation widths eR' and eL'. Therefore, it is ensured that the light beam angle $\theta t$ contributing to the three-dimensional observation range has a given value, not impairing the three-dimensional observation range.

The image display apparatus 1 of this embodiment is the same in structure and behavior as the image display apparatus 1 of Embodiment 1 except for the above-described matters.

Effects of the image display apparatus 1 according to this embodiment will be described hereafter.

The image display apparatus 1 according to this embodiment has a shielding part at the center of the display unit 4, whereby excellent display properties including balanced 3D crosstalk and 3D moire at the center part of the three-dimensional view field are obtained. Furthermore, since the observation widths are increased and there is no shielding part between display units adjacent to each other in the X-axis direction, the aperture ratio can be improved without impairing the three-dimensional observation range.

Furthermore, from synergetic effect between the larger overlapping region widths Xct2' and Xct2" at the ends of the display unit 4 corresponding to the lens trough part 32 and the larger spot diameter at the lens trough part 32, a region where three-dimensional observation is obviously difficult is created.

When the angular range $\theta r2$ in which three-dimensional observation is difficult is small, the observer may experience a so-called "reversed" state in which a right-eye image and a left-eye image are accidentally switched if he/she observes the screen from somewhere not right in front. The observation in the reversed state is not preferable because it causes eye fatigue or discomfort. However, with the above structure, three-dimensional observation is obviously difficult in the angular range $\theta r2$ and this angular range is large; therefore, the above reversed observation can be prevented. Therefore, highly safe three-dimensional images can be provided.

In Modified Embodiment 1 of Embodiment 3, Embodiment 4, and Embodiment 5, the first observing point pixel 4L and second observing point pixel 4R constitute a display unit and the high optical separation performance region of the optical means is situated within a display unit and the low optical separation performance region is situated between display units. This is not restrictive. For example, the shielding parts can be different in shape depending on whether it is within a display unit or between display units. Such a structure can prevent deterioration in three-dimensional image quality due to the optical means and allow for further efficient use of light, thereby contributing to improvement in the transmittance and three-dimensional image quality.

[Embodiment 6]

The pixel of the display panel according to Embodiment 6 of the present invention will be described with reference to the drawings.

Figure 31:
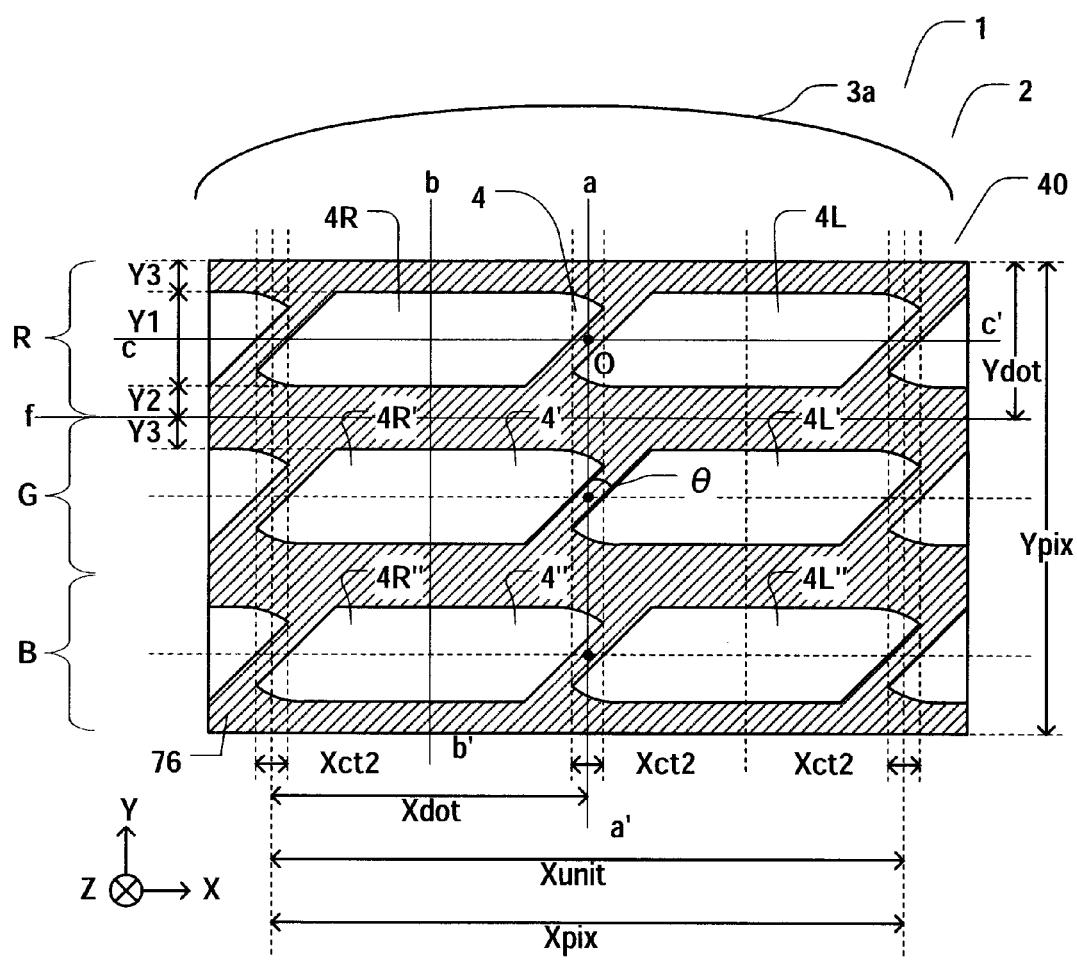
[FIG. 31] A plane view showing a pixel of the display panel according to Embodiment 6 of the present invention.

FIG. 31 is a plane view showing a pixel of the display panel according to this embodiment.

The sub-pixel according to this embodiment has a parallelogram shape. The sub-pixel has a near parallelogram aperture consisting of two sides nearly parallel to the X-axis and two oblique sides having an angle $\theta$ with respect to the Y-axis direction. The sub-pixels are arranged in a matrix in the X-axis direction and in the Y-axis direction. In other words, the oblique sides of any sub-pixel are always at the same inclination $\theta$. Therefore, unlike the pixel structure described in Embodiment 1, the display unit 4 is not symmetric about a line b-b' parallel to the Y-axis and passing through the center of the sub-pixel. However, it is symmetric about the center O of the display unit 4 and has an equivalent layout structure after rotated by 180 degrees in the XY plane.

A pixel 40 consists of three display units 4, 4', and 4" arranged in the Y-axis direction. The display units are colored in red R, green G, or blue B. The pixel 40 is square and arranged in a matrix with a pitch Xunit in the X-axis direction and with a pitch Ypix in the Y-axis direction in the display region. Furthermore, the pitch Xdot of sub-pixels in the X-axis direction is Xunit/2 and the pitch Ydot of sub-pixels in the Y-axis direction is Xpix/3. Red R, green G, blue color filters extend in the X-axis direction and create a nearly stripe pattern repeated in the Y-axis direction.

The apertures of sub-pixels arranged in the X-axis direction are provided with no shift in the Y-axis direction. The shielding parts at the lower bases of the parallelograms are provided also with no shift in the Y-axis direction. In this way, the shielding parts at the lower bases of the parallelograms form a band of shielding part extending in the X-axis direction from one end to the other of the display region. In other words, the width Y2 of the shielding parts at the lower bases of the parallelogram pixels is nearly constant without fluctuating in the X-axis direction.

Furthermore, nearly triangular shielding regions are provided at the acute angle parts of the near parallelogram aperture.

The image display apparatus 1 of this embodiment is the same in structure and behavior as the image display apparatus 1 of Embodiment 1 except for the above-described matters.

Effects of the image display apparatus 1 according to this embodiment will be described hereafter.

The image display apparatus 1 according to this embodiment has shielding parts at the acute angle parts of the parallelogram aperture, reducing 3D crosstalk and reducing fluctuation in the vertical aperture width to male 3D moire less visible.

An ordinary liquid crystal panel controls the rubbing on one substrate in one direction. Therefore, if each sub-pixel includes an asymmetric structure with respect to the rubbing direction, display properties change on the basis of sub-pixels, which appears as difference in display properties between observing points particularly in an image display apparatus.

However, the display unit according to this embodiment consists of sub-pixels in a single outer shape, reducing difference in the staggering structure or electric field distribution structure between sub-pixels and diminishing difference in display properties between observing points that results from difference in the sub-pixel shape. Furthermore, with the above structure, with the sub-pixels being oriented equally, the liquid crystal alignment upon application of a voltage can be stabilized. In other words, difference in the image quality between observing points can be reduced and uniform images are output to the observing points to provide a high quality three-dimensional image. Furthermore, as the sub-pixels are in a single shape, the alignment of liquid crystal molecules is stabilized in each sub-pixel, reducing misalignment or leak light and improving the contrast.

Depending on the pixel size and shielding region area, some local shielding width may optically be increased by the image separation means and sometimes light-dark particles become visible to the human eye, which reduces the image quality. However, in the display unit of this embodiment, the shielding width at the lower base of the parallelogram is nearly constant in the X-axis direction, namely in the image separation direction, whereby light-dark particles according to fluctuation in the shielding width can be reduced.

Furthermore, a liquid crystal drive mode using a horizontal or oblique electric field such as IPS (in-plane switching), FFS (fringe field switching), and AFFS (advanced fringe field switching) systems can improve the transmittance by using a single domain in which the liquid crystal molecules equally rotate. Therefore, the pixel structure of this embodiment is preferably applicable.

[Embodiment 7]

The pixel of the display panel according to Embodiment 7 of the present invention will be described with reference to the drawings.

Figure 32:
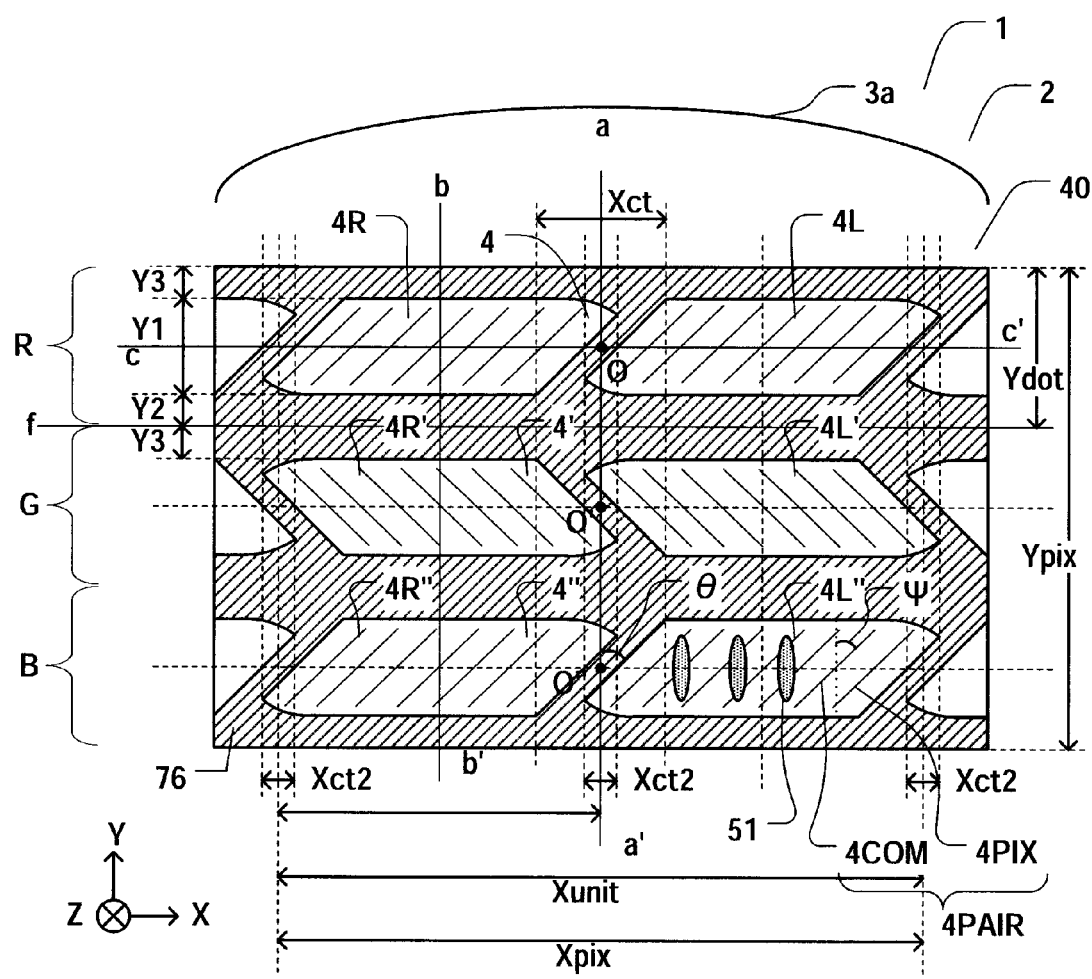
[FIG. 32] A plane view showing a pixel of the display panel according to Embodiment 7 of the present invention.

FIG. 32 is a plane view showing a pixel of the display panel according to this embodiment.

The sub-pixel according to this embodiment is in a parallelogram shape and has an aperture in a near parallelogram shape. The near parallelogram shape includes two pearly rectangular shapes consisting of two sides nearly parallel to the X-axis and two oblique sides having an inclination of $-\theta$ or $+\theta$ with respect to the Y-axis. Then, unlike the pixel structure described in Embodiment 1, this pixel structure is not symmetric about a line b-b' parallel to the Y-axis and passing through the center of the sub-pixel but symmetric about the center O of the display unit 4.

Furthermore, unlike the above-described embodiments, the sub-pixels adjacent to each other in the Y-axis direction can align the liquid crystal molecules in different directions from each other. Then, multidomain compensation effect serves to reduce change in color tone when seen in an oblique direction.

Near parallelogram sub-pixels having oblique sides with an inclination $+\theta$ ($>0$) and near parallelogram sub-pixels having oblique sides with an inclination $-\theta$ ($<0$) are arranged alternately in the Y-axis direction. Sub-pixels having oblique sides with the same inclination are arranged in the X-axis direction. The oblique sides of sub-pixels arranged in the Y-axis direction are turned at every row while the oblique sides of sub-pixels arranged in the X-axis direction are inclined at the same angle.

A pixel electrode 4PIX and an opposite electrode 4COM form an electrode pair 4PAIR arranged nearly in parallel with their lengthwise direction inclined in a direction different from the Y-axis direction. In this embodiment, the inclination of the electrode pair 4PAIR with respect to the Y-axis direction is set to $\theta$ or $-\theta$ according to the oblique sides of the parallelogram. The electrode pair 4PAIR and the oblique wire at the oblique sides of a sub-pixel are parallel to each other.

Multiple electrode pairs 4PAIR consisting of the pixel electrode 4PIX and opposite electrode 4COM are provided in the X-axis direction in a sub-pixel to create an electric field in the direction perpendicular to the inclination direction of the electrode pairs 4PAIR in the aperture of each sub-pixel. The electric field created between the pixel electrode 4PIX and opposite electrode 4COM includes at least a component neatly parallel to the substrate surface, whereby the major axis of liquid crystal molecules 51 can be rotated in a plane nearly parallel to the substrate surface.

The pixel electrode 4PIX and opposite electrode 4COM are provided on the TFT substrate 2a (see FIG. 2). The pixel electrode 4PIX and opposite electrode 4COM apply an electric field nearly parallel to the plane to the liquid crystal molecules.

Here, the pixel electrode 4PIX and opposite electrode 4COM are not restricted to the above. An electrode on the TFT substrate 2a and an electrode on the opposite substrate 2b can be used to create an electric field nearly parallel to the substrate surface or an oblique electric field so as to drive the liquid crystal molecules.

The pixel electrode 4PIX and opposite electrode 4COM are nearly parallel to each other and have an inclination $\theta$ or $-\theta$ with respect to the Y-axis direction according to the orientation of the oblique wire. In other words, the inclination of the pixel electrode 4PIX and the inclination of the opposite electrode 4COM are equal and an electric field created between the pixel electrode 4PIX and opposite electrode 4COM is nearly perpendicular to the oblique wire.

Here, the inclination $\theta$ of the oblique sides of a sub-pixel and the inclination of the electrode pair 4PAIR can be different from each other. The pixel electrode 4PIX and opposite electrode 4COM are formed in the same layer. This is not restrictive and they can be formed in different layers.

In the pixel of this embodiment, the liquid crystal drive mode is of an IPS (in-plane switching) system. As in the above-described embodiments, FFS (fringe field switching) and AFFS (advanced fringe field switching) systems are also preferably applicable.

The above structure utilizes a positive liquid crystal agent with a positive dielectric anisotropy ($\Delta\epsilon>0$). The rubbing direction of the TFT substrate 2a is in the $-Y$ direction or in the $+Y$ direction. Therefore, the liquid crystal molecules 51 are initially aligned with their major axis nearly in parallel to the Y-axis direction.

The nature of the liquid crystal agent is not restricted to the positive type. It can be the negative type with a negative dielectric anisotropy ($\Delta\epsilon<0$). In the case of a negative liquid crystal agent, the rubbing direction is set in the $-X$ direction or in the $+X$ direction and the liquid crystal molecules 51 are aligned with the major axis nearly in parallel to the X-axis direction.

The image display apparatus 1 of this embodiment is the same in structure and behavior as the image display apparatus 1 of Embodiment 1 except for the above-described matters.

Effects of the image display apparatus 1 according to this embodiment will be described hereafter.

Since a single domain structure in which the liquid crystal molecules are uniformly aligned is established in a sub-pixel, the above structure can uniformly drive the liquid crystal molecules in a sub-pixel and improve the transmittance. Furthermore, the electrode pair 4PAIR and the oblique sides of a sub-pixel are parallel to each other, whereby the pixel electrode 4PIX and opposite electrode 4COM can efficiently be provided, improving the aperture ratio.

The sub-pixels arranged in the Y-axis direction can align the liquid crystal molecules in different directions from each other, whereby change in color tone between sub-pixels arranged in the Y-axis direction is compensated. In other words, in combination with the sub-pixel arranged in the Y-axis direction, multidomain compensation effect can be obtained.

Furthermore, when a negative liquid crystal agent is used, such a liquid crystal agent has difficulty in rising in the major axis direction for an electric field perpendicular to the substrate surface. Following the liquid crystal molecules rotating in the substrate plane, the liquid crystal molecules on the electrodes align, whereby the transmittance on the electrodes can be improved. Furthermore, difference between brightness on the electrodes and brightness between the electrodes is reduced, whereby 3D moire caused by this difference in brightness can be reduced.

The domains are provided in a cycle of two rows by the turning direction. The color filters are provided in a cycle of three rows. The above structure yields multidomain compensation effect in every six rows. Here, six rows of sub-pixels extend over a pitch of 6×Ydot. As this pitch is increased, the image quality is deteriorated because of easily visible unevenness. For this reason, the subjective assessment revealed that it is desirable that the pixel pitch Ypix is 150 µm or smaller. In other words, the sub-pixel pitch in the Y-axis direction is desirably 50 µm or smaller.

The alignment of liquid crystal may be unstable at the acute angle parts of a parallelogram because the electric field concentrates there. In the above structure, a shielding part for reducing 3D crosstalk is formed so that this unstable alignment part is shielded at the same time, improving the three-dimensional image quality and ensuring a high quality liquid crystal display panel.

[Embodiment 8]

The pixel of the display panel according to Embodiment 8 of the present invention will be described with reference to the drawings.

Figure 33:
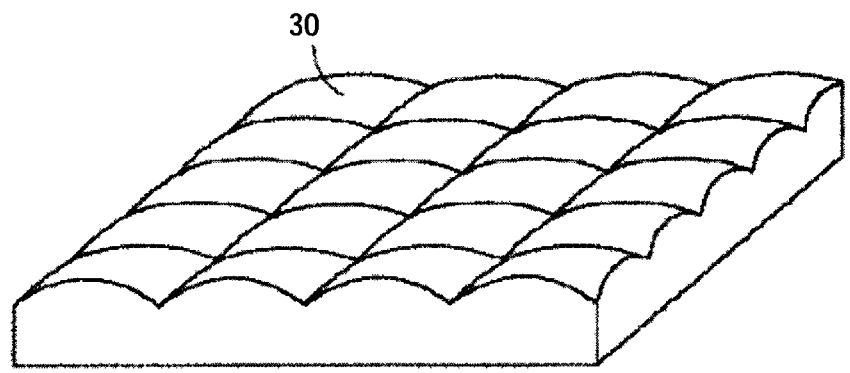
[FIG. 33] A perspective view showing a fly-eye lens applicable to the image display apparatus according to Embodiment 8 of the present invention.

FIG. 33 is a perspective view of a fly-eye lens applicable to the image display apparatus according to this embodiment.

An fly-eye lens 30 is applicable as the image separation means according to this embodiment. The fly-eye lens 30 can separate images not only in the X-axis direction but also in the Y-axis direction.

Figure 34:
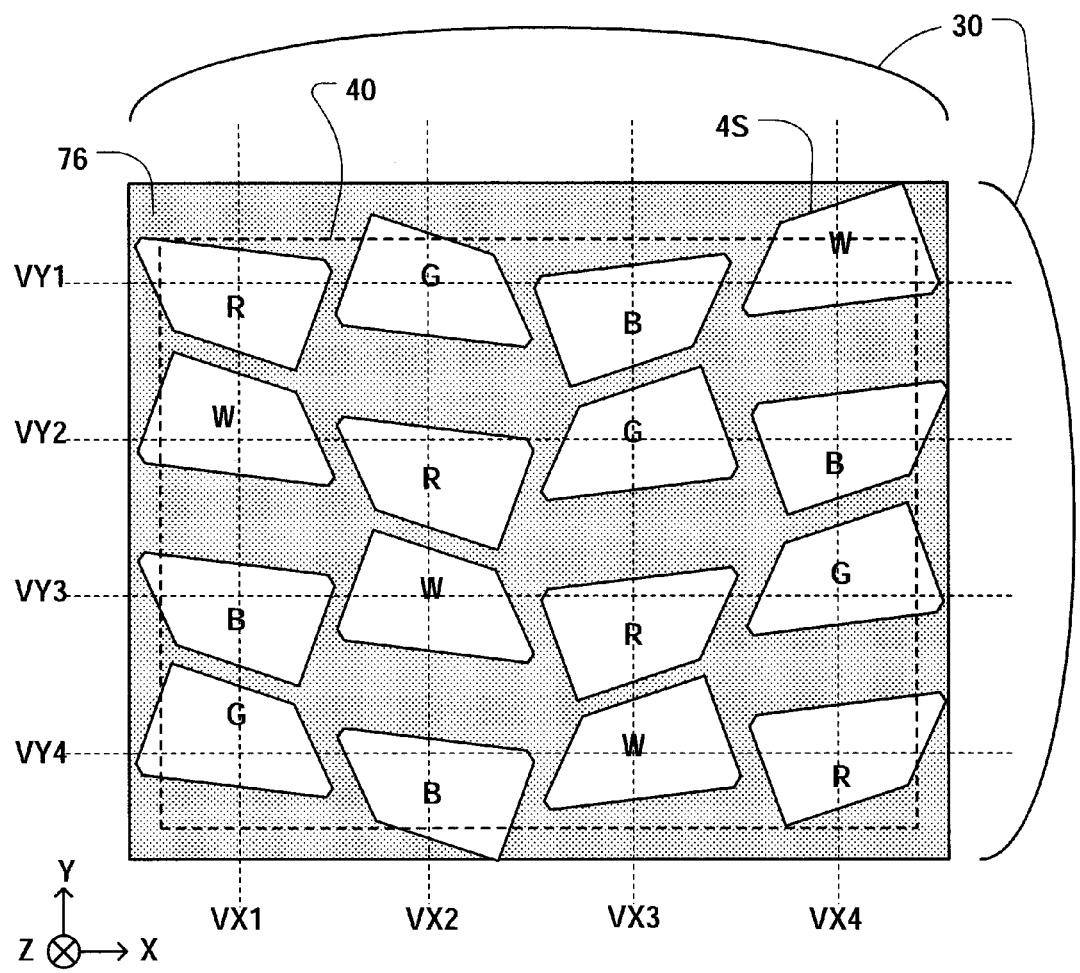
[FIG. 34] A plane view showing a pixel of the display panel according to Embodiment 8 of the present invention.

FIG. 34 is a plane view showing a pixel of the display panel according to this embodiment.

The display unit according to this embodiment consists of sub-pixels of multiple observing points. A pixel 40 consists of a total of 16 sub-pixels 4S in four rows and four columns.

The pixel 40 is provided with red R, green G, blue B, and white W color filters. With this structure, for sorting images in the XZ-plane, the four sub-pixels in VX1, VX2, VX3, or VX4 are used as a display unit to output images for four observing points. For sorting images in the YZ-plane, the four sub-pixels in VY1, VY2, VY3, or VY4 are used as a display unit to output images for four observing points. Here, the colors of the color filters are not restricted to the above. For example, blue-green (cyan) or yellow can be used instead of white.

The color filters are arranged in the manner that the same color is not duplicated in the rows and columns of a pixel.

The shielding wire between sub-pixels is not parallel to Y-axis or to the X-axis; it is oblique. The shielding wire between sub-pixels is turned in every two columns in the X-axis direction and turned in every line in the Y-axis direction.

Sub-pixels adjacent to each other in the X-axis direction overlap with each other in the Y-axis direction and the overlapping region has the same structure as in the image display apparatus 1 according to Embodiment 1. Sub-pixels adjacent to each other in the Y-axis direction overlap with each other in the X-axis direction and the overlapping region has the same structure as in the image display apparatus 1 according to Embodiment 1.

The image display apparatus 1 of this embodiment is the same in structure and behavior as the image display apparatus 1 of Embodiment 1 except for the above-described matters.

Effects of the image display apparatus 1 according to this embodiment will be described hereafter.

First, since the overlapping region of sub-pixels according to this embodiment has the same structure as the overlapping region of sub-pixels according to Embodiment 1, the same effect regarding this matter is obtained.

Figure 35:
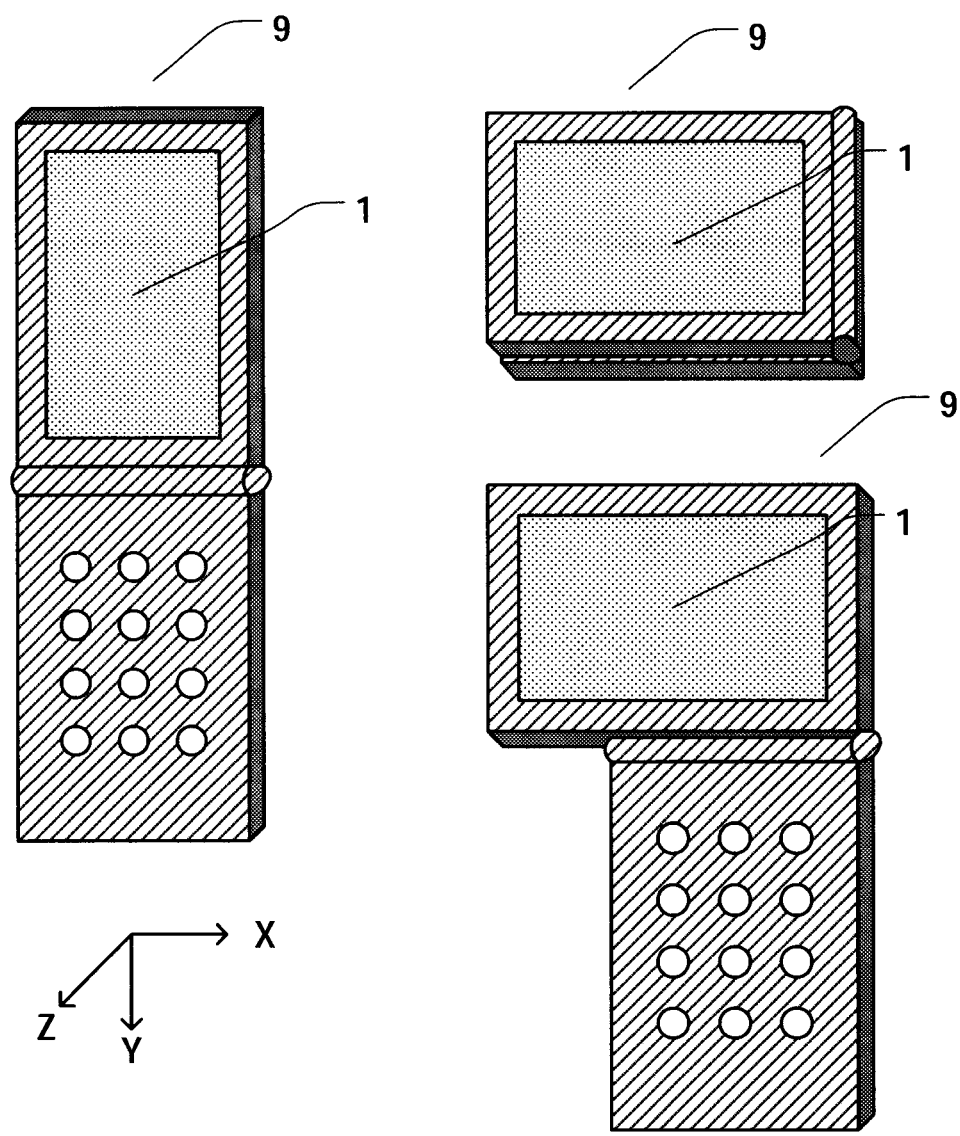
[FIG. 35] A perspective view showing a portable device in which the image display apparatus of the present invention is installed.

With the above structure, even if the image display apparatus is viewed in a direction rotated by 90 degrees, images are separated in different directions and a three-dimensional image can be displayed. Therefore, this structure can be installed in a mobile device having a rotatable screen. For example, it can preferably be used in a portable device 9 having a rotatable screen as shown in FIG. 35.

The display part of the cell-phone 9 has the above-described image display apparatus 1 installed. The X-axis direction of the image display apparatus 1 agrees with the vertical direction of the screen of the cell-phone 9 and the Y-axis direction of the image display apparatus 1 agrees with the horizontal direction of the screen of the cell-phone 9. The screen of the cell-phone 9 comprises a hinge with a rotation shaft, whereby it is rotatable. In this way, the image separation direction, namely the X-axis direction can be made nearly parallel to the line connecting the eyes of the observer for use.

In this embodiment, an image display apparatus composed of display units having four observing points is described. This is not restrictive. This embodiment is applicable to a three-dimensional display panel having N observing points in a display unit. Pixels arranged in N rows and N columns can be used in an image display apparatus having N observing points. Such a structure can display a three-dimensional image with the addition of three-dimensional information optimum for each observing point, whereby the range in which an excellent three-dimensional image is observed can be extended.

In the image display apparatus 1 according to the above-described embodiments, the pixel provided on the +X side of a display unit is a left-eye pixel 4L and the pixel provided on the −X side of the display unit is a right-eye pixel 4R. This is not restrictive. It is possible that the first observing point pixel is a right-eye pixel 4R and the second observing point pixel is a left-eye pixel 4L. In this way, when the display panel 2 is rotated by 180 degrees in the XY plane, the observer can observe the three-dimensional display in the same manner as in the original position by changing the order of image data. Particularly, the portable device 9 as shown in FIG. 35 has a rotatable display screen for improved operability, requiring information to be provided regardless of the orientation of the image display apparatus 1 in the hand. Then, the image display apparatus 1 of the present invention can effectively be used.

Some or all of the above-described embodiments can be described as in the following subjunction but not restricted thereto.

(Subjunction 1)

An image display apparatus, comprising:

a display panel having a plurality of display units which are arranged in a matrix and include at least a pixel displaying a first observing point image and a pixel displaying a second observing point image; and an optical means sorting lights emitted from the pixel displaying a first observing point image and pixel displaying a second observing point image in directions different from each other, wherein:

the pixel displaying a first observing point image and pixel displaying a second observing point image are adjacent to each other in a first direction;

the display units are arranged in rows extending in the first direction and in columns extending in a second direction perpendicular to the first direction;

a shielding part is provided around the aperture of the pixel displaying a first observing point image and the aperture of the pixel displaying a second observing point image;

the aperture of the pixel displaying a first observing point image and the aperture of the pixel displaying a second observing point image are composed of a first region where they overlap with each other in the second direction and a second region other than the first region;

the total aperture width in the second direction of the aperture of the pixel displaying a first observing point image and the aperture of the pixel displaying a second observing point image within the first region constitutes a first aperture width;

the aperture width in the second direction of the aperture of the pixel displaying a first observing point image and the aperture of the pixel displaying a second observing point image within the second region constitutes a second aperture width;

the derivatives of the first aperture width with respect to the first direction are real numbers other than zero provided that the direction from near the boundary between the first and second regions toward the center of the first region is the positive direction of the first direction; and of the boundary line between the shielding part and the aperture of the pixel displaying a first observing point image and the boundary line between the shielding part and the aperture of the pixel displaying a second observing point image within the first region, the boundary line intersecting the second direction includes at least one or more flexion points.

(Subjunction 2)

The image display apparatus according to Subjunction 1, wherein:

the boundary line between the shielding part and the aperture of the pixel displaying a first observing point image and the boundary line between the shielding part and the aperture of the pixel displaying a second observing point image within the first region each bend at least one or more times;

the intersection between the boundary line and the shielding part nearly parallel to the first direction is situated in the first region excluding the boundary between the first and second regions; and the first aperture width is smaller than the second aperture width.

(Subjunction 3)

The image display apparatus according to Subjunction 1, wherein:

the boundary line between the shielding part and the aperture of the pixel displaying a first observing point image and the boundary line between the shielding part and the aperture of the pixel displaying a second observing point image within the first region each curve at least one or more times; and there are flexion points where the derivatives are different in the first region.

(Subjunction 4)

The image display apparatus according to Subjunction 1, wherein:

the aperture of the pixel displaying a first observing point image and the aperture of the pixel displaying a second observing point image are in a nearly trapezoidal shape;

the pixel displaying a first observing point image and pixel displaying a second observing point image are provided in the second direction in the manner that the upper base and lower base of the nearly trapezoidal shape are symmetric about a line in the first direction;

the oblique sides of the nearly trapezoidal shape are partly situated in the first region;

the shielding part is partly provided along the oblique side; and the shielding part in the first region includes another oblique side extending in a direction different from that of the oblique side.

(Subjunction 5)

The image display apparatus according to Subjunction 1, wherein:

the aperture of the pixel displaying a first observing point image and the aperture of the pixel displaying a second observing point image are in a near parallelogram shape;

the oblique sides of the near parallelogram shape are partly situated in the first region and crosses at least the first region;

the shielding part including another oblique side extending in a direction different from the that of oblique side is provided at the acute angle part of the near parallelogram shape in the first region.

(Subjunction 6)

The image display apparatus according to Subjunction 1, wherein:

the width of the second region in the first direction is larger than the width of the first region in the first direction, and the second aperture width increases while continuously fluctuating and has a maximal value in the second region.

(Subjunction 7)

An image display apparatus, comprising:

a display panel having a plurality of display units which are arranged in a matrix and include N (N is an integer equal to or greater than 2) pixels displaying N observing point images and arranged in the order from the first observing point to the N-th observing point; and an optical means sorting lights emitted from the N pixels displaying N observing point images in directions different from each other, wherein:

a pixel displaying a k-th (k is an integer of 1, ..., N−1) observing point image and a pixel displaying a k+1-th observing point image are adjacent to each other in a first direction;

the display units are arranged in rows extending in the first direction and in columns extending in a second direction perpendicular to the first direction;

a shielding part is provided around the apertures of the N pixels displaying N observing point images;

the aperture of the pixel displaying a k-th observing point image and the aperture of the pixel displaying a k+1-th observing point image are composed of a first region where they overlap with each other in the second direction and a second region other than the first region;

the total aperture width in the second direction of the aperture of the pixel displaying a k-th observing point image and the aperture of the pixel displaying a k+1-th observing point image within the first region constitutes a first aperture width;

the aperture width in the second direction of the aperture of the pixel displaying a k-th observing point image and the aperture of the pixel displaying a k+1-th observing point image within the second region constitutes a second aperture width;

the derivatives of the first aperture width with respect to the first direction are real numbers other than zero provided that the direction from near the boundary between the first and second regions toward the center of the first region is the positive direction of the first direction;

of the boundary line between the shielding part and the aperture of the pixel displaying a k-th observing point image and the boundary line with the aperture of the pixel displaying a k+1-th observing point image within the first region, the boundary line intersecting the second direction includes at least one or more flexion points;

one intersection between the boundary line and the shielding part nearly parallel to the first direction is situated in the first region excluding the boundary between the first and second regions; and the first aperture width is smaller than the second aperture width.

(Subjunction 8)

An image display apparatus, comprising:

a display panel having a plurality of display units which are arranged in a matrix and include N (N is an integer equal to or greater than 2) pixels displaying N observing point images; and an optical means sorting lights emitted from the N pixels displaying N observing point images in directions different from each other, wherein:

the N pixels displaying N observing point images are arranged in a matrix of N rows extending in a first direction and N columns extending in a second direction perpendicular to the first direction;

a shielding part is provided around the apertures of the N pixels displaying N observing point images;

the aperture of a pixel displaying a k-th (k is an integer of 1, . . . , N−1) observing point image and the aperture of a pixel displaying a k+1-th observing point image in the first direction are composed of a first region where they overlap with each other in the second direction and a second region other than the first region;

the aperture of a pixel displaying an i-th (i is an integer of 1, . . . , N−1) observing point image and the aperture of a pixel displaying an i+1-th observing point image in the second direction are composed of a third region where they overlap with each other in the first direction and a fourth region other than the third region;

the total aperture width in the second direction of the aperture of the pixel displaying a k-th observing point image and the aperture of the pixel displaying a k+1-th observing point image within the first region constitutes a first aperture width;

the aperture width in the second direction of the aperture of the pixel displaying a k-th observing point image and the aperture of the pixel displaying a k+1-th observing point image within the second region constitutes a second aperture width;

the derivatives of the first aperture width with respect to the first direction are real numbers other than zero provided that the direction from near the boundary between the first and second regions toward the center of the first region is the positive direction of the first direction;

of the boundary line between the shielding part and the pixel displaying a k-th observing point image and the boundary line with the aperture of the pixel displaying a k+1-th observing point image within the first region, the boundary line intersecting the second direction includes at least one or more flexion points;

one intersection between the boundary line and the shielding part nearly parallel to the first direction is situated in the first region excluding the boundary between the first and second regions;

the first aperture width is smaller than the second aperture width;

the total aperture width in the first direction of the aperture of the pixel displaying an i-th observing point image and the aperture of the pixel displaying an i+1-th observing point image within the third region constitutes a third aperture width;

the derivatives of the third aperture width with respect to the second direction are real numbers other than zero provided that the direction from near the boundary between the third and fourth regions to the center of the third region is the positive direction of the second direction;

of the boundary line between the shielding part and the pixel displaying an i-th observing point image and the boundary line with the aperture of the pixel displaying an i+1-th observing point image within the third region, the boundary line intersecting the first direction includes at least one or more flexion points; and one intersection between the boundary line and the shielding part nearly parallel to the first direction is situated in the third region excluding the boundary between the third and fourth regions.

(Subjunction 9)

An image display apparatus, comprising:

a display panel having a plurality of display units which are arranged in a matrix and include at least a pixel displaying a first observing point image and a pixel displaying a second observing point image; and an optical means sorting lights emitted from the pixel displaying a first observing point image and pixel displaying a second observing point image in directions different from each other, wherein:

the pixel displaying a first observing point image and pixel displaying a second observing point image are adjacent to each other in a first direction;

the display units are arranged in rows extending in the first direction and in columns extending in a second direction perpendicular to the first direction;

a first shielding part and a second shielding part are provided around the aperture of the pixel displaying a first observing point image and the aperture of the pixel displaying a second observing point image;

the optical means comprises a first separation region with a high optical separation performance and a second separation region with a low optical separation performance; and the first separation region is situated in accordance with the first shielding part and the second separation region is situated in accordance with the second shielding part.

(Subjunction 10)

A display panel having a plurality of display units which are arranged in a matrix and include at least a pixel displaying a first observing point image and a pixel displaying a second observing point image, wherein:

the direction in which the pixel displaying a first observing point image and pixel displaying a second observing point image are substantially adjacent to each other constitutes a first direction;

the display units are arranged in rows extending in the first direction and in columns extending in a second direction perpendicular to the first direction;

a shielding part is provided around the aperture of the pixel displaying a first observing point image and the aperture of the pixel displaying a second observing point image;

the aperture of the pixel displaying a first observing point image and the aperture of the pixel displaying a second observing point image are composed of a first region where they overlap with each other in the second direction and a second region other than the first region;

the total aperture width in the second direction of the aperture of the pixel displaying a first observing point image and the aperture of the pixel displaying a second observing point image within the first region constitutes a first aperture width;

the aperture width in the second direction of the aperture of the pixel displaying a first observing point image and the aperture of the pixel displaying a second observing point image within the second region constitutes a second aperture width;

the derivatives of the first aperture width with respect to the first direction are real numbers other than zero provided that the direction from near the boundary between the first and second regions toward the center of the first region is the positive direction of the first direction; and of the boundary line between the shielding part and the aperture of the pixel displaying a first observing point image and the boundary line between the shielding part and the aperture of the pixel displaying a second observing point image within the first region, the boundary line intersecting the second direction includes at least one or more flexion points.

(Subjunction 11)
The image display apparatus according to Subjunction 1, wherein:
the boundary line including the intersection and different from the first direction is at least partly composed of a two- or higher-order curve and curves at least one or more times.

(Subjunction 12)
The image display apparatus according to Subjunction 1, wherein:
the angle between two of the linear curves in the first region is a blunt angle.

(Subjunction 13)
The image display apparatus according to Subjunction 1, wherein:
the derivatives are nearly continuous nearly at the boundary between the first and second regions.

(Subjunction 14)
The image display apparatus according to Subjunction 1, wherein:
of the boundary line in the second region, the angle between the boundary line intersecting the second direction and the second direction is 17 degrees or larger.

(Subjunction 15)
The image display apparatus according to Subjunction 1, wherein:
the first and second aperture widths are equal at the boundary between the first and second regions.

(Subjunction 16)
The image display apparatus according to Subjunction 1, wherein:
the boundary line including the intersection and different from the first direction is composed of N (N is an integer equal to or greater than 1) linear curves and bends N or more times.

(Subjunction 17)
The image display apparatus according to Subjunction 1, wherein:
the optical means is composed of a lenticular sheet in which the convex parts and trough parts of cylindrical lenses are arranged alternately in the first direction; and
the convex parts of cylindrical lenses are situated from the aperture region of the pixel displaying a first observing point image to the aperture region of the pixel displaying a second observing point image.

(Subjunction 18)
The image display apparatus according to Subjunction 17, wherein:
the convex parts of cylindrical lenses are situated at positions corresponding to the first region;
the trough parts of cylindrical lenses are situated in a third region where two of the display units adjacent to each other in the first direction overlap with each other in the second direction; and
the fluctuation in the third aperture width that is the total of the aperture widths in the second direction of two of the display units in the third region is different from the fluctuation in the first aperture width.

(Subjunction 19)
The image display apparatus according to Subjunction 7, wherein:
the optical means is composed of a lenticular lens sheet in which the convex parts and trough parts of cylindrical lenses are arranged alternately in the first direction;
the convex parts of cylindrical lenses are situated from the aperture region of the pixel displaying a first observing point image to the aperture region of the pixel displaying an N-th observing point image.

(Subjunction 20)
The image display apparatus according to Subjunction 19, wherein:
the trough parts of cylindrical lenses are situated in a third region where two of the display units adjacent to each other in the first direction overlap with each other in the second direction; and
the fluctuation in the third aperture width that is the total of the aperture widths in the second direction of two of the display units in the third region is different from the fluctuation in the first aperture width.

(Subjunction 21)
The image display apparatus according to Subjunction 8, wherein:
the derivatives of the third aperture width with respect to the second direction fluctuate in the manner that their sum is a negative value.

(Subjunction 22)
The image display apparatus according to Subjunction 8, wherein:
the optical means is composed of a fly-eye lens sheet in which the convex parts and trough parts of lenses are arranged alternately in the first direction and in the second direction;
the convex surfaces of lenses are situated from the aperture region of the pixel displaying a first observing point image to the aperture region of the pixel displaying an N-th observing point image in the first direction and in the second direction.

(Subjunction 23)
The image display apparatus according to Subjunction 18, wherein:
the angle between the inclination direction of the oblique part provided in accordance with the region of the lens convex part and the second direction is larger than the angle between the inclination direction of the oblique part provided in accordance with the region of the lens trough part and the second direction; and the width of the oblique part provided in accordance with the region of the lens convex part is smaller than the width of the oblique part provided in accordance with the region of the lens trough part.

(Subjunction 24)

The image display apparatus according to Subjunction 18, wherein:

the width of the second region in the first direction is larger than the width of the first region in the first direction, the second aperture width increases while continuously fluctuating and has a maximal value in the second region, the second aperture width is maximized near the vertex of the lens convex part rather than at the center of the aperture.

(Subjunction 25)

A terminal device in which the image display apparatus according to Subjunction 1 is installed.

(Subjunction 26)

A terminal device in which the display panel according to Subjunction 10 is installed.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

Legend
1 image display apparatus
2 display panel
2a TFT substrate
2b opposite substrate
3 lenticular lens
3a cylindrical lens
30 fly-eye lens
31 lens convex part
32 lens trough part
4, 4', 4" display unit
40 pixel
4R, 4R', 4W' right-eye pixel
4L, 4L', 4L" left-eye pixel
4S sub-pixel
4COM opposite electrode
4PIX pixel electrode
5LC liquid crystal layer
51 liquid crystal molecule
55R right eye of the observer
55L left eye of the observer
11 polarizing plate
15 backlight
16 light beam
76 shielding part
9 cell-phone
WXR width in the X direction of aperture of right-eye pixel
WXL width in the X direction of aperture of left-eye pixel
Xct1, Xct2 width in the X-axis direction of overlapping region
X1 width in the X-axis direction of non-overlapping region
Xdot sub-pixel pitch in the X-axis direction
Ydot sub-pixel pitch in the Y-axis direction
Xunit display unit pitch in the X-axis direction
Yunit display unit pitch in the Y-axis direction
Xpix pixel pitch in the X-axis direction
Ypix pixel pitch in the Y-axis direction $\theta r1$, $\theta r2$ angular range in which 3D crosstalk is high
$\theta t$ angular range in which 3D crosstalk is low
$\theta s$ observation range of one observing point
SP spot diameter
Xr distance between the center line of display unit and the center of spot diameter
R red
G green
B blue
1013 overlapping region
1014 non-overlapping region
1015 tab
1003a cylindrical lens
1011 vertical direction
1012 horizontal direction
1041, 1042 sub-pixel
1070 wire
1075 aperture
1076 shielding part

What is claimed is:
1. An image display apparatus, comprising:
a display panel having a plurality of display units which are arranged in a matrix and include at least a pixel displaying a first observing point image and a pixel displaying a second observing point image; and
an optical means sorting lights emitted from said pixel displaying a first observing point image and pixel displaying a second observing point image in directions different from each other, wherein:
said pixel displaying a first observing point image and pixel displaying a second observing point image are adjacent to each other in a first direction;
said display units are arranged in rows extending in said first direction and in columns extending in a second direction perpendicular to said first direction;
a shielding part is provided around the aperture of said pixel displaying a first observing point image and the aperture of said pixel displaying a second observing point image;
the aperture of said pixel displaying a first observing point image and the aperture of said pixel displaying a second observing point image are composed of i) a first region where the aperture of said pixel displaying a first observing point image and the aperture of said pixel displaying a second observing point image overlap with each other in said second direction, and ii) a second region separate from said first region, the second region being a region where the aperture of said pixel displaying a first observing point image and the aperture of said pixel displaying a second observing point image do not overlap with each other in the second direction;
the total aperture width in said second direction of the aperture of said pixel displaying a first observing point image and the aperture of said pixel displaying a second observing point image within said first region constitutes a first aperture width;
the aperture width in said second direction of the aperture of said pixel displaying a first observing point image and the aperture of said pixel displaying a second observing point image within said second region constitutes a second aperture width;
the derivatives of said first aperture width with respect to said first direction are real numbers other than zero provided that the direction from the boundary between said first and second regions toward the center of said first region is the positive direction of said first direction; and of the boundary line between said shielding part and the aperture of said pixel displaying a first observing point image and the boundary line between said shielding part and the aperture of said pixel displaying a second observing point image within said first region, the boundary line intersecting said second direction includes at least one or more flexion points.

2. The image display apparatus according to claim 1, wherein:
the boundary line between said shielding part and the aperture of said pixel displaying a first observing point image and the boundary line between said shielding part and the aperture of said pixel displaying a second observing point image within said first region each bend at least one or more times;
the intersection between said boundary line and said shielding part substantially parallel to said first direction is situated in said first region excluding the boundary between said first and second regions; and
said first aperture width is smaller than said second aperture width.

3. The image display apparatus according to claim 1, wherein:
the boundary line between said shielding part and the aperture of said pixel displaying a first observing point image and the boundary line between said shielding part and the aperture of said pixel displaying a second observing point image within said first region each curve at least one or more times; and
there are flexion points where said derivatives are different in said first region.

4. The image display apparatus according to claim 1, wherein:
the aperture of said pixel displaying a first observing point image and the aperture of said pixel displaying a second observing point image are in a substantially trapezoidal shape;
said pixel displaying a first observing point image and pixel displaying a second observing point image are provided in said second direction in the manner that the upper base and lower base of said substantially trapezoidal shape are symmetric about a line in said first direction;
the oblique sides of said substantially trapezoidal shape are partly situated in said first region;
said shielding part is partly provided along said oblique side; and
said shielding part in said first region includes another oblique side extending in a direction different from that of said oblique side.

5. The image display apparatus according to claim 1, wherein:
the aperture of said pixel displaying a first observing point image and the aperture of said pixel displaying a second observing point image are in a substantially parallelogram shape;
the oblique sides of said substantially parallelogram shape are partly situated in said first region and crosses at least said first region;
said shielding part including another oblique side extending in a direction different from that of said oblique side is provided at the acute angle part of said substantially parallelogram shape in said first region.

6. The image display apparatus according to claim 1, wherein:
the width of said second region in said first direction is larger than the width of said first region in said first direction, and said second aperture width increases while continuously fluctuating and has a maximal value in said second region.

7. The image display apparatus according to claim 1, wherein:
the boundary line including the intersection and different from the first direction is at least partly composed of a two- or higher-order curve and curves at least one or more times.

8. The image display apparatus according to claim 1, wherein:
the angle between two of the linear curves in the first region is a blunt angle.

9. The image display apparatus according to claim 1, wherein:
the derivatives are substantially continuous at the boundary between the first and second regions.

10. The image display apparatus according to claim 1, wherein:
of the boundary line in the second region, the angle between the boundary line intersecting the second direction and the second direction is 17 degrees or larger.

11. The image display apparatus according to claim 1, wherein:
the first and second aperture widths are equal at the boundary between the first and second regions.

12. The image display apparatus according to claim 1, wherein:
the boundary line including the intersection and different from the first direction is composed of N (N is an integer equal to or greater than 1) linear curves and bends N or more times.

13. The image display apparatus according to claim 1, wherein:
the optical means is composed of a lenticular sheet in which the convex parts and trough parts of cylindrical lenses are arranged alternately in the first direction; and
the convex parts of cylindrical lenses are situated from the aperture region of the pixel displaying a first observing point image to the aperture region of the pixel displaying a second observing point image.

14. The image display apparatus according to claim 13, wherein:
the convex parts of cylindrical lenses are situated at positions corresponding to the first region;
the trough parts of cylindrical lenses are situated in a third region where two of the display units adjacent to each other in the first direction overlap with each other in the second direction; and
the fluctuation in the third aperture width that is the total of the aperture widths in the second direction of two of the display units in the third region is different from the fluctuation in the first aperture width.

15. An image display apparatus, comprising:
a display panel having a plurality of display units which are arranged in a matrix and include N (N is an integer equal to or greater than 2) pixels displaying N observing point images and arranged in the order from the first observing point to the N-th observing point; and
an optical means sorting lights emitted from said N pixels displaying N observing point images in directions different from each other, wherein:
a pixel displaying a k-th (k is an integer of 1, . . . , N−1) observing point image and a pixel displaying a k+1-th observing point image are adjacent to each other in a first direction;

said display units are arranged in rows extending in said first direction and in columns extending in a second direction perpendicular to said first direction;

a shielding part is provided around the apertures of said N pixels displaying N observing point images;

the aperture of said pixel displaying a k-th observing point image and the aperture of said pixel displaying a k+1-th observing point image are composed of a first region where they overlap with each other in said second direction and a second region other than said first region;

the total aperture width in said second direction of the aperture of said pixel displaying a k-th observing point image and the aperture of said pixel displaying a k+1-th observing point image within said first region constitutes a first aperture width;

the aperture width in said second direction of the aperture of said pixel displaying a k-th observing point image and the aperture of said pixel displaying a k+1-th observing point image within said second region constitutes a second aperture width;

the derivatives of said first aperture width with respect to said first direction are real numbers other than zero provided that the direction from the boundary between said first and second regions toward the center of said first region is the positive direction of said first direction;

of the boundary line between said shielding part and the aperture of said pixel displaying a k-th observing point image and the boundary line with the aperture of said pixel displaying a k+1-th observing point image within said first region, the boundary line intersecting said second direction includes at least one or more flexion points;

one intersection between said boundary line and said shielding part substantially parallel to said first direction is situated in said first region excluding the boundary between said first and second regions; and said first aperture width is smaller than said second aperture width.

16. The image display apparatus according to claim 15, wherein:

the optical means is composed of a lenticular lens sheet in which the convex parts and trough parts of cylindrical lenses are arranged alternately in the first direction;

the convex parts of cylindrical lenses are situated from the aperture region of the pixel displaying a first observing point image to the aperture region of the pixel displaying an N-th observing point image.

17. The image display apparatus according to claim 16, wherein:

the trough parts of cylindrical lenses are situated in a third region where two of the display units adjacent to each other in the first direction overlap with each other in the second direction; and the fluctuation in the third aperture width that is the total of the aperture widths in the second direction of two of the display units in the third region is different from the fluctuation in the first aperture width.

18. An image display apparatus, comprising:

a display panel having a plurality of display units which are arranged in a matrix and include N (N is an integer equal to or greater than 2) pixels displaying N observing point images; and an optical means sorting lights emitted from said N pixels displaying N observing point images in directions different from each other, wherein:

said N pixels displaying N observing point images are arranged in a matrix of N rows extending in a first direction and N columns extending in a second direction perpendicular to said first direction;

a shielding part is provided around the apertures of said N pixels displaying N observing point images;

the aperture of a pixel displaying a k-th (k is an integer of 1, . . . , N−1) observing point image and the aperture of a pixel displaying a k+1-th observing point image in said first direction are composed of a first region where they overlap with each other in said second direction and a second region other than said first region;

the aperture of a pixel displaying an i-th (i is an integer of 1, . . . , N−1) observing point image and the aperture of a pixel displaying an i+1-th observing point image in said second direction are composed of a third region where they overlap with each other in said first direction and a fourth region other than said third region;

the total aperture width in said second direction of the aperture of said pixel displaying a k-th observing point image and the aperture of said pixel displaying a k+1-th observing point image within said first region constitutes a first aperture width;

the aperture width in said second direction of the aperture of said pixel displaying a k-th observing point image and the aperture of said pixel displaying a k+1-th observing point image within said second region constitutes a second aperture width;

the derivatives of said first aperture width with respect to said first direction are real numbers other than zero provided that the direction from the boundary between said first and second regions toward the center of said first region is the positive direction of said first direction;

of the boundary line between said shielding part and said pixel displaying a k-th observing point image and the boundary line with the aperture of said pixel displaying a k+1-th observing point image within said first region, the boundary line intersecting said second direction includes at least one or more flexion points;

one intersection between said boundary line and said shielding part substantially parallel to said first direction is situated in said first region excluding the boundary between said first and second regions;

said first aperture width is smaller than said second aperture width;

the total aperture width in said first direction of the aperture of said pixel displaying an i-th observing point image and the aperture of said pixel displaying an i+1-th observing point image within said third region constitutes a third aperture width;

the derivatives of said third aperture width with respect to said second direction are real numbers other than zero provided that the direction from the boundary between said third and fourth regions to the center of said third region is the positive direction of said second direction;

of the boundary line between said shielding part and said pixel displaying an i-th observing point image and the boundary line with the aperture of said pixel displaying an i+1-th observing point image within said third region, the boundary line intersecting said first direction includes at least one or more flexion points; and one intersection between said boundary line and said shielding part substantially parallel to said first direction is situated in said third region excluding the boundary between said third and fourth regions.

19. The image display apparatus according to claim 18, wherein:

the derivatives of the third aperture width with respect to the second direction fluctuate in the manner that their sum is a negative value.

20. The image display apparatus according to claim 18, wherein:
  the optical means is composed of a fly-eye lens sheet in which the convex parts and trough parts of lenses are arranged alternately in the first direction and in the second direction;
  the convex surfaces of lenses are situated from the aperture region of the pixel displaying a first observing point image to the aperture region of the pixel displaying an N-th observing point image in the first direction and in the second direction.

* * * * *